US012699577B2

(12) United States Patent (10) Patent No.: US 12,699,577 B2
Guo (45) Date of Patent: Aug. 4, 2026

(54) DISPLAY METHOD AND ELECTRONIC DEVICE

(71) Applicant: Honor Device Co., Ltd., Shenzhen (CN)

(72) Inventor: Haizhou Guo, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 209 days.

(21) Appl. No.: 18/553,117

(22) PCT Filed: Dec. 29, 2022

(86) PCT No.: PCT/CN2022/143543
§ 371 (c)(1),
(2) Date: Sep. 28, 2023

(87) PCT Pub. No.: WO2023/151417
PCT Pub. Date: Aug. 17, 2023

(65) Prior Publication Data
US 2024/0168779 A1 May 23, 2024

(30) Foreign Application Priority Data

Feb. 9, 2022 (CN) .......................... 202210120620.3

(51) Int. Cl.
*G06F 9/451* (2018.01)
*G06F 3/04817* (2022.01)
*G06F 3/04847* (2022.01)
(52) U.S. Cl.
CPC .......... *G06F 9/451* (2018.02); *G06F 3/04817* (2013.01); *G06F 3/04847* (2013.01)

(58) Field of Classification Search
None
See application file for complete search history.

(56) References Cited

U.S. PATENT DOCUMENTS 6,654,060 B1 * 11/2003 Kurosawa .............. H04N 23/66
348/211.8
2013/0073197 A1 * 3/2013 Hirai .................. G01C 21/3673
701/428

(Continued)

FOREIGN PATENT DOCUMENTS

CN        2771907 Y     4/2006
CN        101702127 A    5/2010

(Continued)

OTHER PUBLICATIONS

Wang, Haiyang et al., "Multifunctional electronic clock," Hands on Projects, 6 pages (with English abstract) (Aug. 2011).

(Continued)

*Primary Examiner* — Tuan S Nguyen
(74) *Attorney, Agent, or Firm* — Leydig, Voit & Mayer, Ltd.

(57) ABSTRACT

Disclosed are a display method and an electronic device. In addition to displaying a clock dial in a clock card interface, an electronic device may also display an icon related to prompt information. A prompt time of the prompt information is within a preset time period from a current time, and the icon is displayed at a position related to the prompt time on the clock dial. In this way, information displayed on the clock card is richer, so that a user can view more information on the clock card, thereby improving use experience of the user.

19 Claims, 48 Drawing Sheets

(56) References Cited

U.S. PATENT DOCUMENTS

| | | | |
|---|---|---|---|
| 2015/0205509 A1 | 7/2015 | Scriven et al. | |
| 2016/0034152 A1* | 2/2016 | Wilson | G06F 3/0482 |
| | | | 715/835 |
| 2016/0179345 A1 | 6/2016 | Zhao et al. | |
| 2017/0269715 A1* | 9/2017 | Kim | G06F 3/0485 |
| 2018/0101138 A1* | 4/2018 | Raymann | G04G 9/0064 |
| 2018/0217562 A1* | 8/2018 | Vadapalli | G04G 9/00 |
| 2023/0184560 A1* | 6/2023 | Che | G01C 21/3638 |
| | | | 701/436 |

FOREIGN PATENT DOCUMENTS

| | | | | | |
|---|---|---|---|---|---|
| CN | 101778173 A | | 7/2010 | | |
| CN | 102289192 A | | 12/2011 | | |
| CN | 104469009 A | | 3/2015 | | |
| CN | 303297981 S | | 7/2015 | | |
| CN | 106559564 A | | 4/2017 | | |
| CN | 304767787 S | | 8/2018 | | |
| CN | 108494962 A | | 9/2018 | | |
| CN | 110062109 A | | 7/2019 | | |
| CN | 305459305 S | | 11/2019 | | |
| CN | 305644192 S | | 3/2020 | | |
| CN | 112068916 A | * | 12/2020 | .......... | G06F 3/0484 |
| CN | 112148174 A | | 12/2020 | | |
| CN | 113377479 A | * | 9/2021 | ............ | G06F 3/147 |
| CN | 113741781 A | | 12/2021 | | |
| CN | 114157755 A | | 3/2022 | | |

OTHER PUBLICATIONS

Mao, Weiying, "Multifunctional electronic clock design," Science and Technology Communication, 4 pages (with English abstract) (Apr. 2016).

Xie, Zhiping, "Design of multi-function intelligent clock," Electronic Engineering & Product World, 5 pages (with English abstract) (Feb. 2020).

* cited by examiner

102

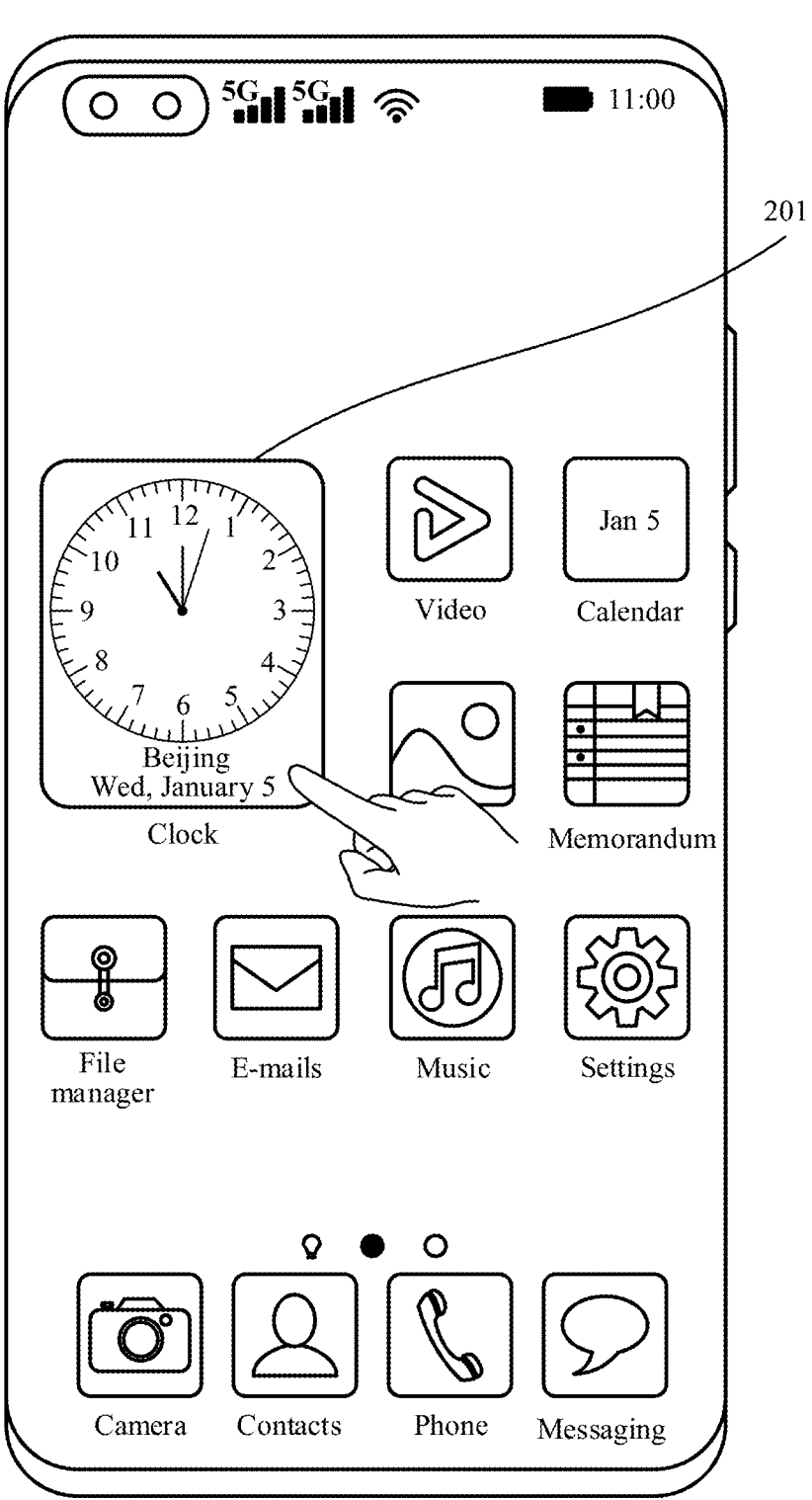
FIG. 2a(1)

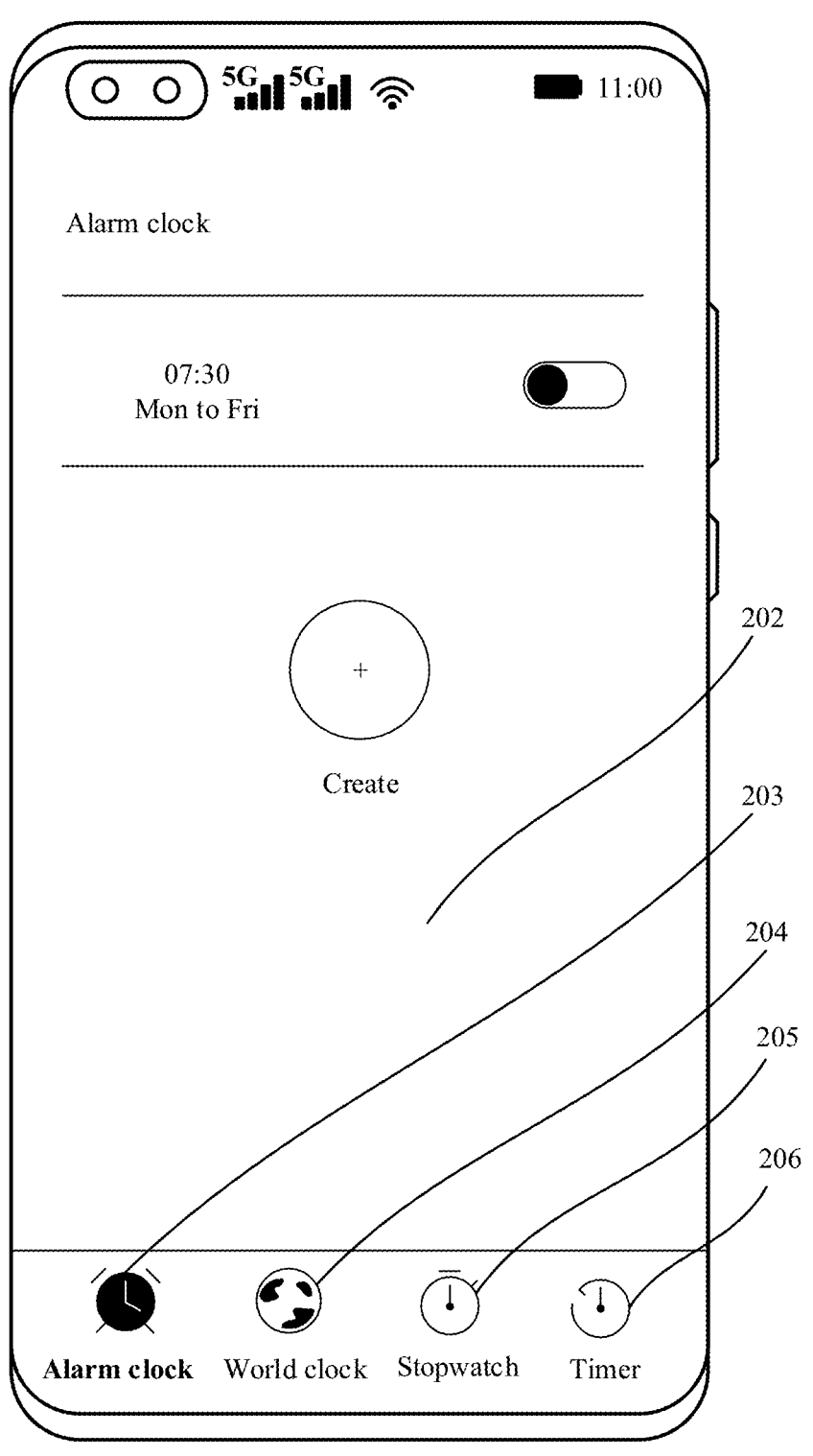
FIG. 2a(2)

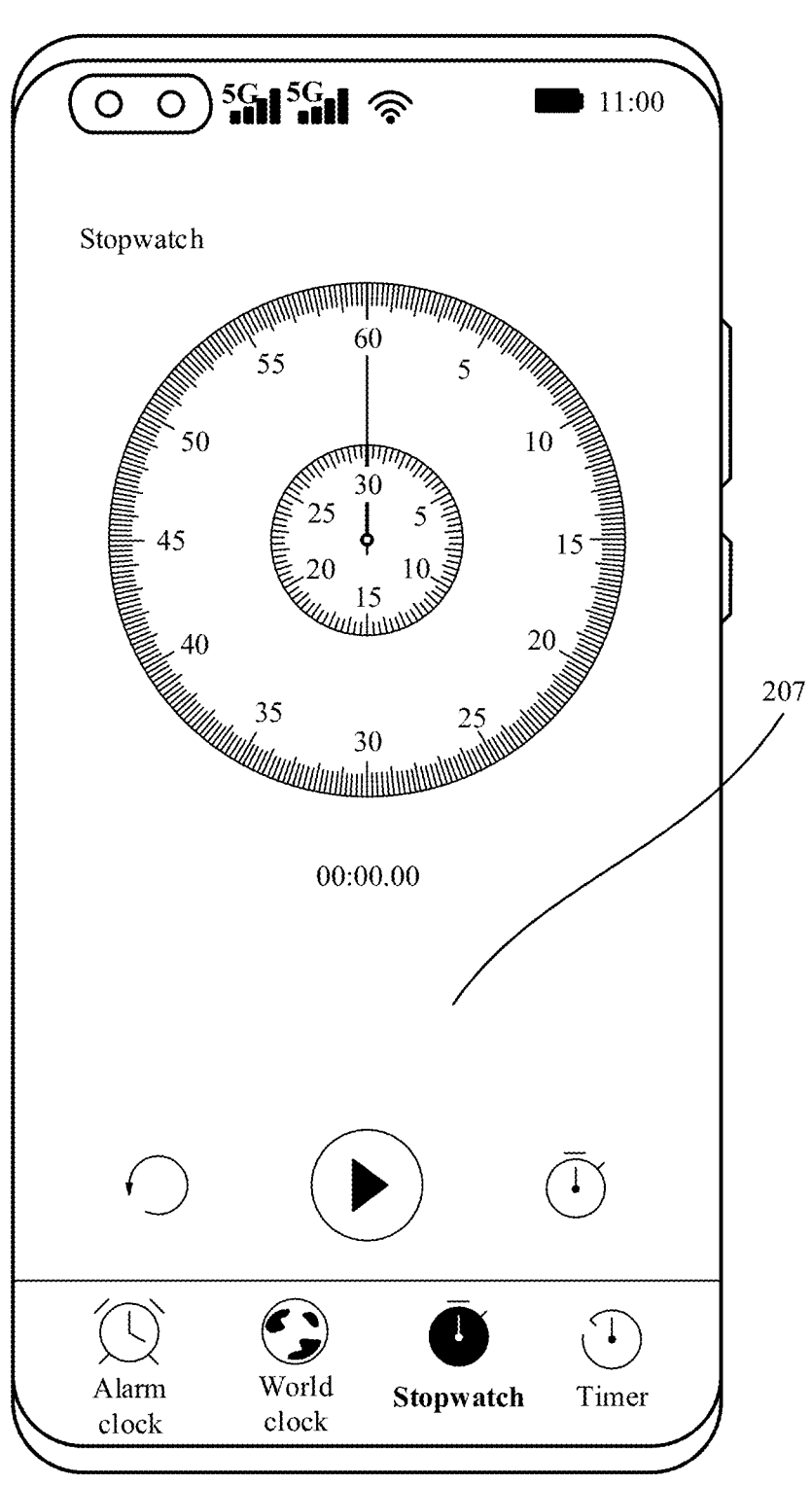
FIG. 2b(1)

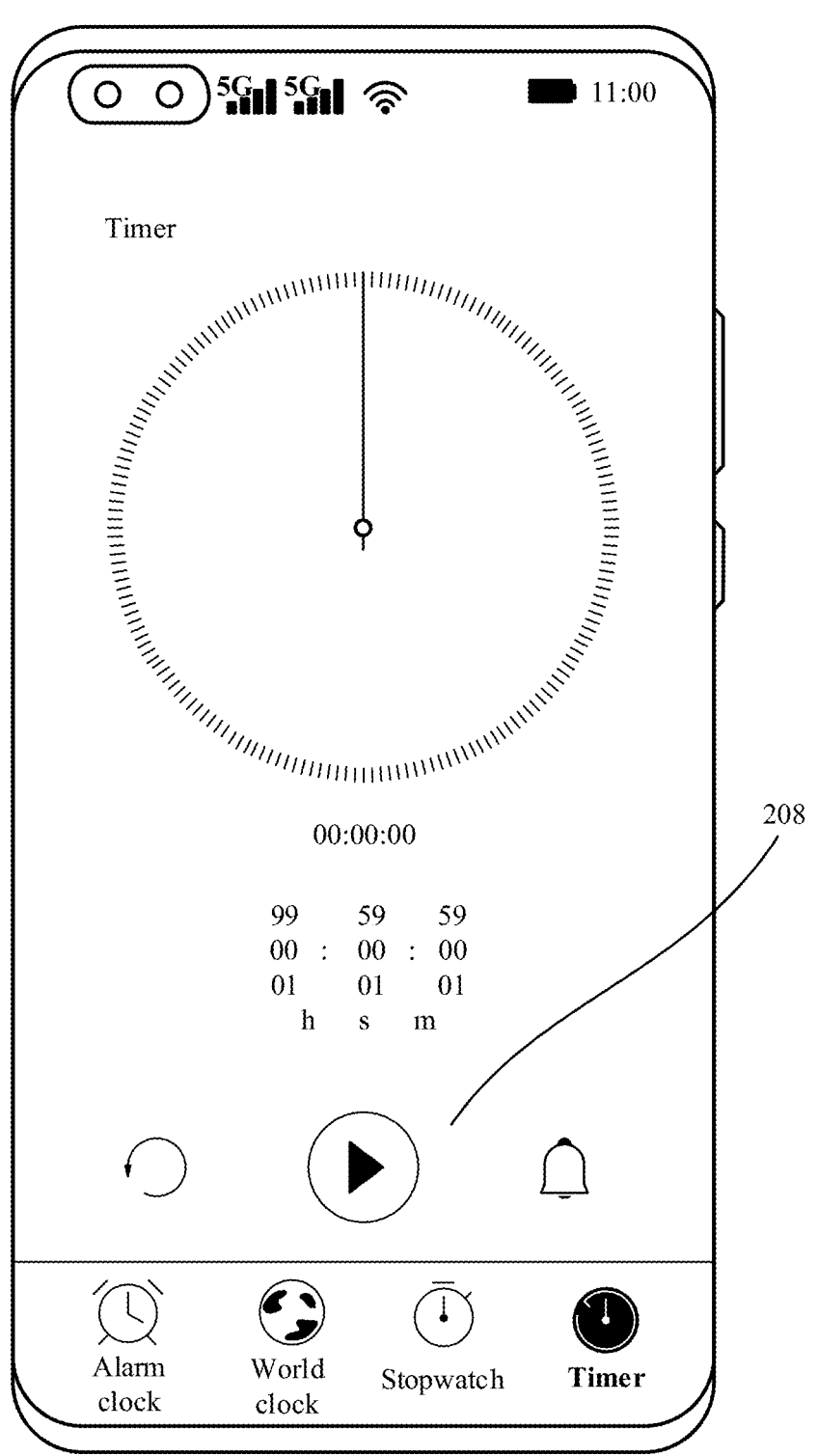
FIG. 2b(2)

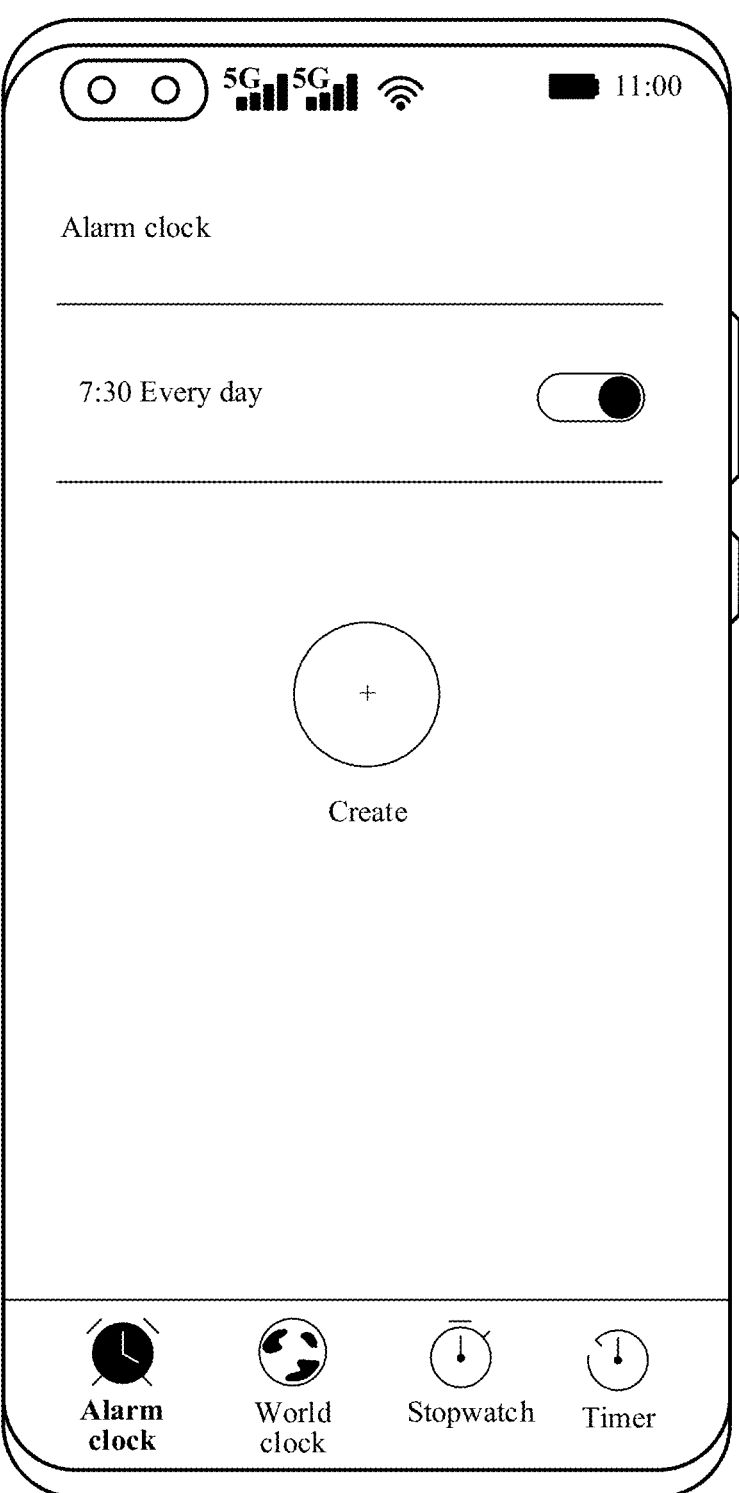
FIG. 6a(1)

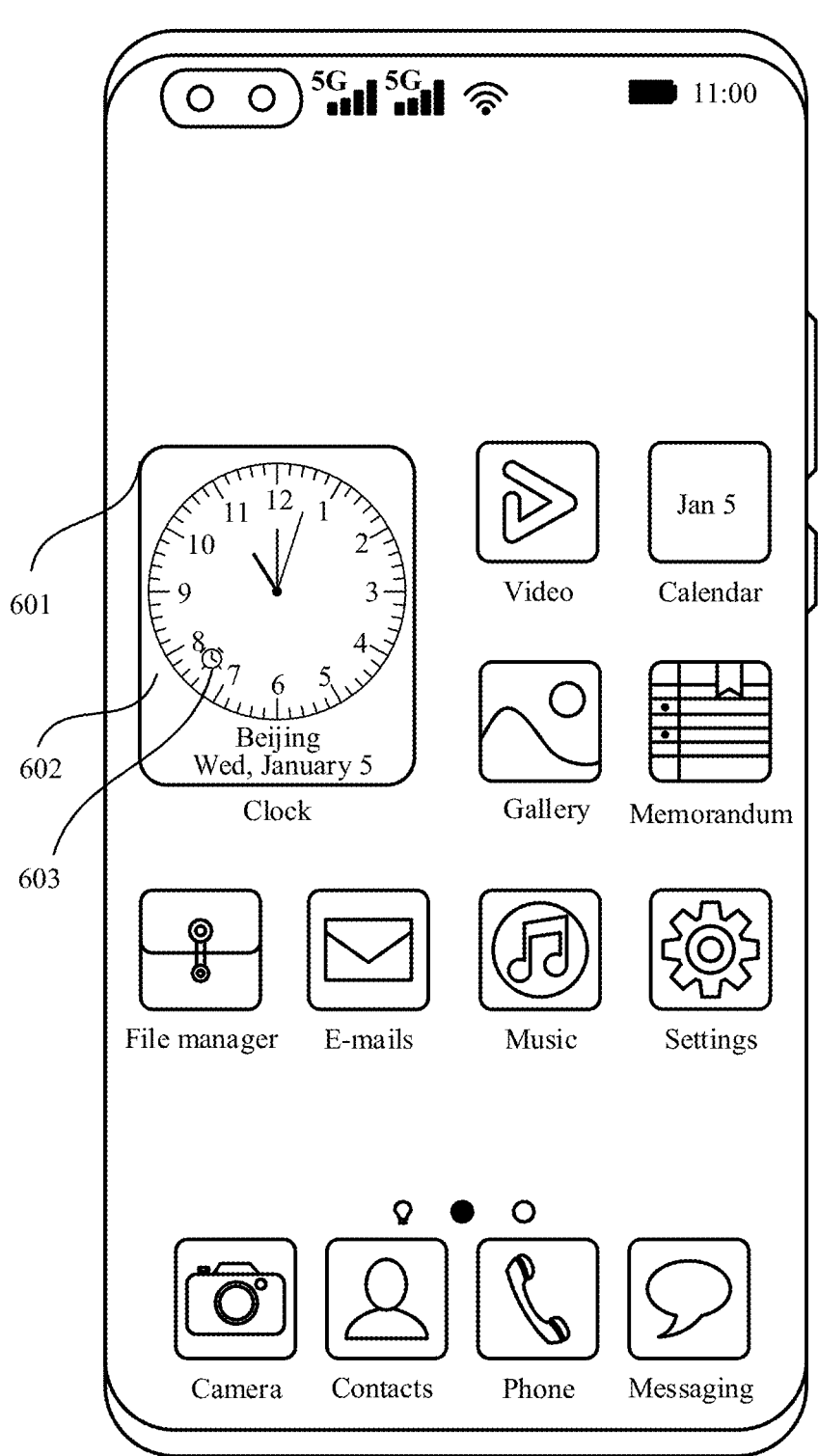
FIG. 6a(2)

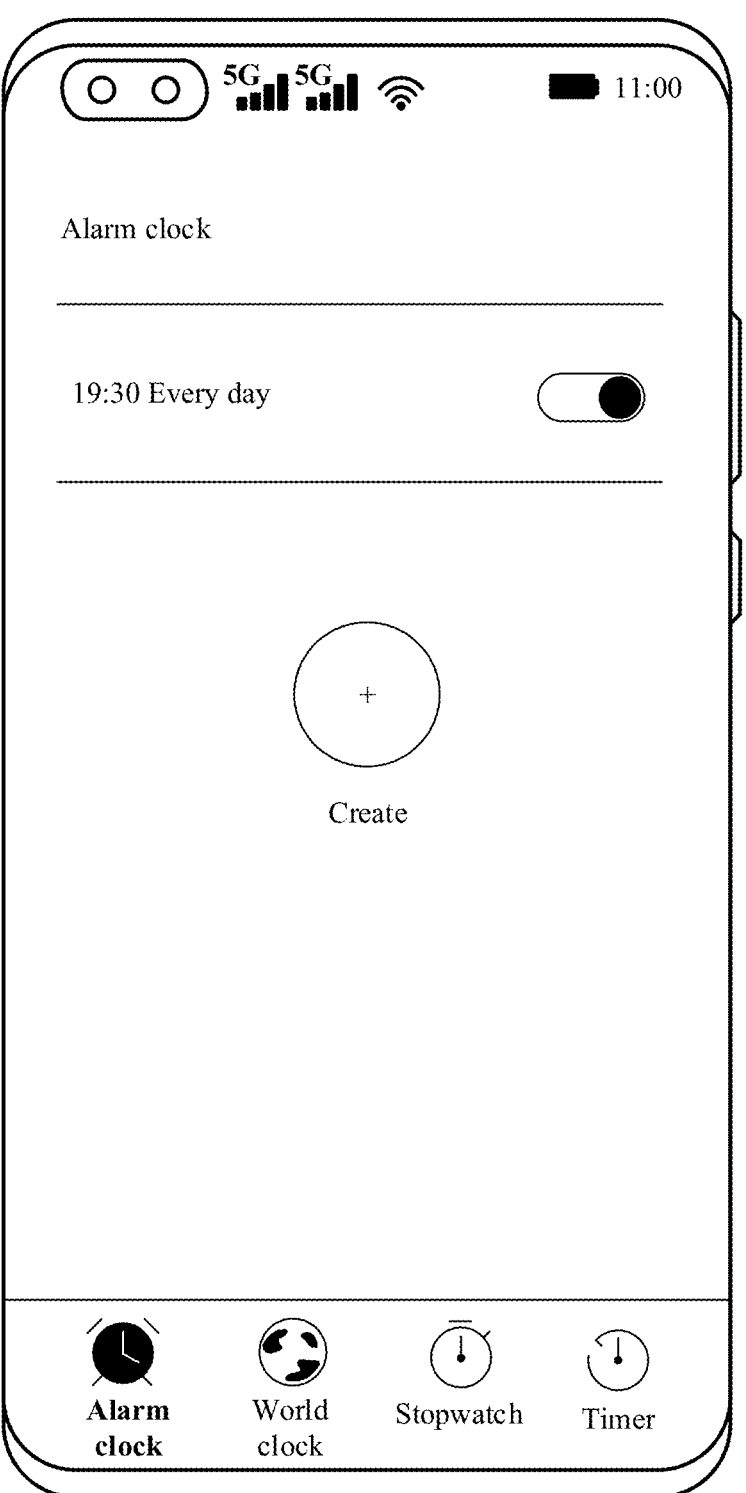
FIG. 6b(1)

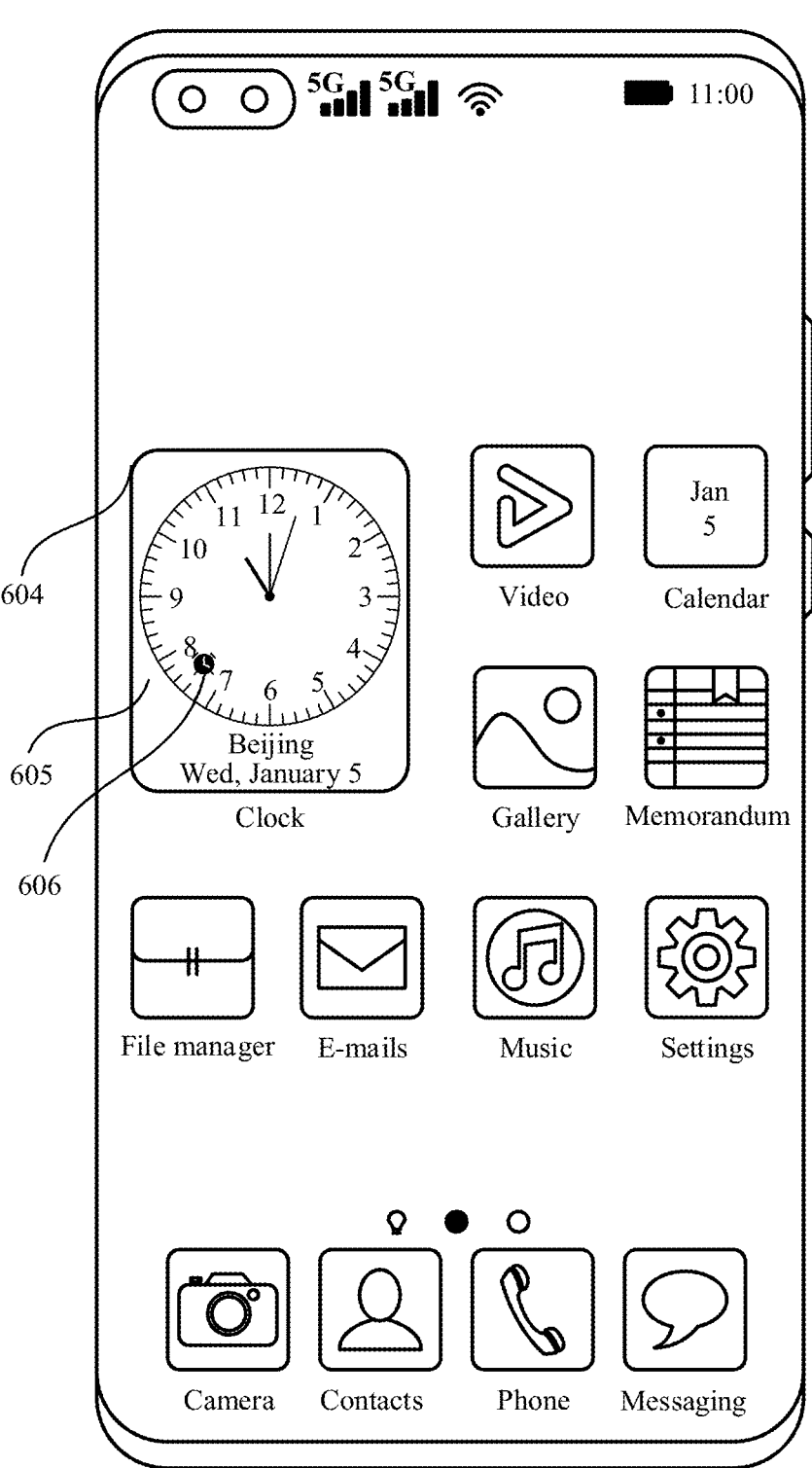
FIG. 6b(2)

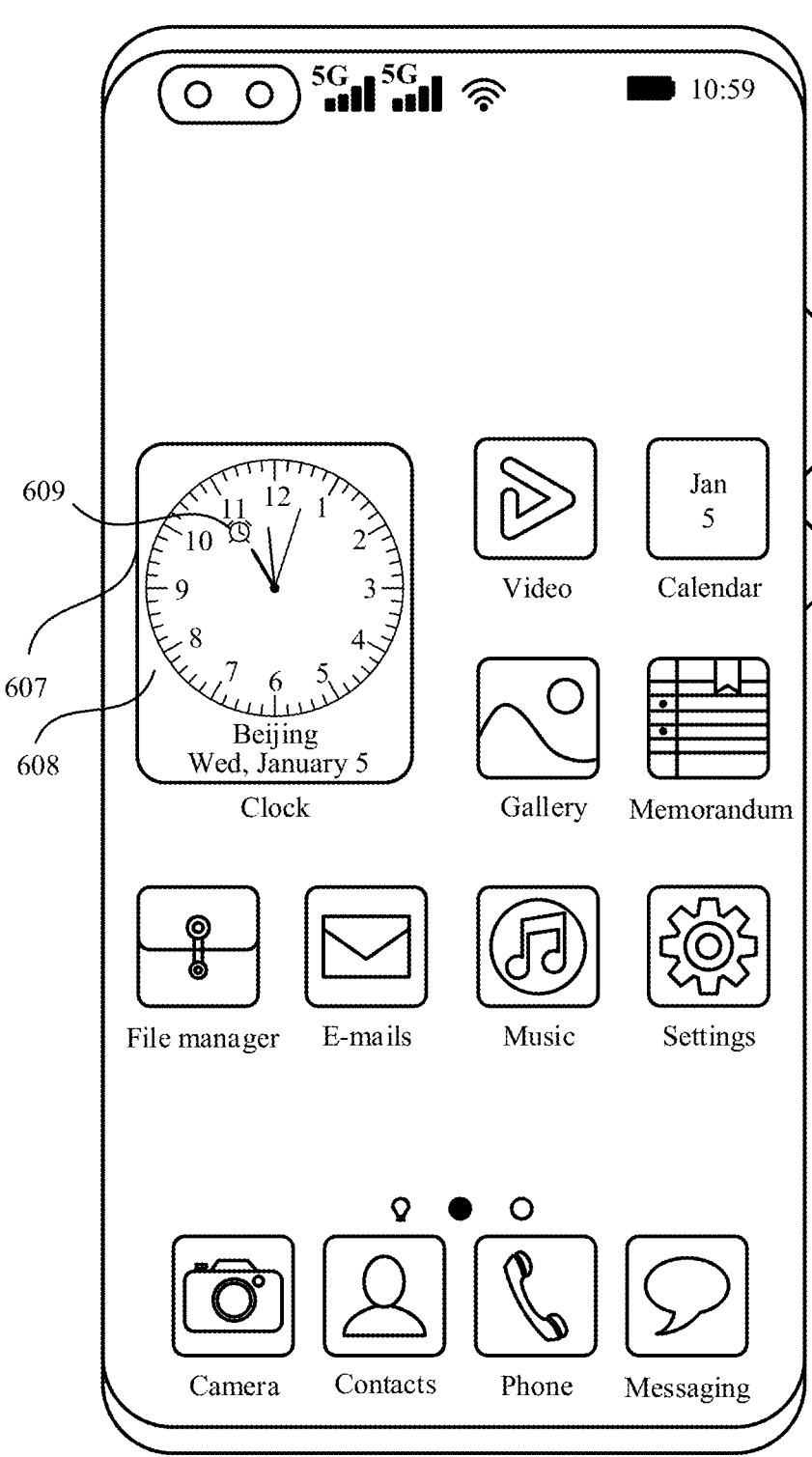
FIG. 6d(1)

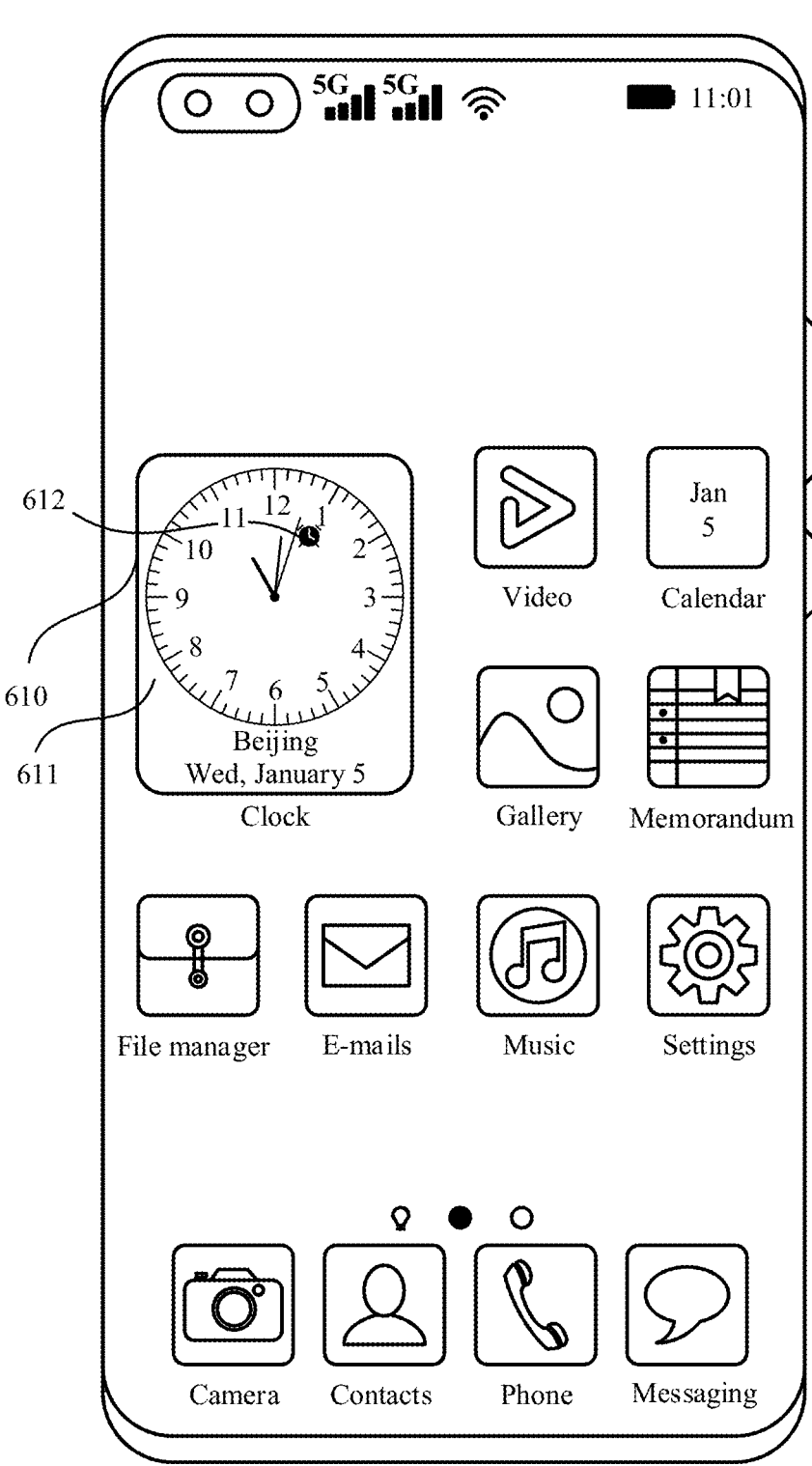
FIG. 6d(2)

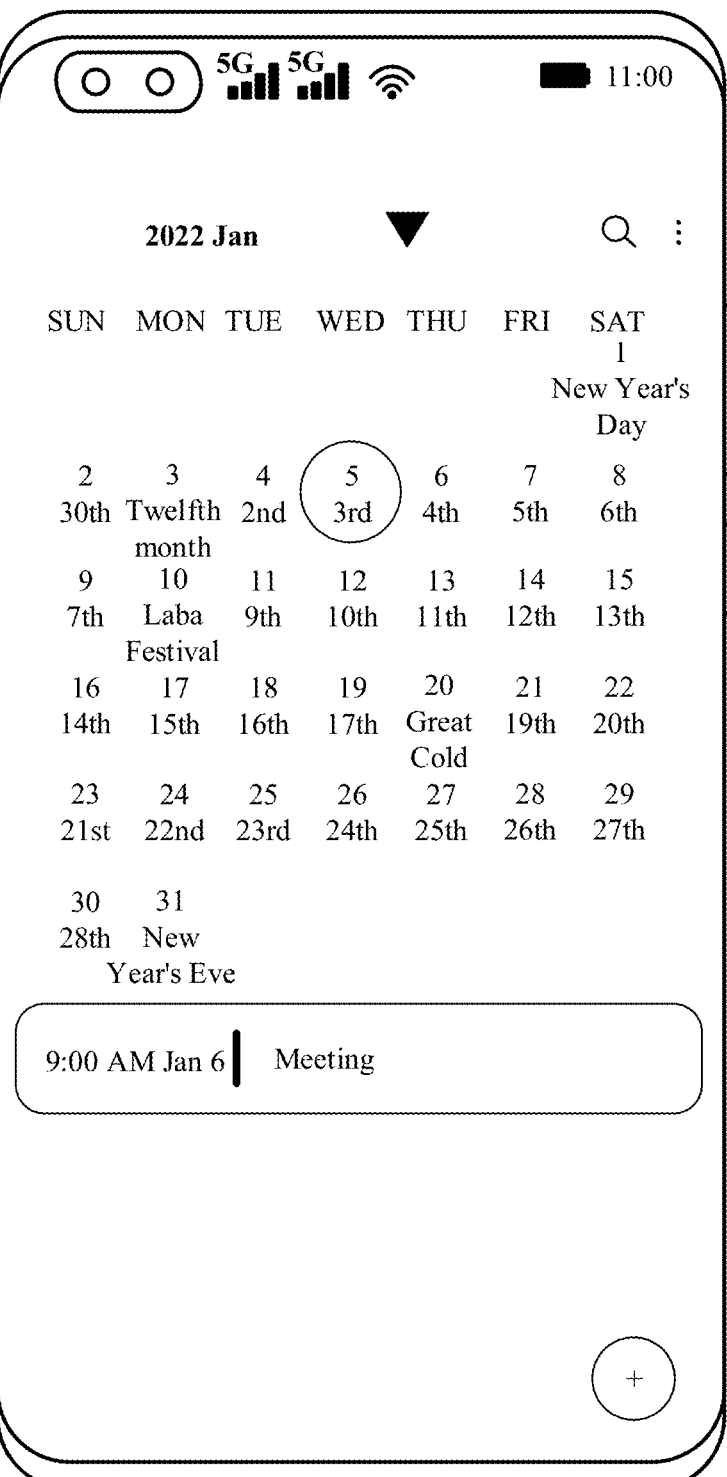
FIG. 7a(1)

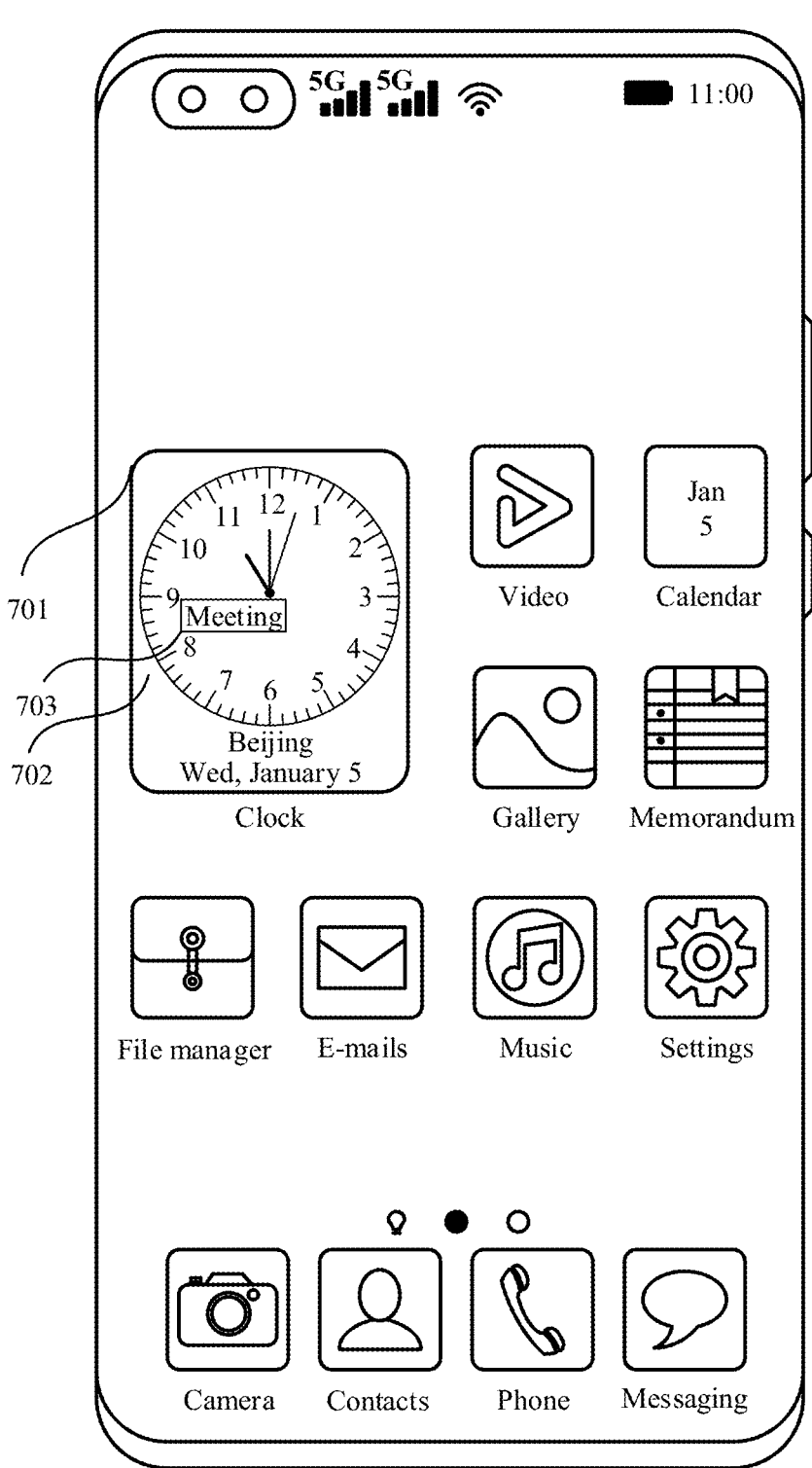
FIG. 7a(2)

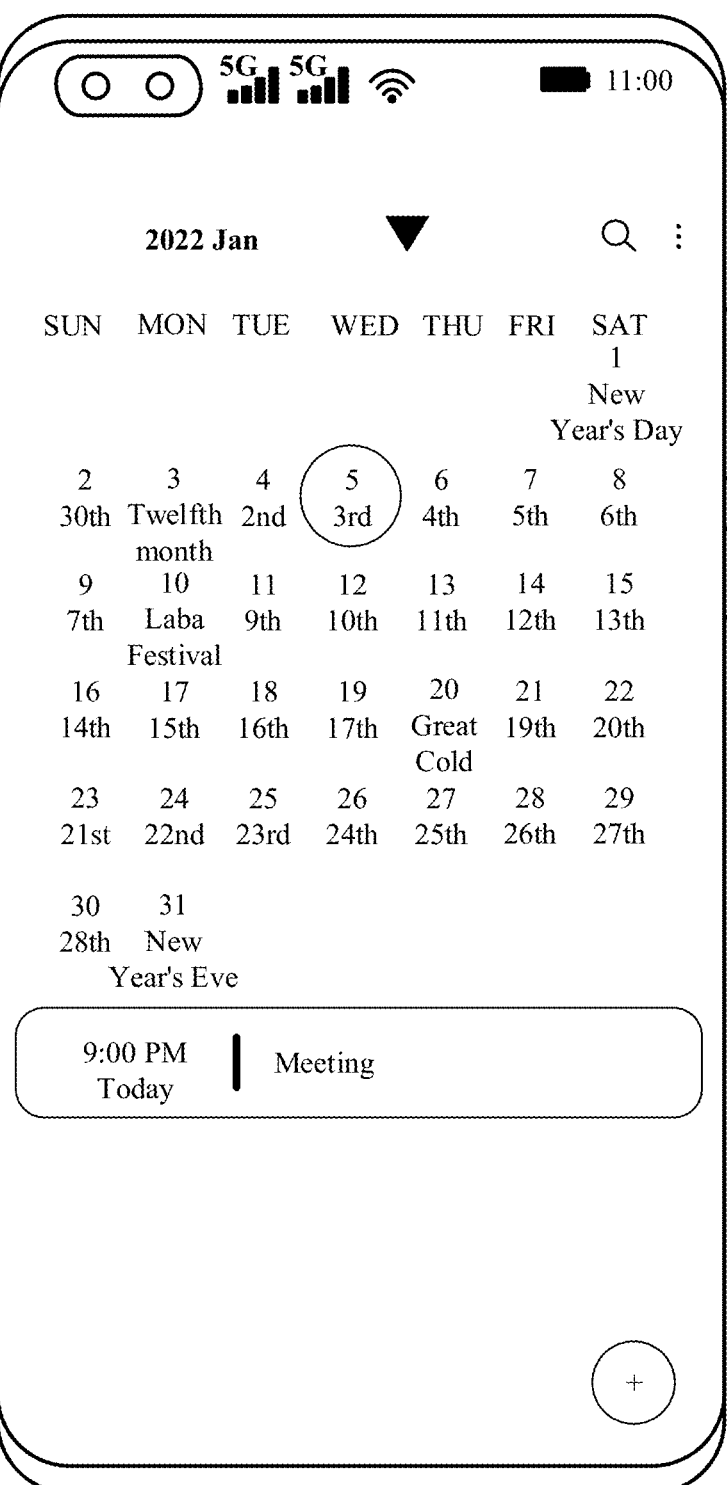
FIG. 7b(1)

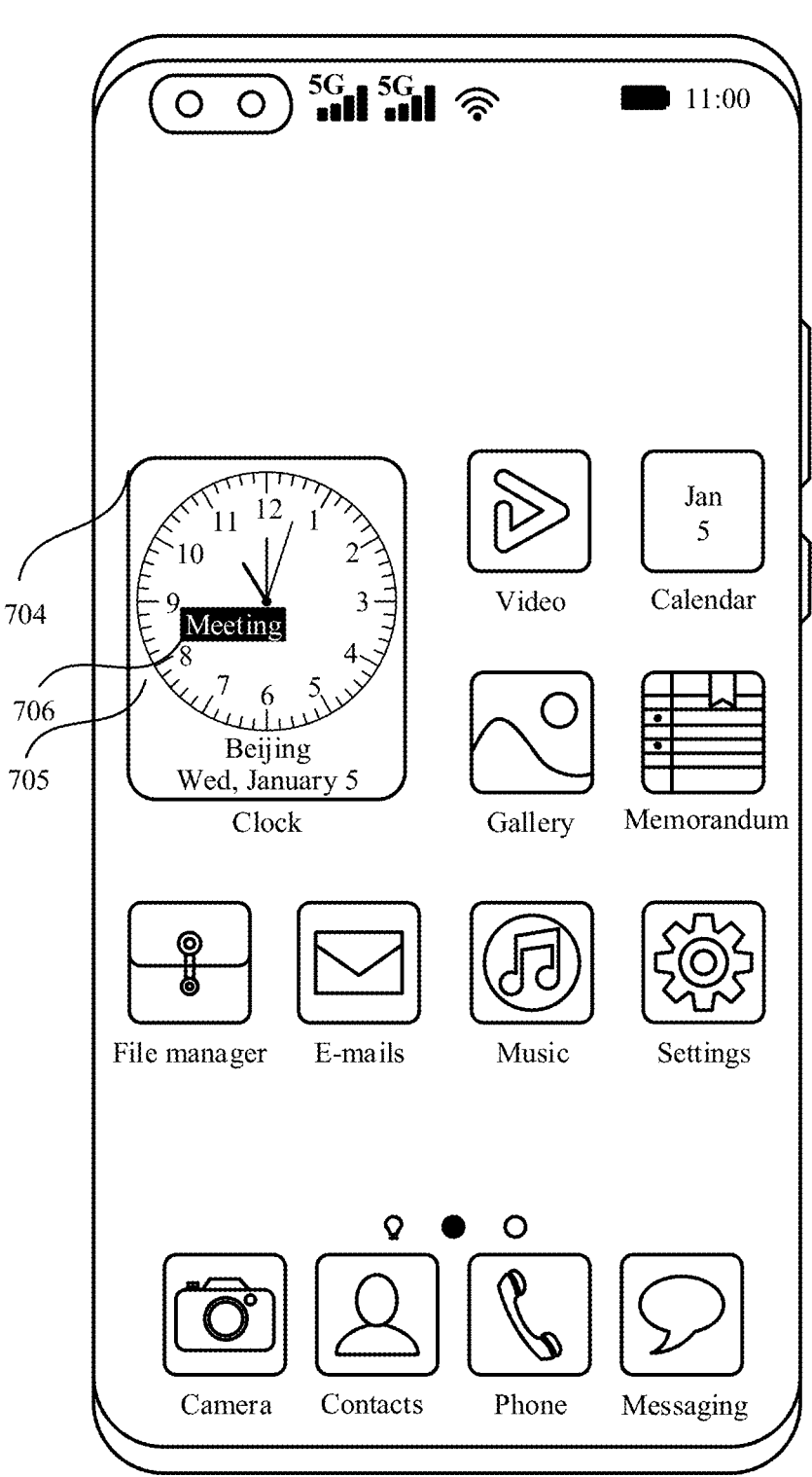
FIG. 7b(2)

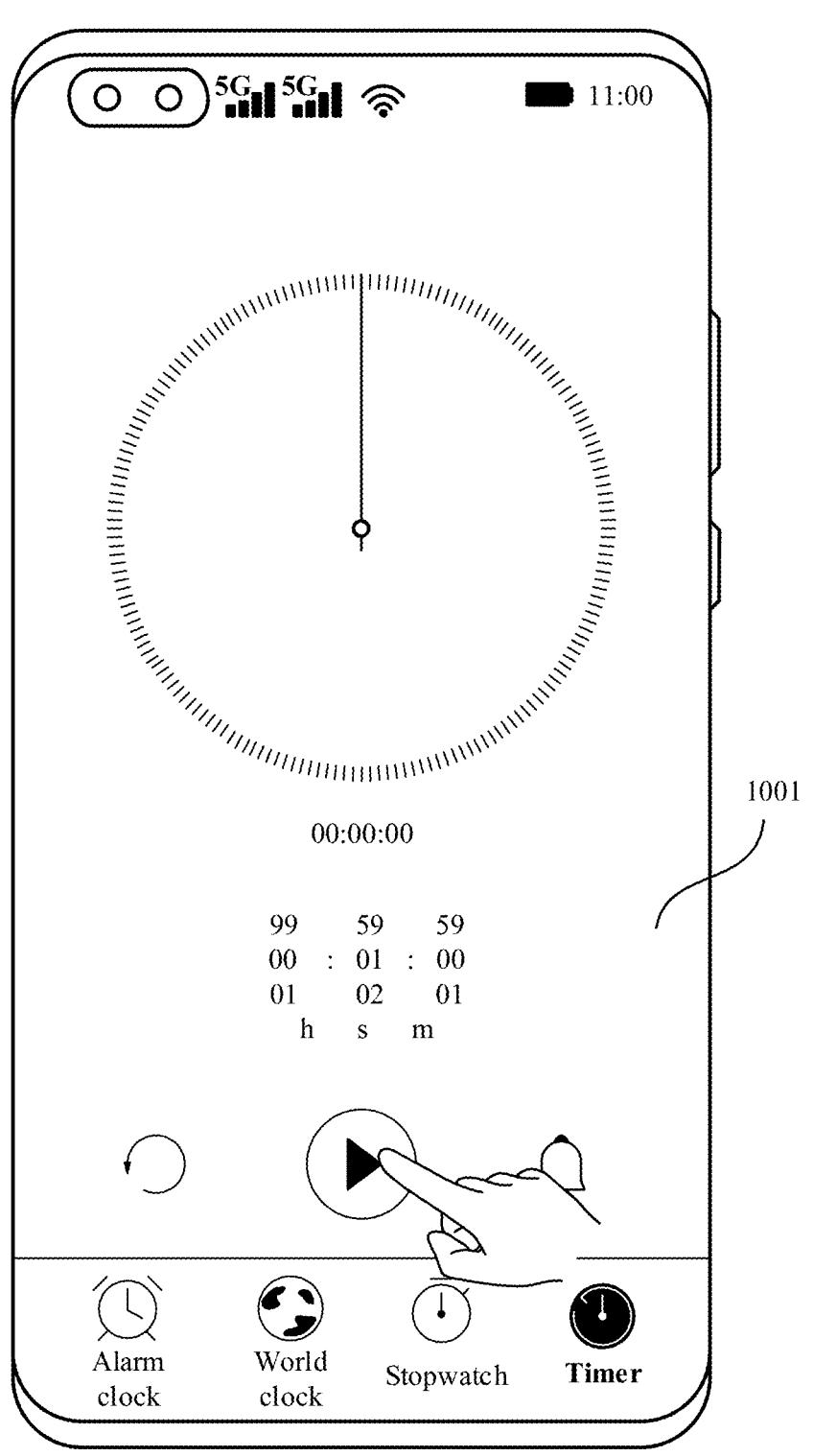
FIG. 10a(1)

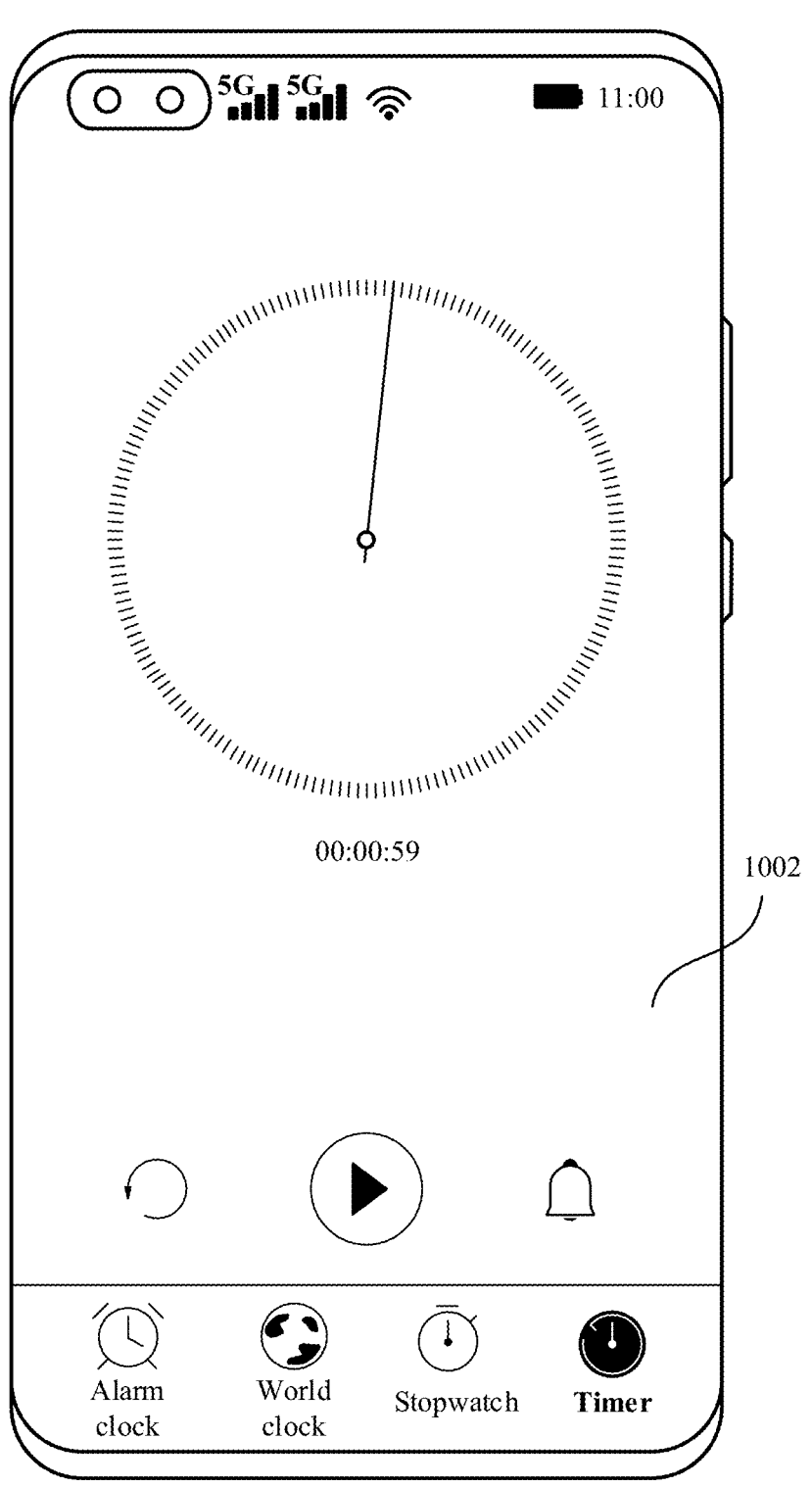
1002
00:00:59
Alarm clock    World clock    Stopwatch    Timer
FIG. 10a(2)

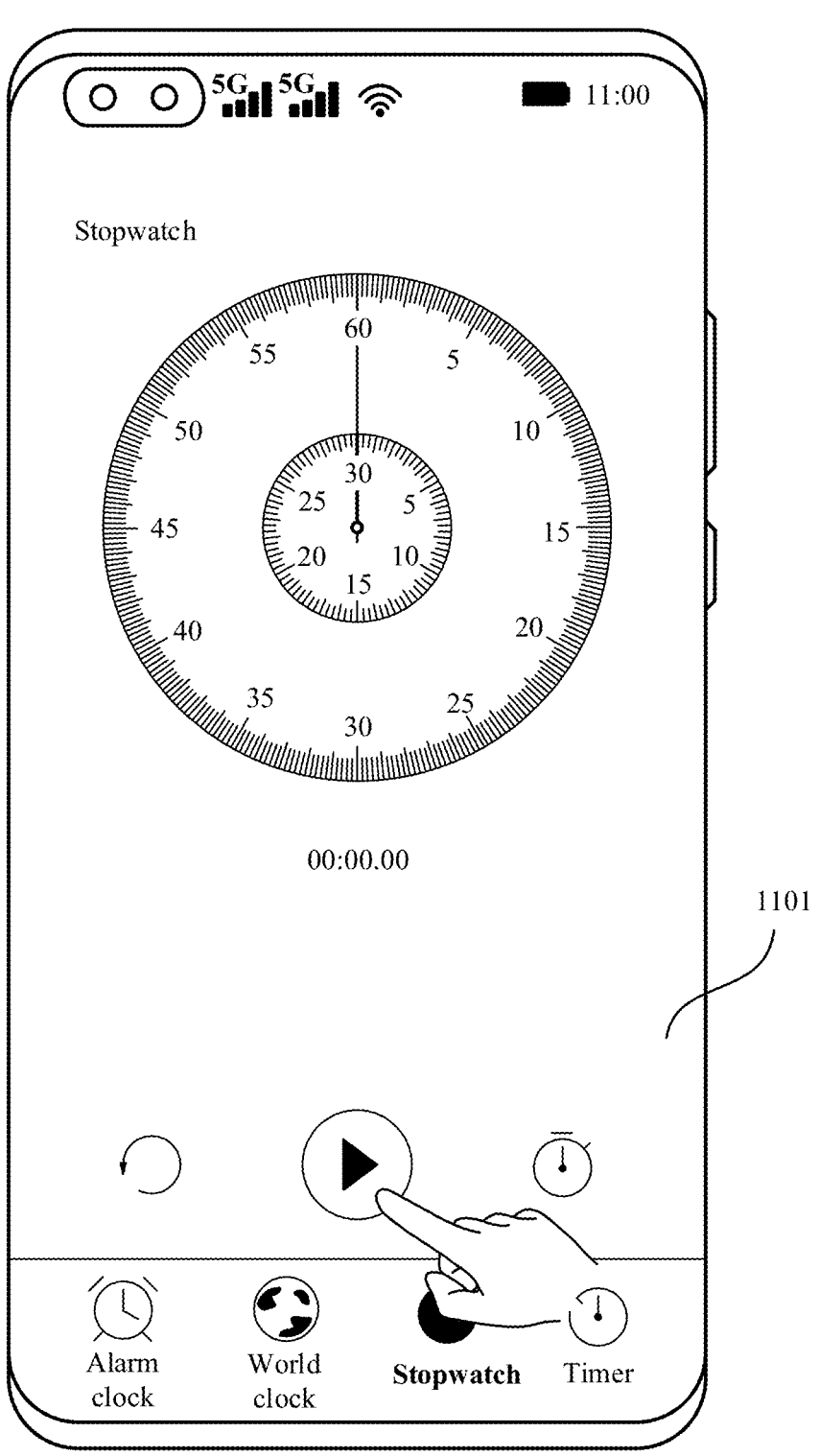
FIG. 11a(1)

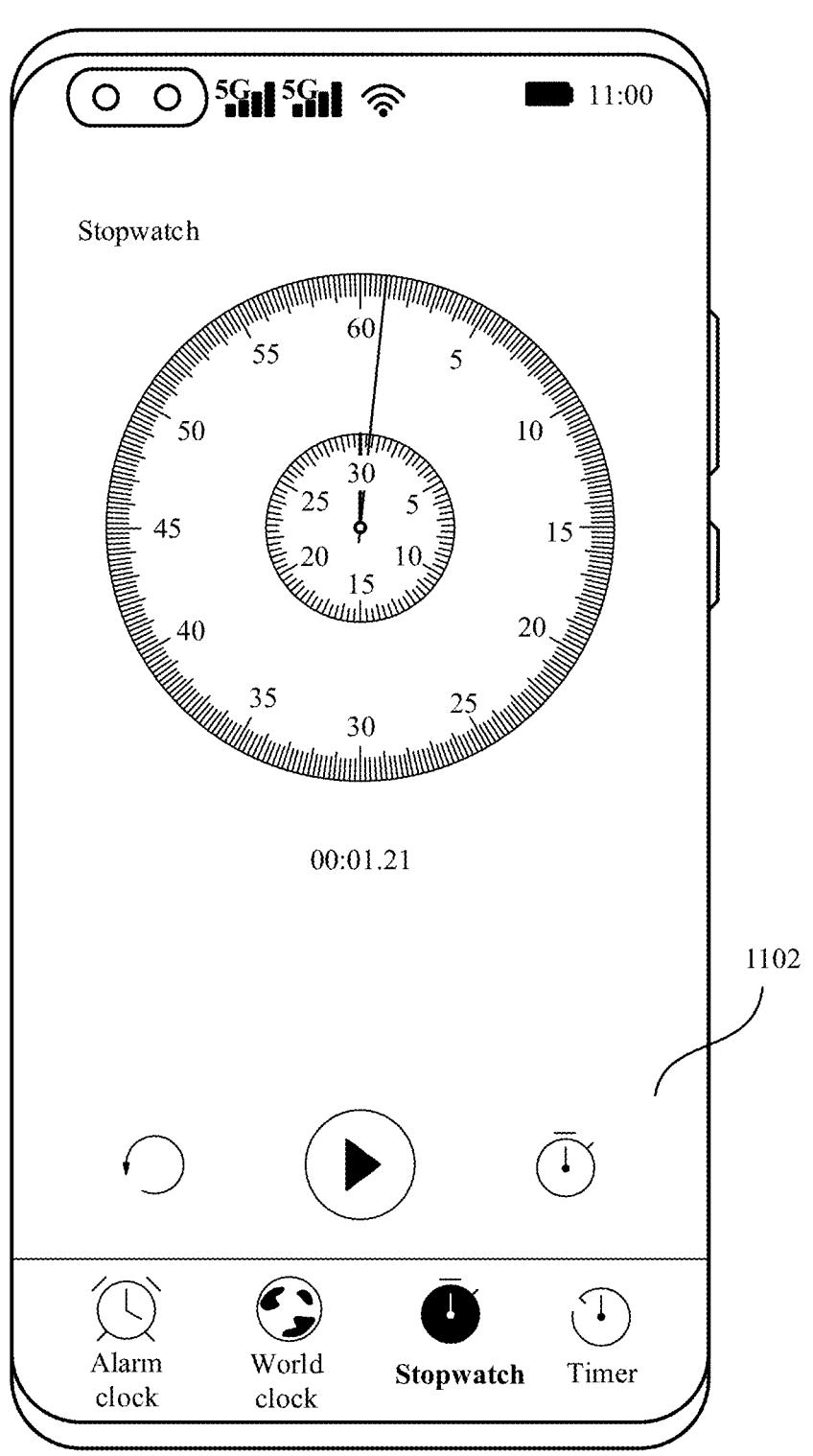
FIG. 11a(2)

DISPLAY METHOD AND ELECTRONIC DEVICE

CROSS-REFERENCE TO RELATED APPLICATIONS

This application is a national stage of International Application No. PCT/CN2022/143543, filed on Dec. 29, 2022, which claims priority to Chinese Patent Application No. 202210120620.3, filed on Feb. 9, 2022. The disclosures of both of the aforementioned applications are hereby incorporated by reference in their entireties.

TECHNICAL FIELD

This application relates to the field of intelligent terminal technologies, and in particular, to a display method and an electronic device.

BACKGROUND

With rapid development of terminal technologies, electronic devices have become indispensable tools in various aspects of people's daily life. Functions of various application programs of the electronic devices are also gradually improved, providing users with various intelligent services, and bringing great convenience to the users' work and life.

In some scenarios, an electronic device displays desktop cards including some pieces of notification information. For example, clock information is displayed on a clock card, that is, time information is displayed in a dial form, so that a user can know the time information more intuitively.

SUMMARY

Embodiments of this application provide a display method and an electronic device. In the method, in addition to displaying a clock dial on a clock card, an electronic device may also display an icon related to prompt information. A prompt time of the prompt information is within a preset time period from a current time (that is, a time point displayed on the clock dial). In this way, information displayed on the clock card is richer, so that a user can view more information on the clock card, thereby improving use experience of the user.

According to a first aspect, an embodiment of this application provides a display method. The display method includes: An electronic device displays a first interface. A first clock card is displayed in the first interface, a clock dial and a first icon are displayed in an interface of the first clock card, the first icon is related to first prompt information, and the first icon is displayed at a position related to a prompt time on the clock dial; and the prompt time is a time point corresponding to the first prompt information, the prompt time is within a preset time period from a current time, and the current time is a time point displayed on the clock dial. In this way, information displayed on the clock card is richer, so that a user can view more information on the clock card, thereby improving use experience of the user.

The first interface may be any interface in which the electronic device may display the clock card, for example, may be a desktop interface.

The first icon may also be referred to as a first mark, a first identifier, or the like. The first icon may be understood as any icon indicating the first prompt information related to the first icon, and forms of icons related to prompt information of different types are different. The first prompt information may be understood as any prompt information whose prompt time is within the preset time period from the current time.

According to the first aspect, before an electronic device displays a first interface, the display method further includes: The electronic device creates the first prompt information in response to a received first operation.

When the first prompt information is generated by creation of a user, the first operation is for creating the first prompt information. The first operation may be one operation, or may be a series of operations.

For example, if the first prompt information is alarm clock information, the first operation may be understood as a series of operations for creating the alarm clock information, or may be understood as an operation of clicking a saving option or storing option after finishing editing attribute values (for example, an alarm clock time, an alarm clock repetition situation, and an alarm clock ringtone) related to the alarm clock information.

According to the first aspect or any implementation of the first aspect, before an electronic device displays a first interface, the display method further includes: The electronic device displays the first prompt information in response to a received second operation.

When the first prompt information is generated by automatic updating of an application, the second operation is for displaying the first prompt information. The second operation may be one operation, or may be a series of operations.

For example, if the first prompt information is weather information, the second operation may be understood as an operation of viewing a display interface of a weather application. The operation may be an operation of clicking an option, or may be an operation of clicking a plurality of times to enter the display interface of the weather application.

According to the first aspect or any implementation of the first aspect, the display method further includes: The electronic device displays the first icon in a first style when the prompt time is within a first time period; or the electronic device displays the first icon in a second style when the prompt time is not within the first time period, where the first style is different from the second style. In this way, if a time period within which the prompt time is different, a display style thereof is different, so that the user can clearly know the prompt time related to the prompt information according to a display style of the icon.

According to the first aspect or any implementation of the first aspect, the prompt time is within 24 hours from the current time; and duration of the first time period is 12 hours. In this way, 24 hours are divided into two time periods, and if the time period within which the prompt time is different, the display style thereof is different, so that the user can clearly know the prompt time related to the prompt information according to the display style of the icon, and a problem of confusing the prompt time is avoided.

According to the first aspect or any implementation of the first aspect, the display method further includes: displaying a second icon in the interface of the first clock card when there are a plurality of pieces of prompt information of a same type, where in the plurality of pieces of prompt information of the same type, a prompt time of second prompt information is shortest from the current time, and the second icon is related to the second prompt information. In this way, for the plurality of pieces of prompt information of the same type, the electronic device displays only an icon related to one piece of prompt information closest to the current time on the clock card, to avoid a problem that too many icons are displayed on the clock card and make the user's visual experience poor.

Prompt times of the plurality of pieces of prompt information of the same type mentioned above are all within the preset time period from the current time, and the current time is the time point displayed on the clock dial.

According to the first aspect or any implementation of the first aspect, the display method further includes: displaying, if a type of third prompt information is different from a type of fourth prompt information and a time difference between a prompt time of the third prompt information and a prompt time of the fourth prompt information meets a preset condition, a third icon related to the third prompt information in the interface of the first clock card, where a type priority of the third prompt information is higher than a type priority of the fourth prompt information. In this way, if there is a display conflict problem between prompt information, for example, there is a problem that icons related to the prompt information overlap completely or partially, the electronic device displays only an icon related to one piece of prompt information of a higher type priority on the clock card, to avoid a problem that the icons on the clock card display in an overlapping manner and make the user's visual experience poor.

Both the prompt time of the third prompt information and the prompt time of the fourth prompt information are within the preset time period from the current time, and the current time is the time point displayed on the clock dial.

According to the first aspect or any implementation of the first aspect, the display method further includes: The electronic device displays a second interface when the current time reaches the prompt time of the first prompt information, where a second clock card is displayed in the second interface, and the first icon is not displayed in an interface of the second clock card. In this way, if the current time reaches the prompt time of the prompt information, the electronic device cancels displaying the icon related to the prompt information on the clock card, to ensure display accuracy of the icon related to the prompt information.

According to the first aspect or any implementation of the first aspect, the prompt information includes at least one of the following: alarm clock information, weather information, and schedule information.

According to the first aspect or any implementation of the first aspect, the display method further includes: The electronic device displays a plurality of weather icons in the interface of the first clock card when there are a plurality of pieces of weather information, where the plurality of weather icons are related to the plurality of pieces of weather information. In this way, the electronic device may display the weather icons corresponding to the plurality of pieces of weather information on the clock card, so that the user can clearly know a weather change situation within the preset time period from the current time on the clock card.

Prompt times of the plurality of pieces of weather information mentioned above are all within the preset time period from the current time, and the current time is the time point displayed on the clock dial.

According to the first aspect or any implementation of the first aspect, the display method further includes: The electronic device enables a timing function of a stopwatch in response to a received third operation; and the electronic device displays a third interface in response to a received fourth operation, where a third clock card is displayed in the third interface. and a current timing situation of the stopwatch is displayed in an interface of the third clock card. In this way, during running of the timing function of the stopwatch, the user can view a real-time timing situation of the stopwatch on the clock card, and does not need to open a corresponding stopwatch task interface again for viewing, thereby improving use experience of the user.

The third operation is for enabling the timing function of the stopwatch, and may be, for example, an operation of clicking an enabling option in the stopwatch task interface. The fourth operation is for enabling the electronic device to display the interface including the clock card, and may be, for example, a slide operation.

According to the first aspect or any implementation of the first aspect, after the electronic device displays a third interface in response to a received fourth operation, the display method further includes: The electronic device disables the timing function of the stopwatch in response to a received fifth operation; and the electronic device displays a fourth interface in response to a received sixth operation, where a fourth clock card is displayed in the fourth interface, and the clock dial is displayed in an interface of the fourth clock card. In this way, during running of the timing function of the stopwatch, the electronic device displays a stopwatch task interface on the clock card. Once the timing function of the stopwatch is exited, the electronic device resumes displaying the clock dial on the clock card.

The fifth operation is for exiting the timing function of the stopwatch, and may be, for example, an operation of clicking a reset option in the stopwatch task interface. The sixth operation is for enabling the electronic device to display the interface including the clock card, and may be, for example, a slide operation.

According to the first aspect or any implementation of the first aspect, the display method further includes: The electronic device enables a timing function of a timer in response to a received seventh operation; and the electronic device displays a fifth interface in response to a received eighth operation, where a fifth clock card is displayed in the fifth interface, and a current timing situation of the timer is displayed in an interface of the fifth clock card. In this way, during running of the timing function of the stopwatch, the user can view a real-time timing situation of the timer on the clock card, and does not need to open a corresponding timer task interface again for viewing, thereby improving use experience of the user.

The seventh operation is for enabling the timing function of the timer, and may be understood as a series of operations, or may be understood as one operation. For example, the seventh operation may be understood as an operation of selecting timing duration and an operation of clicking an enabling option that are executed in the timer task interface and the like, or may be understood as the operation of clicking the enabling option executed in the timer task interface. The eighth operation is for enabling the electronic device to display the interface including the clock card, and may be, for example, a slide operation.

According to the first aspect or any implementation of the first aspect, after the electronic device displays a fifth interface in response to a received seventh operation, the display method further includes: The electronic device displays a sixth interface when the timer ends timing, where a sixth clock card is displayed in the sixth interface, and the clock dial is displayed in an interface of the sixth clock card. In this way, during running of the timing function of the timer, the electronic device displays the timer task interface on the clock card. Once the timing function of the timer is exited, the electronic device resumes displaying the clock dial on the clock card.

According to the first aspect or any implementation of the first aspect, a card color of the first clock card is a first color; and the display method further includes: The electronic device turns on a first mode in response to a received ninth operation; and the electronic device displays a seventh interface in response to a received tenth operation, where a seventh clock card is displayed the seventh interface, a card color of the seventh clock card is a second color, and the first color is different from the second color. In this way, on the clock card, the clock information can be displayed, and a card color can also indicate an on-off state of a mode.

The first mode may be a system mode in a setting application. For example, the first mode may be a system dark color mode in the setting application. For example, the first color is a dark color, and the second color is a light color.

The ninth operation is for turning on the first mode, that is, for setting an on-off state of the first mode to be on. The ninth operation may be, for example, an operation of sliding an on-off option corresponding to the first mode. The tenth operation is for enabling the electronic device to display the interface including the clock card, and may be, for example, a slide operation.

According to the first aspect or any implementation of the first aspect, a card color of the first clock card is a third color; and the display method further includes: displaying an eighth interface in a case of sensing that a sunrise-sunset state changes, where an eighth clock card is displayed in the eighth interface, a card color of the eighth clock card is a fourth color, and the third color is different from the fourth color. In this way, on the clock card, the clock information can be displayed on a clock card, and a card color can also indicate the sunrise-sunset state corresponding to the current time.

For example, the third color is a dark color or a light color, and the fourth color is correspondingly a light color or a dark color.

According to the first aspect or any implementation of the first aspect, before an electronic device displays a first interface, the display method further includes: turning on a second mode in response to a received eleventh operation, where the second mode indicates to display an icon related to prompt information in an interface of a clock card. In this way, the user can flexibly set whether the electronic device turns on a multi-functional dial display mode of the clock card.

The eleventh operation is for turning on the second mode, that is, for setting an on-off state of the second mode to be on. For example, the second mode is the multi-functional dial display mode of the clock card involved in the following embodiments. The eleventh operation may be, for example, an operation of sliding an on-off option corresponding to the multi-functional dial display mode of the clock card.

According to the first aspect or any implementation of the first aspect, that an electronic device displays a first interface includes: The electronic device obtains the first prompt information, and displays the clock dial and the first icon related to the first prompt information in the interface of the first clock card, where the prompt time of the first prompt information is within the preset time period from the current time.

According to the first aspect or any implementation of the first aspect, after an electronic device displays a first interface, the display method further includes: The electronic device obtains fifth prompt information if a database corresponding to the prompt information changes; the electronic device determines sixth prompt information in the fifth prompt information, where a prompt time of the sixth prompt information is within the preset time period from the current time; and the electronic device displays a ninth interface, where a ninth clock card is displayed in the ninth interface, and an icon related to the sixth prompt information is displayed in an interface of the ninth clock card. In this way, if the electronic device obtains prompt information whose prompt time is within the preset time period from the current time, an icon related to the prompt information is displayed on the clock card, to achieve an effect of displaying to the user in time.

The fifth prompt information may be understood as to-be-displayed prompt information is obtained when it is detected or monitored that the database changes, and a prompt time of the prompt information is not necessarily within the preset time period from the current time. The sixth prompt information is prompt information that is selected from the fifth prompt information and whose prompt time is within the preset time period from the current time, which may be displayed on the clock card currently.

According to the first aspect or any implementation of the first aspect, after an electronic device displays a first interface, the display method further includes: The electronic device obtains a prompt time of seventh prompt information; and the electronic device displays a tenth interface if the prompt time of the seventh prompt information is within the preset time period from the current time, where a tenth clock card is displayed in the tenth interface, and an icon related to the seventh prompt information is displayed in an interface of the tenth clock card. In this way, once a prompt time of to-be-displayed prompt information is within the preset time period from the current time, the electronic device displays an icon related to the prompt information on the clock card, to achieve an effect of displaying to the user in time.

The seventh prompt information may be understood as any to-be-displayed prompt information. For example, the electronic device obtains the prompt time of the seventh prompt information regularly or in real time, to determine whether the icon related to the seventh prompt information may be displayed on the clock card currently.

According to the first aspect or any implementation of the first aspect, that an electron displays a first interface includes: The electronic device displays the first interface if there is no stopwatch task and/or timer task currently. In this way, during running of the timing function of the stopwatch or the timing function of the timer, the electronic device displays the corresponding stopwatch task interface or timer task interface on the clock card. Once the corresponding timing function is exited, the electronic device resumes displaying the clock dial on the clock card.

According to the first aspect or any implementation of the first aspect, the clock card includes a standard clock card and a world clock card.

According to a second aspect, an embodiment of this application provides an electronic device. The electronic device includes: one or more processor; a memory; and one or more computer programs, where the one or more computer programs are stored on the memory, and when the computer programs are executed by the one or more processors, the electronic device is enabled to perform the display method according to the first aspect and any of the first aspect.

The second aspect and any implementation of the second aspect respectively correspond to the first aspect and any implementation of the first aspect. For technical effects corresponding to the second aspect and any implementation of the second aspect, reference may be made to technical effects corresponding to the first aspect and any implementation of the first aspect. Details are not described herein again.

According to a third aspect, an embodiment of this application provides a computer-readable storage medium. The computer-readable storage medium includes a computer program, and when the computer program is run on an electronic device, the electronic device is enabled to perform the display method according to the first aspect and any of the first aspect.

The third aspect and any implementation of the third aspect respectively correspond to the first aspect and any implementation of the first aspect. For technical effects corresponding to the third aspect and any implementation of the third aspect, reference may be made to technical effects corresponding to the first aspect and any implementation of the first aspect. Details are not described herein again.

According to a fourth aspect, an embodiment of this application provides a computer-readable storage medium. The computer-readable storage medium includes a computer program, and when the computer program is run on an electronic device, the electronic device is enabled to perform the display method according to the first aspect and any of the first aspect.

The fourth aspect and any implementation of the fourth aspect respectively correspond to the first aspect and any implementation of the first aspect. For technical effects corresponding to the fourth aspect and any implementation of the fourth aspect, reference may be made to technical effects corresponding to the first aspect and any implementation of the first aspect. Details are not described herein again.

According to a fifth aspect, an embodiment of this application provides a computer program product, including a computer program. When the computer program is run on an electronic device, the electronic device is enabled to perform the display method according to the first aspect and any of the first aspect.

The fifth aspect and any implementation of the fifth aspect respectively correspond to the first aspect and any implementation of the first aspect. For technical effects corresponding to the fifth aspect and any implementation of the fifth aspect, reference may be made to technical effects corresponding to the first aspect and any implementation of the first aspect. Details are not described herein again.

BRIEF DESCRIPTION OF DRAWINGS

FIGS. 2a(1)-2a(2) and FIGS. 2b(1)-2b(2) are a schematic exemplary diagrams of an application scenario;

FIGS. 7a(1)-7a(2) and FIGS. 7b(1)-7b(2) are schematic exemplary diagrams of an application scenario;

FIGS. 10a(1)-10a(2) and FIG. 10b are schematic exemplary diagrams of an application scenario;

FIGS. 11a(1)-11a(2) and FIG. 11b are schematic exemplary diagrams of an application scenario;

DESCRIPTION OF EMBODIMENTS

The following clearly and completely describes the technical solutions in embodiments of this application with reference to the accompanying drawings in embodiments of this application. Apparently, the described embodiments are some embodiments of this application rather than all of the embodiments. All other embodiments obtained by a person of ordinary skill in the art based on embodiments of this application without creative efforts shall fall within the protection scope of this application.

The term "and/or" in this specification is only an association relationship for describing associated objects, and represents that three relationships may exist, for example, A and/or B may represent the following three cases: A exists separately, both A and B exist, and B exists separately.

In the specification and claims in embodiments of this application, the terms "first", "second", "third", "fourth", and so on are intended to distinguish between different objects but do not indicate a particular order of the objects. For example, a first target object, a second target object, and the like are used to distinguish between different target objects, but are not used to describe a particular order of target objects.

In embodiments of this application, the word "exemplary" or "for example" is used to represent giving an example, an illustration, or a description. Any embodiment or design scheme described as an "exemplary" or "for example" in embodiments of this application should not be explained as being more preferred or having more advantages than another embodiment or design scheme. Exactly, use of the term such as "exemplary" or "for example" is intended to present a related concept in a specific manner.

In the description of embodiments of this application, "plurality of" means two or more unless otherwise described. For example, a plurality of processing units means two or more processing units. A plurality of systems means two or more systems.

In an application scenario, a card window is displayed in a main interface (which may be referred to as a desktop or a desktop interface) of a mobile phone, and clock information is displayed in the card window. The card window is referred to as a clock card for short below. For example, the clock card may be divided into a standard clock card and a world clock card according to a display form. A China standard time (namely, a Beijing time) may be displayed on the standard clock card, and standard times of a plurality of countries may be displayed on the world clock card.

Figure 1:
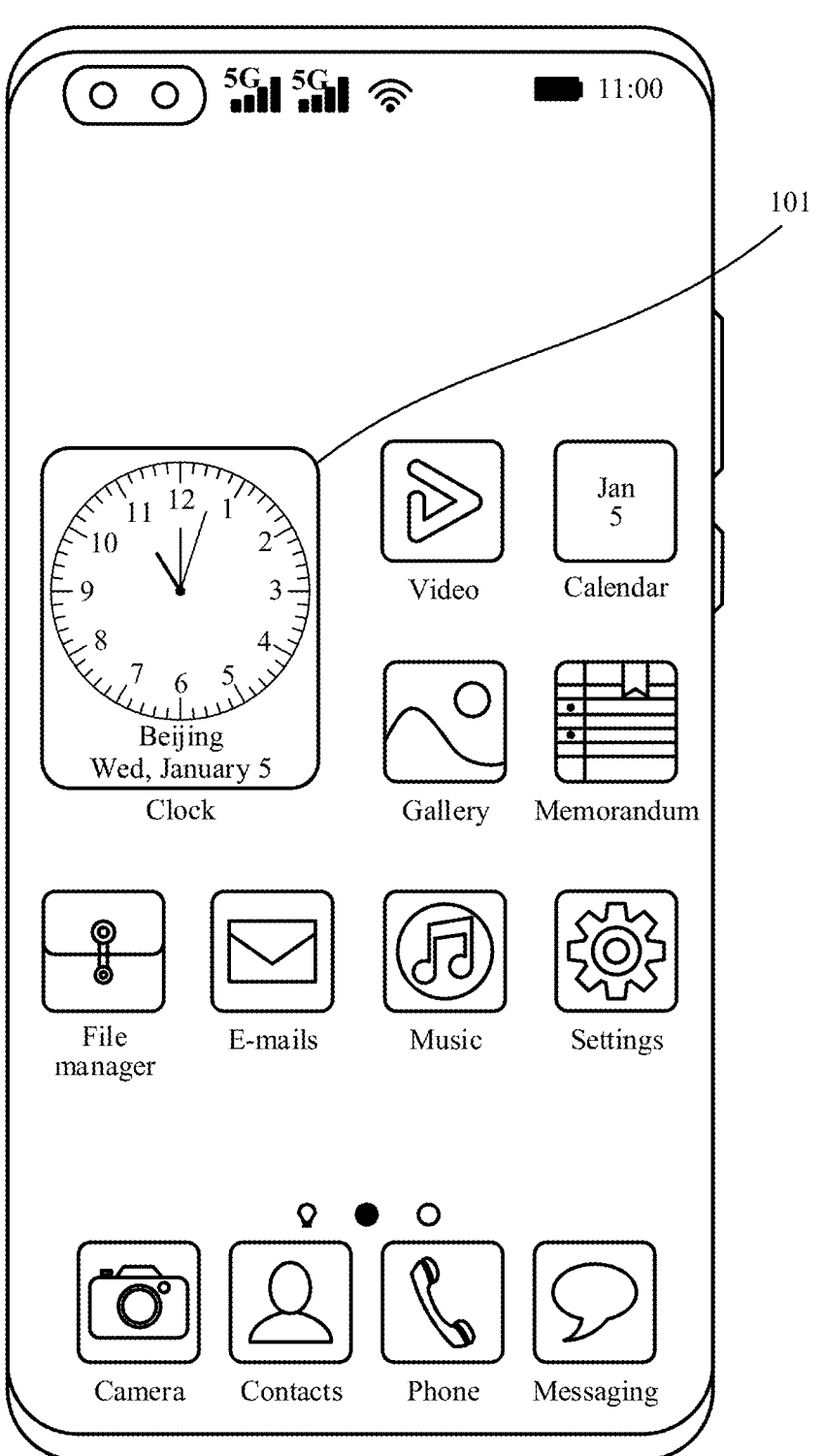
FIGS. 1(1)-1(2) are schematic exemplary diagrams of an application scenario.
Figure 1:
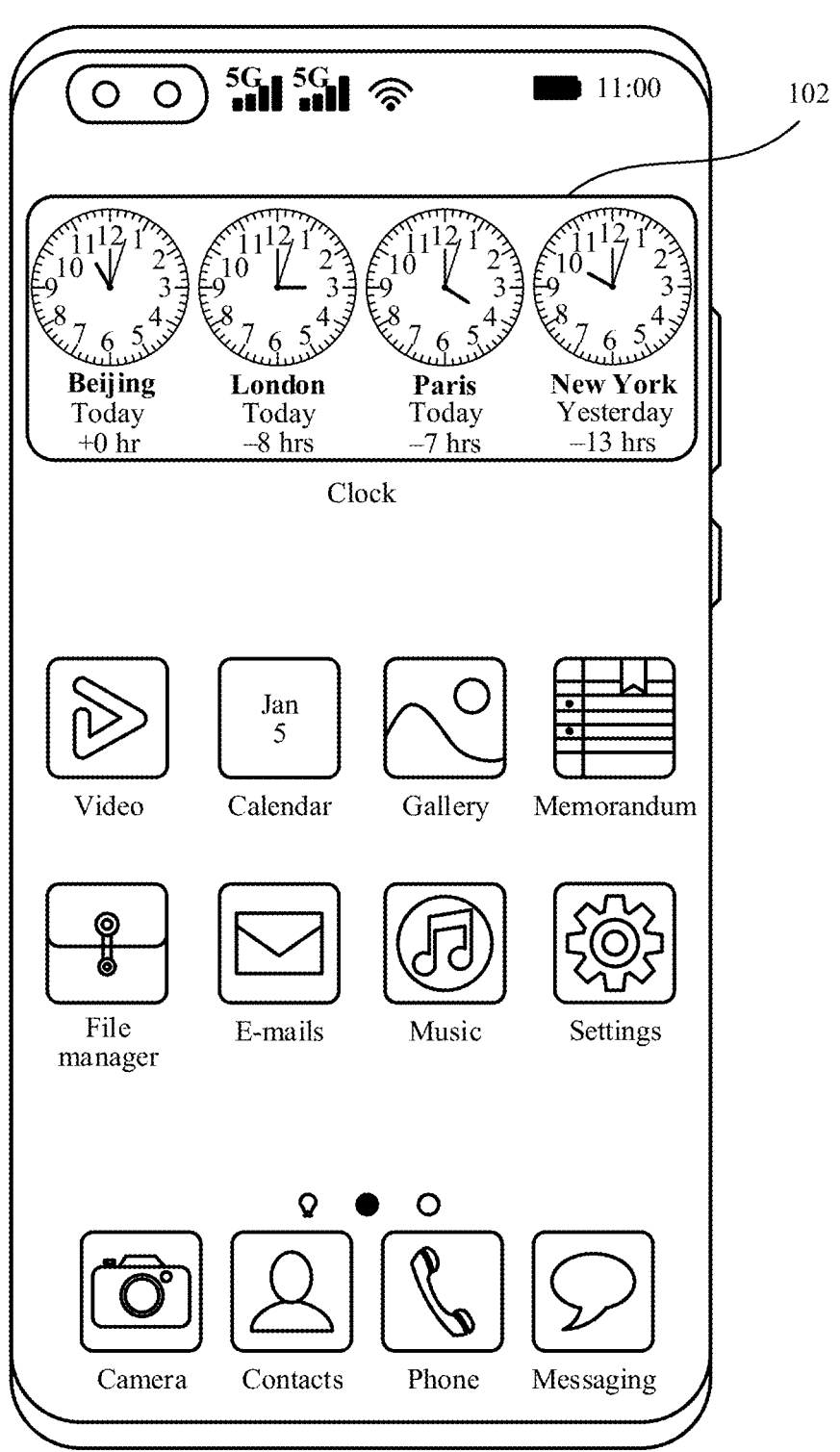

FIG. 1(1) and FIG. 1(2) respectively show an exemplary application scenario. As shown in FIG. 1(1), a standard clock card 101 is displayed on a desktop of a mobile phone, and a Beijing time is displayed on the standard clock card 101 in a dial form. In other words, a current time (or referred to as a current clock) with the Beijing time as a standard is displayed on the standard clock card 101. As shown in FIG. 1(2), a world clock card 102 is displayed on the desktop of the mobile phone, and a plurality of pieces of clock information are displayed on the world clock card 102. In other words, standard times of a plurality of countries are displayed in the dial form, for example, the Beijing time, a London time, a Paris time, and a New York time are respectively displayed in the dial form. In other words, current times (or referred to as current clocks) with the Beijing time, the London time, the Paris time, and the New York time as standards are respectively displayed in the world clock card 102. In this case, only single time information is displayed on the clock card.

FIGS. 2a(1)-2a(2) and FIGS. 2b(1)-2b(2) show an exemplary application scenario. As shown in FIG. 2a(1), a clock card 201 is displayed on a desktop of a mobile phone. The clock card 201 is a standard clock card, and a current Beijing time is displayed in a dial form. A user clicks the clock card 201 to open a clock application, so that the mobile phone displays an interface of the clock application. Assuming that a default interface of the clock application is an alarm clock interface, in this case, after the user clicks the clock card 201 to open the clock application, the mobile phone may display the alarm clock interface, and reference may be made to an interface 202 shown in FIG. 2a(2). As shown in FIG. 2a(2), the clock application includes an option 203, an option 204, an option 205, and an option 206, which are for switching a display interface of the clock application. When the clock application displays the alarm clock interface as shown in the interface 202, the user may perform operations such as creating an alarm clock, modifying the alarm clock, and deleting the alarm clock. For example, if the user clicks the option 205, the mobile phone displays a stopwatch task interface, and in this case, reference may be made to an interface 207 shown in FIG. 2b(1). When the clock application displays the stopwatch task interface as shown in the interface 207, the user may perform operations such as enabling a stopwatch, pausing the stopwatch, and resetting the stopwatch to zero, and in this case, the stopwatch task interface changes correspondingly. For another example, if the user clicks the option 206, the mobile phone displays a timer task interface, and in this case, reference may be made to an interface 208 shown in FIG. 2b(2). When the clock application displays the timer task interface as shown in the interface 208, the user may perform operations such as setting timing duration, enabling timing, pausing the timing, and resetting the timing to zero (or referred to as ending the timing), and in this case, the timer task interface changes correspondingly. In this way, when the user intends to use a stopwatch function or a timer function of the clock application, the corresponding operations may be performed in the stopwatch task interface or the timer task interface of the clock application. During running of the stopwatch function or the timer function, once the user operates the mobile phone to enable the mobile phone to display the desktop, the user cannot view a real-time timing situation of a stopwatch or a timer. In this case, if the user intends to view a current timing situation of the stopwatch or the timer, the user needs to open the corresponding stopwatch task interface or timer task interface again for viewing, causing poor use experience of the user.

Figure 3:
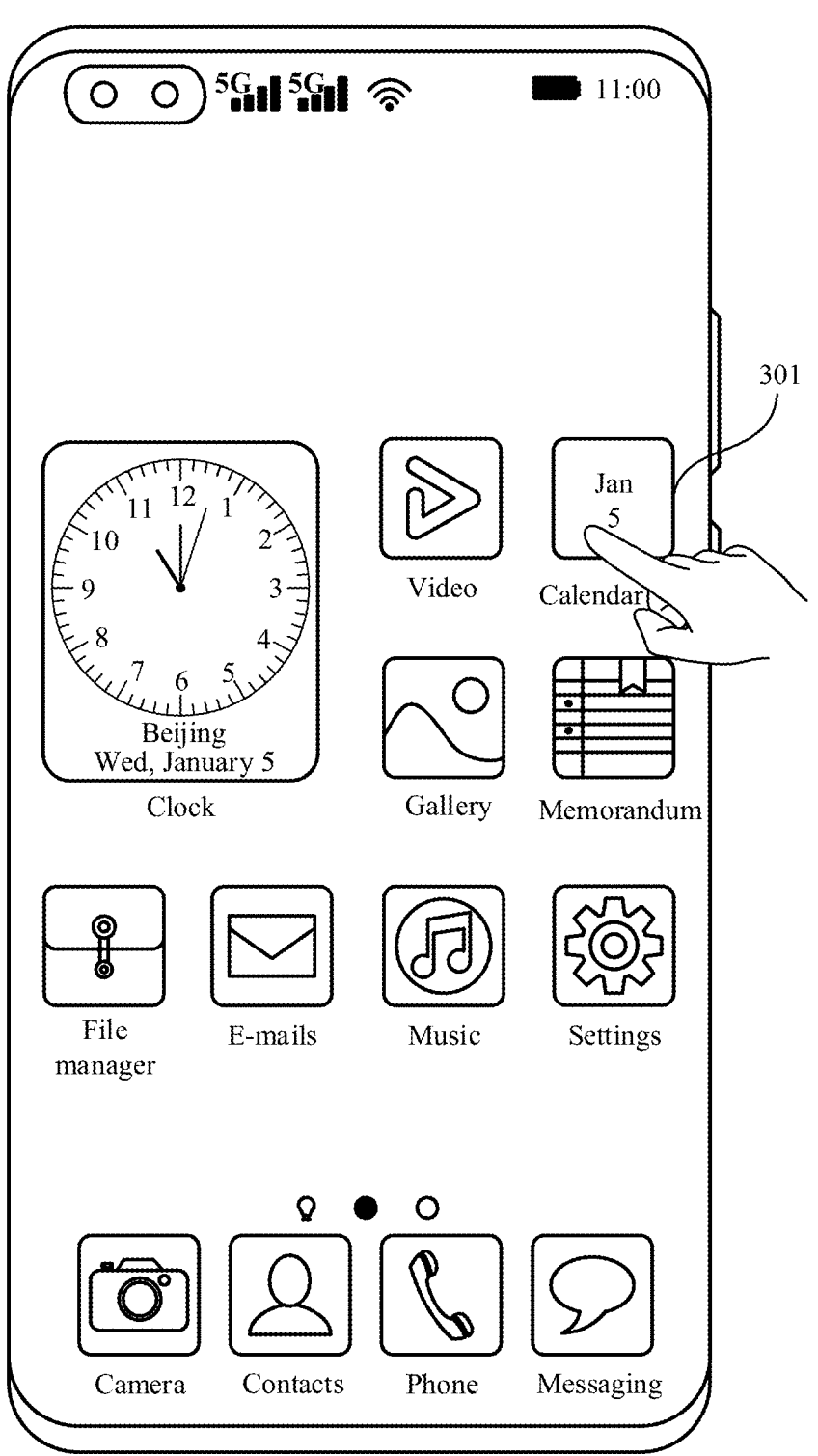
FIGS. 3(1)-3(2) are schematic exemplary diagrams of an application scenario.
Figure 3:
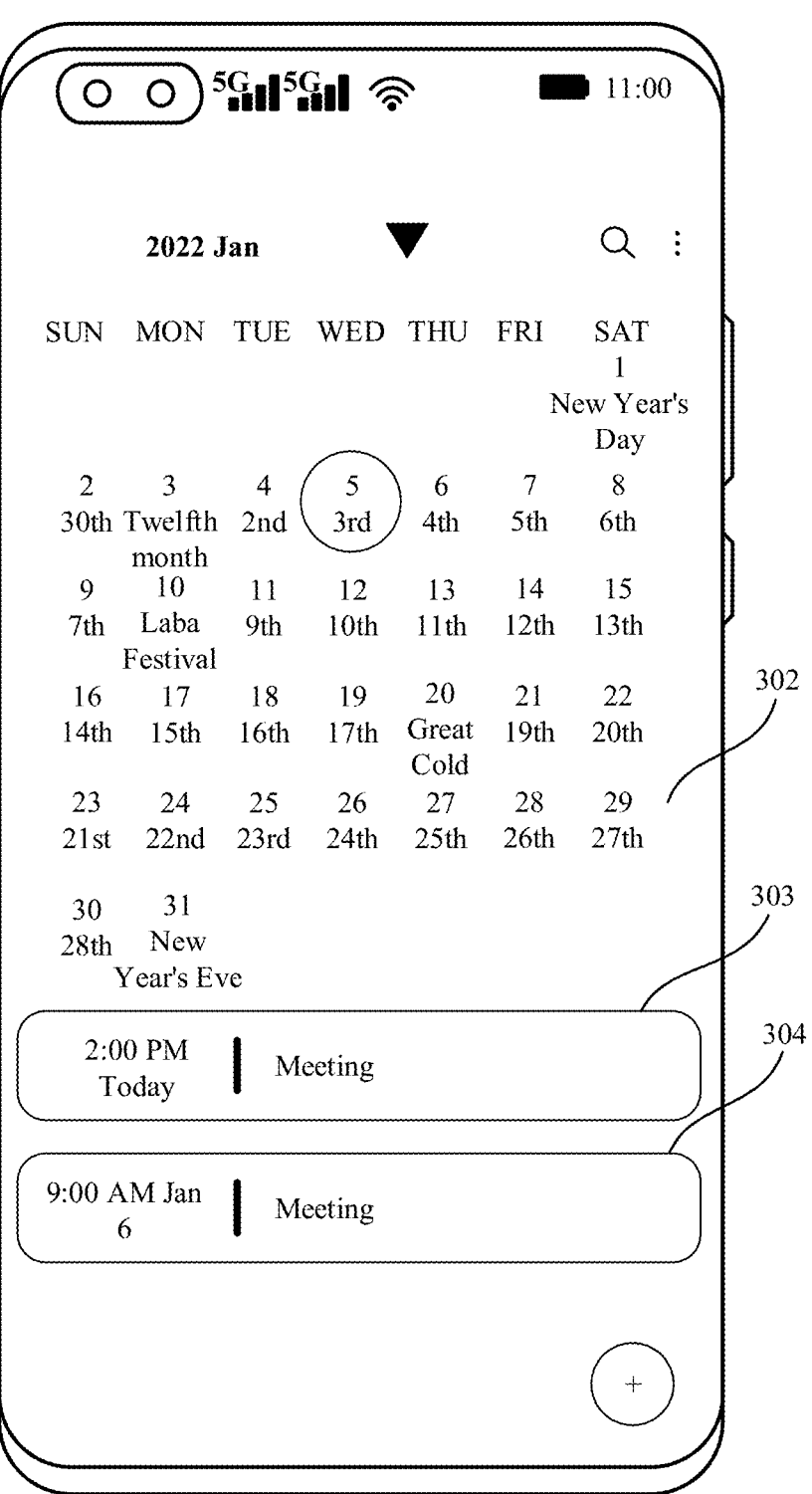

FIGS. 3(1)-3(2) show an exemplary application scenario. As shown in FIG. 3(1), a clock card is displayed on a desktop of a mobile phone. The clock card is a standard clock card, and a current Beijing time is displayed in a dial form. In addition, an icon 301 of a calendar application is also displayed on the desktop of the mobile phone. A user clicks the icon 301 to open the calendar application, and the mobile phone displays an interface of the calendar application in response to a user operation. In this case, reference may be made to an interface 302 shown in FIG. 3(2). In the interface of the calendar application, in addition to displayed calendar information, schedule information may also be displayed. When the clock application displays the interface of the calendar application as shown in the interface 302, the user may perform operations such as creating a schedule, modifying the schedule, and deleting the schedule, and in this case, the interface of the calendar application changes correspondingly. Refer to FIG. 3(2). Schedule information 303 and schedule information 304 are displayed in the interface 302. Therefore, if the user intends to view today's schedule, the user needs to open a schedule application for viewing. If schedule information is displayed at a deep level in the calendar application, the user needs to perform a plurality of times of operations (for example, click operations) after opening the calendar application for viewing. For information configured or recorded in another application, if the user intends to view, the same is true. Once the information is displayed at a deep level in the application, the user needs to perform a plurality of times of operations after opening the application for viewing. The operations are cumbersome and may cause poor use experience of the user.

Moreover, data information configured or recorded in various applications in the mobile phone is independent, and there is no correlation between the data information, so that the data information cannot be simultaneously displayed to the user. For example, time information recorded in the clock application and weather information recorded in a weather application are independent of each other, and cannot be simultaneously displayed to the user. For another example, the time information recorded in the clock application and alarm clock information set in the clock application are also independent of each other, and cannot be simultaneously displayed to the user.

In other words, the user cannot simultaneously view information of a plurality of types in a same interface. For example, the user cannot simultaneously view the time information and the weather information in a clock card interface, and cannot also simultaneously view the time information and the alarm clock information on the clock card.

Figure 4:
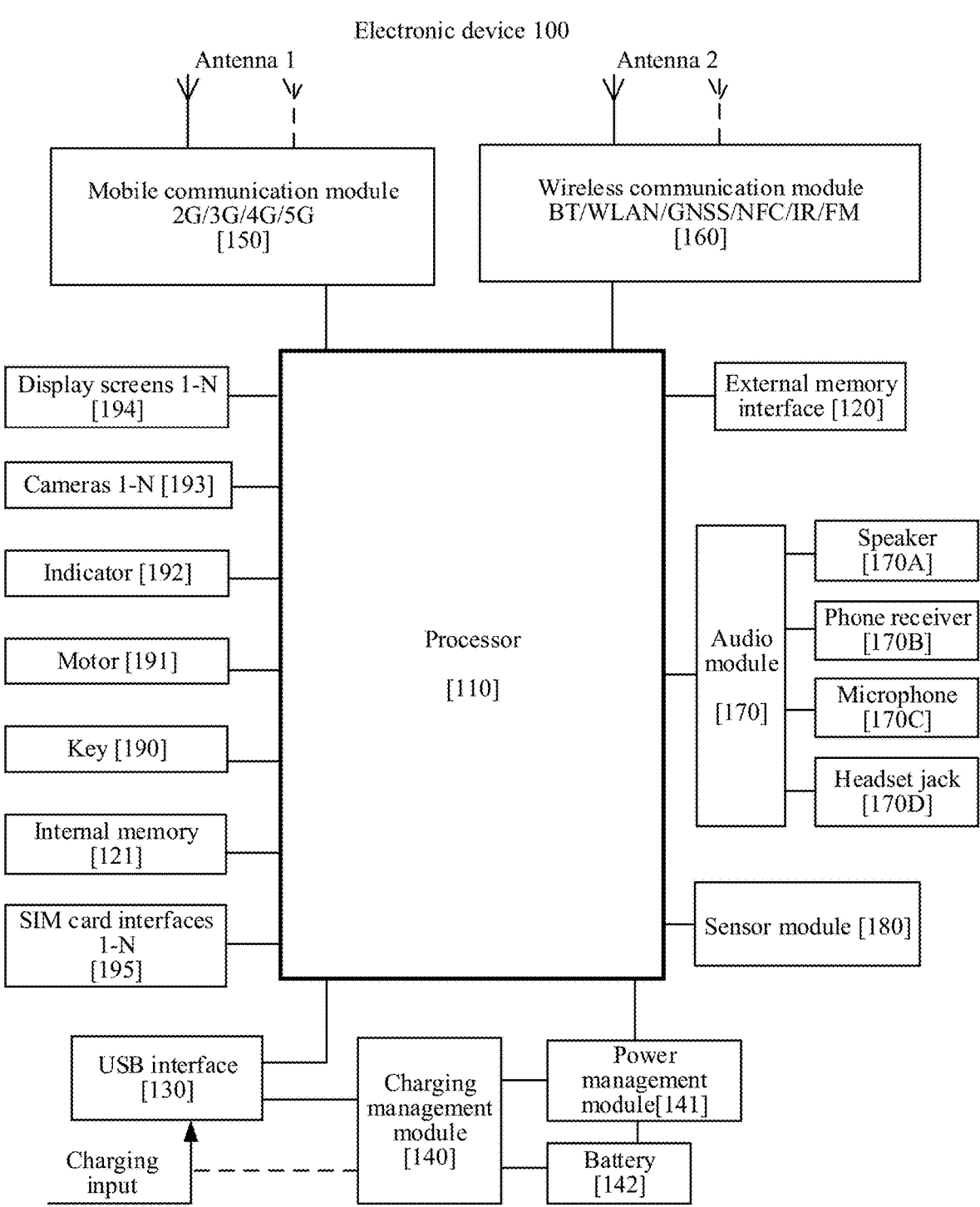
FIG. 4 is a schematic structural diagram of hardware of an electronic device.

FIG. 4 is a schematic structural diagram of an electronic device 100. Optionally, the electronic device 100 may be a terminal, or may be referred to as a terminal device. The terminal may be a device such as a cellular phone or a tablet computer (pad or tablet), which is not limited in this application. It should be noted that, the schematic structural diagram of the electronic device 100 may be applicable to the mobile phone in FIG. 1. It should be understood that the electronic device 100 shown in FIG. 4 is only an example of the electronic device, and the electronic device 100 may have more or fewer parts than those shown in the figure, may combine two or more parts, or may have a different part configuration. The components shown in FIG. 4 may be implemented by hardware that includes one or more signal processors and/or application-specific integrated circuits, software, or a combination of hardware and software.

The electronic device 100 may include a processor 110, an external memory interface 120, an internal memory 121, a universal serial bus (USB) interface 130, a charging management module 140, a power management module 141, a battery 142, an antenna 1, an antenna 2, a mobile communication module 150, a wireless communication module 160, an audio module 170, a speaker 170A, a phone receiver 170B, a microphone 170C, a headset jack 170D, a sensor module 180, a key 190, a motor 191, an indicator 192, a camera 193, a display screen 194, a subscriber identity module (SIM) card interface 195, and the like. The sensor module 180 may include a pressure sensor, a gyro sensor, a barometric pressure sensor, a magnetic sensor, an acceleration sensor, a distance sensor, an optical proximity sensor, a fingerprint sensor, a temperature sensor, and a touch sensor, an ambient light sensor, a bone conduction sensor, and the like.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, and/or a neural-network processing unit (NPU). Different processing units may be independent devices, or may be integrated into one or more processors. The processor 110 may be further configured with a memory, to store instructions and data. In some embodiments, the memory in the processor 110 is a cache memory.

The controller may be a nerve center and a command center of the electronic device 100. The controller may generate an operation control signal according to instruction operation code and a time-sequence signal, to implement control of fetching instructions and executing the instructions.

The charging management module 140 is configured to receive charging input from the charger. The charging management module 140 may further supply power to the electronic device by using the power management module 141 while charging the battery 142.

A wireless communication function of the electronic device 100 may be implemented by using the antenna 1, the antenna 2, the mobile communication module 150, the wireless communication module 160, the modem processor, the baseband processor, and the like.

The antenna 1 and the antenna 2 are configured to transmit and receive electromagnetic wave signals. The mobile communication module 150 may provide a solution to wireless communication such as 2G/3G/4G/5G applied to the electronic device 100. In some embodiments, the antenna 1 and the mobile communication module 150 of the electronic device 100 are coupled, and the antenna 2 and the wireless communication module 160 are coupled, so that the electronic device 100 can communicate with a network and another device by using a wireless communication technology.

The electronic device 100 implements a display function by using the GPU, the display screen 194, the application processor, and the like. The GPU is a microprocessor for image processing, and is connected to the display screen 194 and the application processor. The GPU is configured to perform mathematical and geometric calculation, and is configured to render an image. The processor 110 may include one or more GPUs that execute program instructions to generate or change display information.

The display screen 194 is configured to display an image, a video, or the like. The display screen 194 includes a display panel. In some embodiments, the electronic device 100 may include one or N display screens 194, and N is a positive integer greater than 1.

The electronic device 100 may implement a photographing function by using the ISP, the camera 193, the video codec, the GPU, the display screen 194, the application processor, and the like. The camera 193 is configured to capture a still image or a video. In some embodiments, the electronic device 100 may include one or N cameras 193, and N is a positive integer greater than 1.

The digital signal processor is configured to process a digital signal, and may further process another digital signal in addition to a digital image signal. For example, when the electronic device 100 performs frequency selection, the digital signal processor is configured to perform Fourier transform and the like on frequency energy.

The video codec is configured to compress or decompress a digital video. The electronic device 100 may support one or more video codecs. In this way, the electronic device 100 may play or record videos in a plurality of encoding formats.

The external memory interface 120 may be configured to be connected to an external storage card such as a micro SD card, to expand a storage capability of the electronic device 100. The external storage card communicates with the processor 110 by using the external memory interface 120, to implement a data storage function, for example, storing a file such as a music or a video in the external storage card.

The internal memory 121 may be configured to store computer-executable program code. The executable program code includes instructions. The processor 110 runs the instructions stored in the internal memory 121, to implement various functional applications and data processing of the electronic device 100, so that the electronic device 100 implements the display method in embodiments of this application. The internal memory 121 may include a program storage area and a data storage area. The program storage area may store an operating system, an application program required by at least one function (for example, a sound playing function or an image playing function), and the like. The data storage area may store data (for example, audio data and an address book) and the like created when the electronic device 100 is used. In addition, the internal memory 121 may include a high-speed random access memory, and may further include a non-volatile memory, for example, at least one disk storage device, a flash memory device, or a universal flash storage (UFS).

The electronic device 100 may implement an audio function, for example, music playback or recording, by using the audio module 170, the speaker 170A, the phone receiver 170B, the microphone 170C, the headset jack 170D, the application processor, and the like.

The audio module 170 is configured to convert digital audio information into analog audio signal output, and is also configured to convert analog audio input into a digital audio signal. The audio module 170 may be further configured to encode and decode an audio signal. In some embodiments, the audio module 170 may be disposed in the processor 110, or some functional modules of the audio module 170 are disposed in the processor 110.

The pressure sensor is configured to sense a pressure signal, and may convert the pressure signal into an electrical signal. In some embodiments, the pressure sensor may be disposed in the display screen 194. The electronic device 100 may further calculate a position of the touch according to a detection signal of the pressure sensor. In some embodiments, the touch operations that are acted at a same touch location but have different touch operation strength may correspond to different operation instructions. For example, when a touch operation whose touch operation strength is less than a first pressure threshold is performed on an SMS message application icon, an instruction of viewing an SMS message is executed. When a touch operation whose touch operation strength is greater than or equal to the first pressure threshold is performed on the SMS message application icon, an instruction of creating an SMS message is executed.

The touch sensor is also referred to as a "touch panel". The touch sensor may be disposed on the display screen 194. The touch sensor and the display screen 194 form a touch-screen, which is also referred to as a "touchscreen". The touch sensor is configured to detect a touch operation performed on or near the touch sensor. The touch sensor may transmit the detected touch operation to the application processor, to determine a touch event type. Visual output related to the touch operation may be provided by using the display screen 194. In some other embodiments, the touch sensor may alternatively be disposed on a surface of the electronic device 100, and is located on a position different from that of the display screen 194.

The key 190 includes a power key (or referred to as a power button), a volume key, and the like. The electronic device 100 may receive key input, and generate key signal input related to user setting and function control of the electronic device 100.

The motor 191 may generate a vibration prompt. The indicator 192 may be an indicator light that may be configured to indicate a charging state and a power change, or may be configured to indicate a message, a missed call, a notification, and the like.

A software system of the electronic device 100 may use a layered architecture, an event-driven architecture, a micro core architecture, a micro service architecture, or a cloud architecture. In this embodiment of this application, the software structure of the electronic device 100 is illustrated by using an Android system with a layered architecture as an example.

Figure 5:
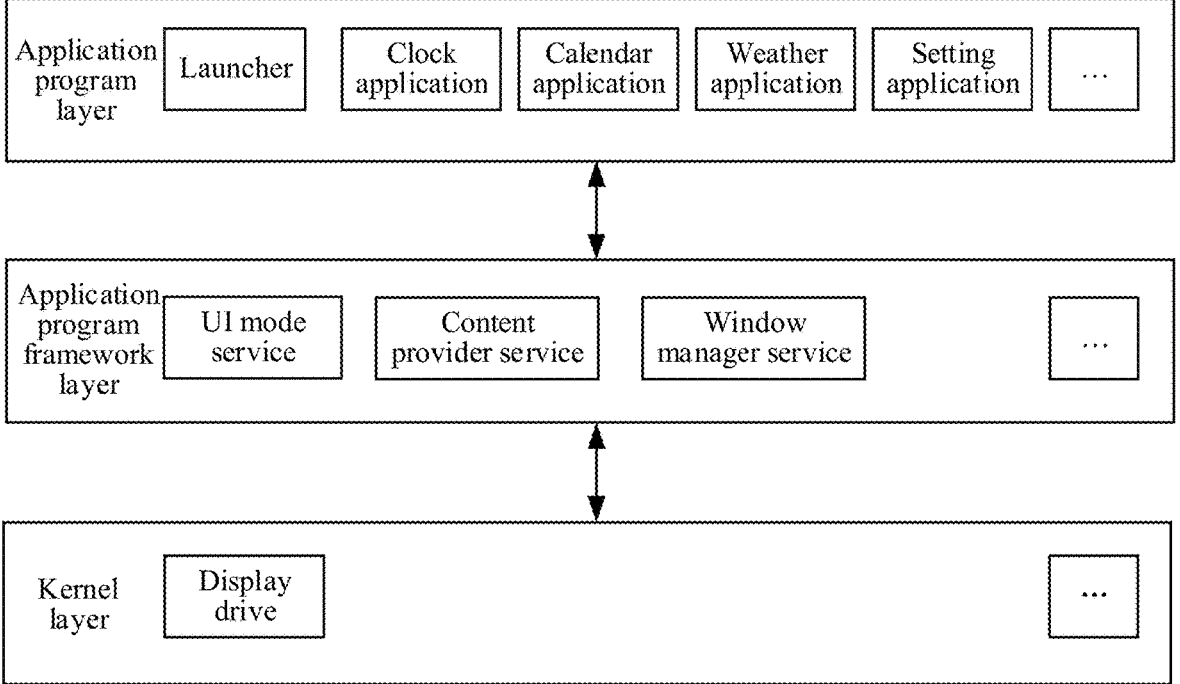
FIG. 5 is a schematic structural diagram of software of an electronic device.

FIG. 5 is a block diagram of a software structure of an electronic device 100 according to an embodiment of this application.

In a layered architecture of the electronic device 100, software is divided into several layers, and each layer has a clear role and task. The layers communicate with each other through a software interface. In some embodiments, the Android system is divided into three layers that are respectively an application program layer, an application program framework layer, and a kernel layer from top to bottom.

The application program layer may include a series of application program packages.

As shown in FIG. 5, the application program packages may include a launcher, a clock application, a calendar application, a weather application, a setting application, and other application programs.

The launcher is configured to implement display of a desktop interface. The launcher may display a desktop card, for example, the clock card mentioned above. For example, the launcher may invoke a card management service to adjust the desktop card, including but not limited to adjusting display content and a display form of the desktop card and the like. The card management service may be configured to implement management of the desktop card, including but not limited to managing the display content and the display form of the desktop card and the like. Optionally, the card management service may be an application program parallel to the launcher, or may belong to the launcher, for example, a tool or a process in the launcher, which is not limited in this embodiment.

The clock application is configured to provide clock-related functions, for example, a clock (including standard clock and world clock) display function, an alarm clock function, a timer function, and a stopwatch function.

The calendar application is configured to provide a calendar display function, a schedule management function, and the like.

The weather application is configured to provide a weather display function.

The setting application may be configured to implement on-off settings of related functions or modes. For example, the setting application may implement an on-off setting of a multi-functional dial display mode of the clock card.

The application program framework layer provides an application programming interface (API) and a programming framework for an application program at the application program layer. The application program framework layer includes some predefined functions.

As shown in FIG. 5, the application program framework layer may include a UI (user interface) mode service, a window manager service (WMS), a content provider service, and the like.

The UI mode service is configured to manage a user interface display mode. In this embodiment, the UI mode service may obtain or sense a daily sunrise-sunset time.

The window manager service is configured to manage a window program. The window manager service may obtain a size of a display screen, determine whether there is a status bar, lock the screen, capture the screen, and the like. In this embodiment, the window manager service implements creation and updating of the clock card.

The content provider service is configured to store and obtain data and make the data accessible to an application program. The data may include a video, an image, an audio, calls made and answered, a browsing history and bookmarks, an address book, and the like.

The kernel layer is a layer between hardware and software. The kernel layer includes at least a display drive, a camera drive, an audio drive, and a sensor drive. The hardware may include a camera, a display screen, a microphone, a processor, a memory, and the like.

It may be understood that the layers in the software structure shown in FIG. 5 and the components included in each layer do not constitute a specific limitation on the electronic device 100. In other embodiments of this application, the electronic device 100 may include more or fewer layers than shown in the figure, and each layer may include more or fewer components, which is not limited in this application.

It may be understood that to implement the display method in this application, the electronic device includes corresponding hardware and/or software modules for performing various functions. Algorithm steps in the examples described with reference to the embodiments disclosed in this specification can be implemented by hardware or a combination of hardware and computer software in this application. Whether a function is performed by hardware or hardware driven by computer software depends on particular applications and design constraints of the technical solutions. A person of skill in the art may use different methods to implement the described functions with reference to embodiments for each particular application, but it should not be considered that the implementation goes beyond the scope of this application.

An embodiment of this application provides a display method. Specifically, in an interface of a clock card, an electronic device (such as a mobile phone) may display a clock dial and display a current clock (or referred to as time information, clock information, a current time, or the like) on the clock dial, may also integrate and display icons (or referred to as marks, identifiers, or the like) related to prompt information, for example, alarm clock information, weather information, and schedule information, may also display a timer timing situation, a stopwatch timing situation, and the like, and may also indicate an on-off state of a system dark color mode or a sunrise-sunset state corresponding to the current time by using a card color of the clock card. In this way, display information of the clock card is enriched, so that a user can view the corresponding information on the clock card, thereby improving use experience of the user. The clock card may be a standard clock card, or may be a world clock card.

In this embodiment of this application, the clock card may be displayed on a desktop of the electronic device (such as the mobile phone), or may be displayed in another interface of the electronic device, which is not limited in this example. The display method provided in this application is described in detail below by using an example in which a standard clock card is displayed on a desktop of a mobile phone. An electronic device of another type is not described in this embodiment of this application herein again.

Scenario 1

In a possible application scenario, on a clock card displayed in an interface of a mobile phone, clock information may be displayed, and an icon related to prompt information may also be simultaneously displayed. For example, the prompt information may be one or more of alarm clock information, weather information, schedule information, and the like. The weather information may be understood as weather change information. For example, the icon related to the prompt information may be displayed at a position related to a prompt time. The prompt time may be understood as a time point corresponding to the prompt information. By using the alarm clock information as an example, the prompt time is an alarm clock time; by using the schedule information as an example, the prompt time is a schedule time; and by using the weather information as an example, the prompt time is a weather change time.

The icon related to the prompt information may be displayed at a position that is related to the prompt time and that is out of a clock dial, or may be displayed at a position related to the prompt time on the clock dial. For example, the position related to the prompt time on the clock dial is a position within a preset area range using a dial scale (or an in-dial number) corresponding to the prompt time as a starting point. For example, the position related to the prompt time on the clock dial may be a position that uses the dial scale (or the in-dial number) corresponding to the prompt time as the starting point and has a set length from the starting point along a direction of a line connecting the starting point and a center point of the dial. Descriptions are made below by using an example in which the icon related to the prompt information is displayed at the position related to the prompt time on the clock dial.

Icons related to prompt information of different types are different, and icons related to prompt information of a same type are not necessarily the same. For example, an icon related to the alarm clock information may be different from an icon related to the weather information. By using the schedule information as an example, an icon related to schedule information "meeting" is also different from an icon related to schedule information "airport pickup". In the following, the icon related to the alarm clock information is referred to as an alarm clock icon for short, the icon related to the weather information is referred to as a weather icon for short, and the icon related to the schedule information is referred to as a schedule icon for short. It should be pointed out that the alarm clock icon, the weather icon, and the schedule icon displayed on the clock card in the accompanying drawings are only exemplary forms, which are not limited in this embodiment.

FIGS. 6a(1)-6a(2) show an exemplary application scenario. After a user creates and turns on an alarm clock, for an alarm clock interface of a clock application, reference may be made to an interface shown in FIG. 6a(1). An alarm clock time is 7:30 every day. When the user performs an operation (for example, a slide operation) to enable the mobile phone to display the desktop, for the clock card displayed on the desktop, reference may be made to a clock card 601 shown in FIG. 6a(2). As shown in FIG. 6a(2), in a display interface 602 of the clock card 601, clock information is displayed, and an alarm clock icon 603 is also displayed. The alarm clock icon 603 is displayed at a position related to the alarm clock time on the clock dial, in other words, the alarm clock icon 603 is displayed at a position related to the time "7:30" on the clock dial. In this case, alarm clock information in the interface shown in FIG. 6a(1) may be understood as source information of the alarm clock icon 603, and the time "7:30" included in the source information is a prompt time corresponding to the alarm clock icon 603. Before the user creates or does not turn on the alarm clock, for the clock card displayed on the desktop, reference may be made to a clock card 201 shown in FIG. 2a(1).

FIGS. 6b(1)-6b(2) show an exemplary application scenario. After a user creates and turns on an alarm clock, for an alarm clock interface of a clock application, reference may be made to an interface shown in FIG. 6b(1). An alarm clock time is 19:30 every day. When the user performs an operation (for example, a slide operation) to enable the mobile phone to display the desktop, for the clock card displayed on the desktop, reference may be made to a clock card 604 shown in FIG. 6b(2). As shown in FIG. 6b(2), in a display interface 605 of the clock card 604, clock information is displayed, and an alarm clock icon 606 is also displayed. The alarm clock icon 606 is displayed at a position related to the alarm clock time on the clock dial, in other words, the alarm clock icon 606 is displayed at a position related to the time "19:30" on the clock dial. In this case, alarm clock information in the interface shown in FIG. 6b(1) may be understood as source information of the alarm clock icon 606, and the time "19:30" included in the source information is a prompt time corresponding to the alarm clock icon 606. Before the user creates or does not turn on the alarm clock, for the clock card displayed on the desktop, reference may be made to a clock card 201 shown in FIG. 2*a*(1).

On the dial, the position related to the time "7:30" and the position related to the time "19:30" are the same. Therefore, to distinguish the time points corresponding to the alarm clock icon 603 and the alarm clock icon 606, on the clock dial, the alarm clock icon 603 is displayed in a first style matching the alarm clock information, and the alarm clock icon 606 is displayed in a second style matching the alarm clock information. In this case, reference may be made to (1) in 6*b* and (2) in 6*b*. The first style is different from the second style. For example, a color of the first style is different from a color of the second style. For example, if a time point of alarm clock information (namely, an alarm clock time) is within a first time period, an alarm clock icon is displayed by using the matched first style; otherwise, the alarm clock icon is displayed by using the matched second style. Duration of the first time period (using a 24-hour timing method) is 12 hours. For example, the first time period is 0:00 to 12:00. For another example, the first time period is 8:00 to 20:00. The first time period is not limited in this embodiment. Optionally, the user may set start and end time points of the first time period according to the user's own needs.

It should be pointed out that the time point corresponding to the alarm clock icon displayed on the clock card matches a current time period, that is, the alarm clock time is within the current time period. The current time period may be understood as a period of time from a current moment (or referred to as a current time). For example, the current time period may be 12 hours or 24 hours from the current moment. If the current time period is 12 hours from the current moment, the alarm clock icon may be identified by using a same style, and there is no need to distinguish the alarm clock icon by using a different style. If the current time period is 24 hours from the current moment, there is a need to distinguish the alarm clock icon by using a different style.

It is assumed that the user creates and turns on a plurality of alarm clocks, and a plurality of pieces of alarm clock information all match the current time period, for example, a plurality of alarm clock times are all within 24 hours from the current moment. In this case, on the clock card, alarm clock icons related to the plurality of pieces of alarm clock information may be simultaneously displayed, or only alarm clock icons related to one or more pieces of alarm clock information closest to the current time may be displayed. This is not limited in this embodiment.

Figure 6C:
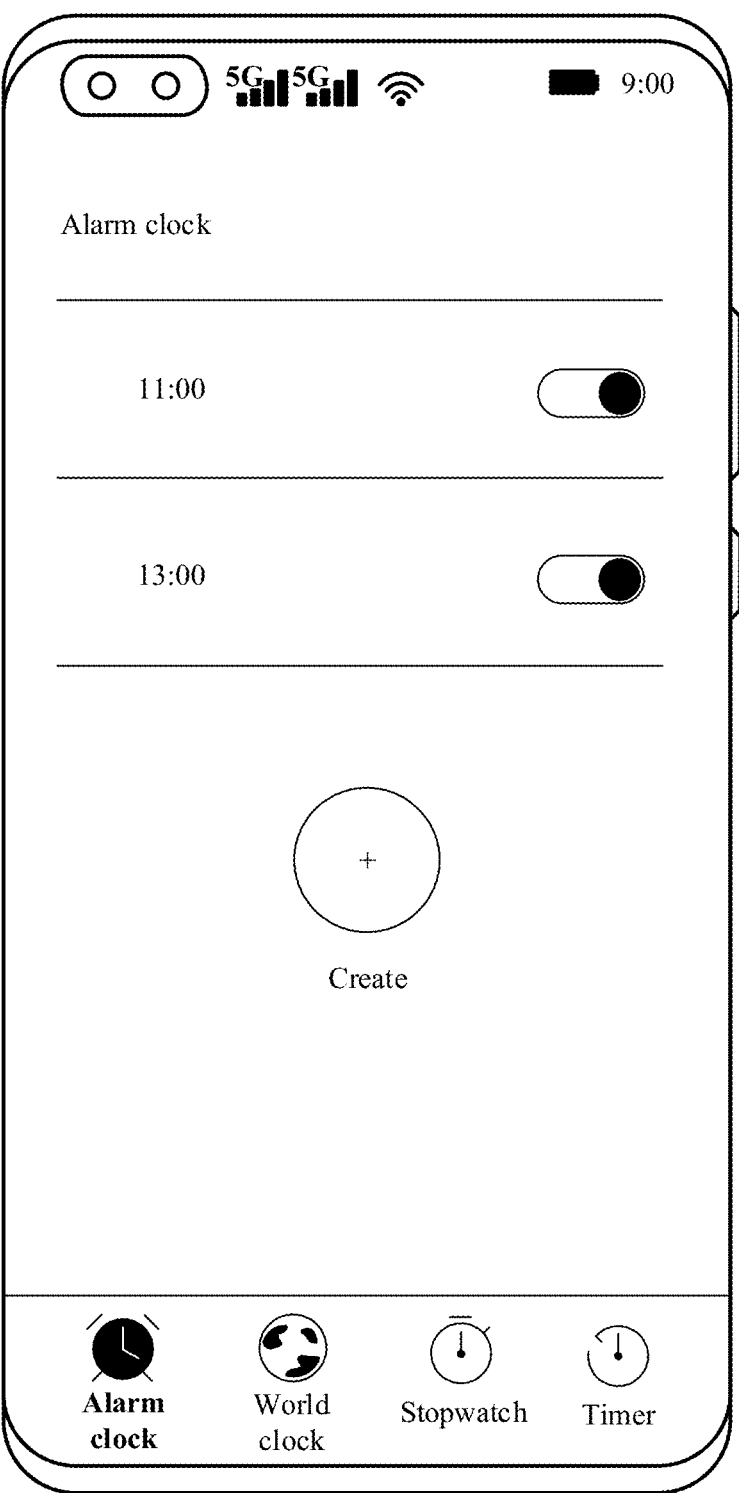
FIGS. 6a(1)-6a(2) to FIGS. 6d(1)-6d(2) are schematic exemplary diagrams of an application scenario.

FIG. 6*c* and FIGS. 6*d*(1)-6*d*(2) show an exemplary application scenario. As shown in FIG. 6*c*, the user creates and turns on two alarm clocks, and alarm clock times are 11:00 and 13:00 respectively. The two alarm clock times are both within 24 hours from the current moment, and alarm clock icons related to two pieces of alarm clock information may be displayed on the clock card to prompt the user. When the user performs an operation (for example, a slide operation) to enable the mobile phone to display the desktop, for the clock card displayed on the desktop, reference may be made to a clock card 607 shown in FIG. 6*d*(1). As shown in FIG. 6*d*(1), in a display interface 608 of the clock card 607, clock information is displayed, and an alarm clock icon 609 is also displayed. The alarm clock icon 609 is displayed at a position related to the alarm clock time "11:00" on the clock dial. In this case, alarm clock information related to the alarm clock icon 609 displayed on the clock card 607 is one piece of alarm clock information closest to the current time. If the current time reaches the alarm clock time "11:00", the alarm clock icon 609 displayed on the clock card 607 disappears, in other words, the alarm clock icon 609 is no longer displayed on the clock card 607, and in this case, reference may be made to a clock card 610 shown in FIG. 6*d*(2). As shown in FIG. 6*d*(2), in a display interface 611 of the clock card 610, the alarm clock icon 609 is no longer displayed, but a new alarm clock icon 612 is displayed. The alarm clock icon 612 is displayed at a position related to the alarm clock time "13:00" on the clock dial. When the alarm clocks are not turned on or when an alarm clock that is currently turned on does not match the current time period, for the clock card displayed on the desktop, reference may be made to a clock card 201 shown in FIG. 2*a*(1), in other words, the alarm clock icon is not displayed on the clock card.

In this way, an alarm clock icon is displayed on a clock card, which enriches display information of the clock card, so that a user can view current alarm clock information on a desktop of a mobile phone, thereby improving use experience of the user. An alarm clock time of the alarm clock information viewed by the user on the desktop of the mobile phone is within a period of time from a current moment, and the alarm clock information is one piece of alarm clock information closest to a current time.

FIGS. 7*a*(1)-7*a*(2) show an exemplary application scenario. After a user creates a schedule, for an interface of a calendar application, reference may be made to an interface shown in FIG. 7*a*(1). A time point of schedule information is 9:00 in the morning on January 6, and content of the schedule information is "meeting". When the user performs an operation (for example, a slide operation) to enable the mobile phone to display the desktop, for the clock card displayed on the desktop, reference may be made to a clock card 701 shown in FIG. 7*a*(2). As shown in FIG. 7*a*(2), in a display interface 702 of the clock card 701, clock information is displayed, and a schedule icon 703 is also displayed. For example, the schedule icon 703 may include a text identifier, for example, a text identifier indicating a short name of schedule content. The schedule icon 703 is displayed at a position related to a schedule time on the clock dial, in other words, the schedule icon 703 is displayed at a position related to the time "9:00" on the clock dial. In this case, the schedule information in the interface shown in FIG. 7*a*(1) may be understood as source information of the schedule icon 703, and the time "9:00" included in the source information is a prompt time corresponding to the schedule icon 703. Before the user creates the schedule, for the clock card displayed on the desktop, reference may be made to a clock card 201 shown in FIG. 2*a*(1).

FIGS. 7*b*(1)-7*b*(2) show an exemplary application scenario. After a user creates a schedule, for an interface of a calendar application, reference may be made to an interface shown in FIG. 7*b*(1). A time point of schedule information is 9:00 in the afternoon today, and content of the schedule information is "meeting". When the user performs an operation (for example, a slide operation) to enable the mobile phone to display the desktop, for the clock card displayed on the desktop, reference may be made to a clock card 704 shown in FIG. 7*b*(2). As shown in FIG. 7*b*(2), in a display interface 705 of the clock card 704, clock information is displayed, and a schedule icon 706 is also displayed. For example, the schedule icon 706 may include a text identifier, for example, a text identifier indicating a short name of schedule content. The schedule icon 706 is displayed at a position related to a schedule time on the clock dial, in other words, the schedule icon 706 is displayed at a position related to a time "21:00" on the clock dial. In this case, the schedule information in the interface shown in FIG. 7b(1) may be understood as source information of the schedule icon 706, and the time "21:00" included in the source information is a prompt time corresponding to the schedule icon 706. Before the user creates the schedule, for the clock card displayed on the desktop, reference may be made to a clock card 201 shown in FIG. 2a(1).

On the dial, the position related to the time "9:00" and the position related to the time "21:00" are the same. Therefore, to distinguish the time points corresponding to the schedule icon 703 and the schedule icon 706, on the clock dial, the schedule icon 703 is displayed in a first style matching the schedule information, and the schedule icon 706 is displayed in a second style matching the schedule information. In this case, reference may be made to (1) in 7b and (2) in 7b. The first style is different from the second style. For example, a color of the first style is different from a color of the second style. For example, if a time point of schedule information is within a first time period, a schedule icon is displayed by using the matched first style; otherwise, the schedule icon is displayed by using the matched second style. Duration of the first time period (using a 24-hour timing method) is 12 hours. For example, the first time period is 0:00 to 12:00. For another example, the first time period is 8:00 to 20:00. The first time period is not limited in this embodiment. Optionally, the user may set start and end time points of the first time period according to the user's own needs.

It should be pointed out that the time point corresponding to the schedule icon displayed on the clock card matches a current time period, that is, the schedule time is within the current time period. The current time period may be understood as a period of time from a current moment. For example, the current time period may be 12 hours or 24 hours from the current moment. If the current time period is 12 hours from the current moment, the schedule icon may be displayed by using a same style, and there is no need to distinguish the schedule icon by using a different style. If the current time period is 24 hours from the current moment, there is a need to distinguish the schedule icon by using a different style.

It is assumed that the user creates a plurality of schedules, and a plurality of pieces of schedule information all match the current time period, for example, a plurality of schedule times are all within 24 hours from the current moment. In this case, on the clock card, schedule icons related to the plurality of pieces of schedule information may be simultaneously displayed, or only schedule icons related to one or more pieces of schedule information closest to a current time may be displayed. This is not limited in this embodiment.

An example of displaying a schedule icon related to only one piece of schedule information closet to the current time on the clock card is similar to an example of displaying only an alarm clock icon related to one piece of alarm clock information closet to the current time on the clock card. Details are not described herein again. An example of canceling displaying a schedule icon on the clock card is also similar to an example of canceling displaying an alarm clock icon on the clock card. Details are also not described herein again.

In this way, a schedule icon is displayed on a clock card, which enriches display information of the clock card, so that a user can view current schedule information (including a schedule time and schedule content) on a desktop of a mobile phone, thereby improving use experience of the user. A schedule time of the schedule information viewed by the user on the desktop of the mobile phone is within a period of time from a current moment, and the schedule information is one piece of schedule information closest to a current time.

Figure 8A:
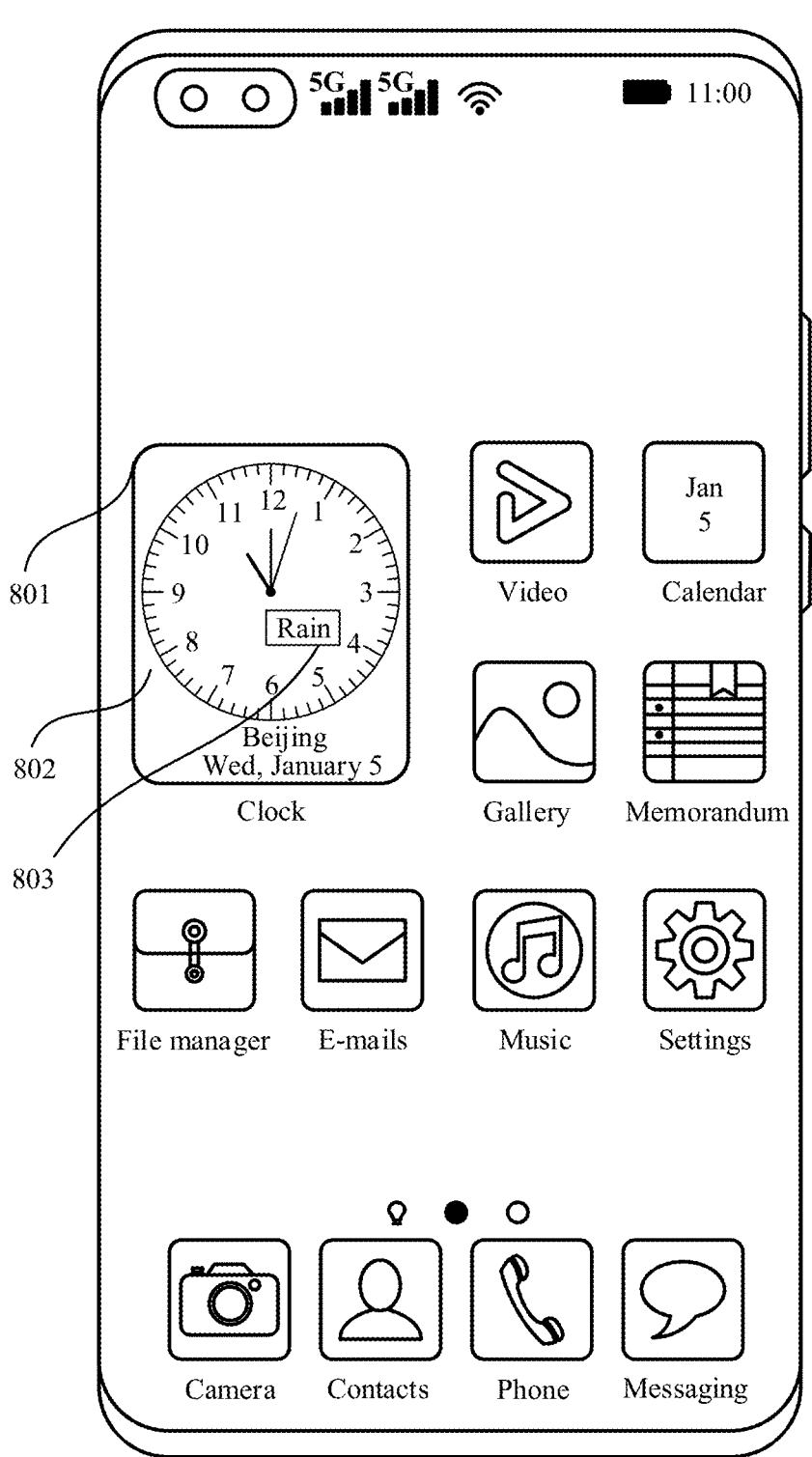
FIG. 8a to FIG. 8c are schematic exemplary diagrams of an application scenario.

FIG. 8a shows an exemplary application scenario. When a weather application updates weather information, if there is a change in the weather information, assuming that the weather application prompts that there is rain at four o'clock in the morning, a weather icon related to corresponding weather information may be displayed on the clock card, and in this case, for the clock card displayed on the desktop of the mobile phone, reference may be made to a clock card 801 shown in FIG. 8a. As shown in FIG. 8a, in a display interface 802 of the clock card 801, clock information is displayed, and a weather icon 803 is also displayed. For example, the weather icon 803 may include a text identifier, for example, a text identifier indicating a short name of weather. The weather icon 803 may be displayed at a position related to a weather change time on the clock dial, in other words, the weather icon 803 is displayed at a position related to the time "4:00" on the clock dial. In this case, weather change information in the interface of the weather application may be understood as source information of the weather icon 803, and the weather change time "4:00" included in the source information is a prompt time corresponding to the weather icon 803. Before the weather application updates the weather information, on the clock card displayed on the desktop, a weather icon related to any piece of weather information may not be displayed (for example, when the weather application indicates that it is sunny all day, a weather icon related to "sunny" is not displayed on the clock card), or a weather icon related to another piece of weather information may be displayed. A specific display situation may depend on an actual weather change.

Figure 8B:
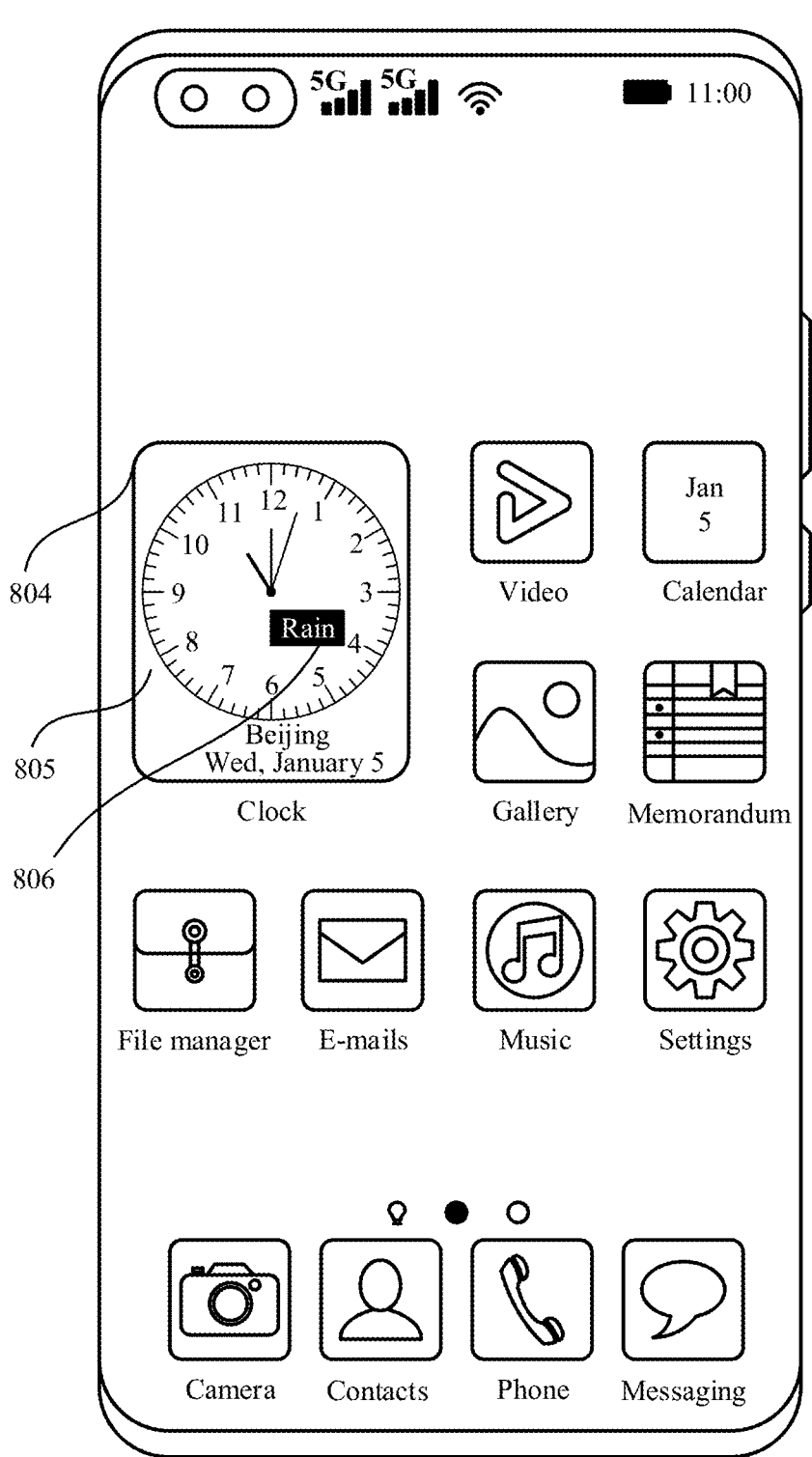

FIG. 8b shows an exemplary application scenario. When a weather application updates weather information, if there is a change in the weather information, assuming that the weather application prompts that there is rain at four o'clock in the afternoon, a weather icon related to corresponding weather information may be displayed on the clock card, and in this case, for the clock card displayed on the desktop of the mobile phone, reference may be made to a clock card 804 shown in FIG. 8b. As shown in FIG. 8b, in a display interface 805 of the clock card 804, clock information is displayed, and a weather icon 806 is also displayed. For example, the weather icon 806 may include a text identifier, for example, a text identifier indicating a short name of weather. The weather icon 806 may be displayed at a position related to a weather change time on the clock dial, in other words, the weather icon 806 is displayed at a position related to the time "16:00" on the clock dial. In this case, weather change information in the interface of the weather application may be understood as source information of the weather icon 803, and the weather change time "16:00" included in the source information is a prompt time corresponding to the weather icon 806. Before the weather application updates the weather information, on the clock card displayed on the desktop, a weather icon related to any piece of weather information may not be displayed (for example, when the weather application indicates that it is sunny all day, a weather icon related to "sunny" is not displayed on the clock card), or a weather icon related to another piece of weather information may be displayed. A specific display situation may depend on an actual weather change.

On the dial, the position related to the time "4:00" and the position related to the time "16:00" are the same. Therefore, to distinguish the time points corresponding to the weather icon 803 and the weather icon 806, on the clock dial, the weather icon 803 is displayed in a first style matching the weather information, and the weather icon 806 is displayed in a second style matching the weather information. In this case, reference may be made to FIG. 8*a* and FIG. 8*b*. The first style is different from the second style. For example, a color of the first style is different from a color of the second style. For example, if a change time of weather information is within a first time period, a weather icon is displayed by using the matched first style; otherwise, the weather icon is displayed by using the matched second style. Duration of the first time period (using a 24-hour timing method) is 12 hours. For example, the first time period is 0:00 to 12:00. For another example, the first time period is 8:00 to 20:00. The first time period is not limited in this embodiment. Optionally, the user may set start and end time points of the first time period according to the user's own needs.

It should be pointed out that the time point corresponding to the weather icon displayed on the clock card matches a current time period, that is, the weather change time is within the current time period. The current time period may be understood as a period of time from a current moment. For example, the current time period may be 12 hours or 24 hours from the current moment. If the current time period is 12 hours from the current moment, the weather icon may be displayed by using a same style, and there is no need to distinguish the weather icon by using a different style. If the current time period is 24 hours from the current moment, there is a need to distinguish the weather icon by using a different style.

It is assumed that a plurality of pieces of weather information all match the current time period, for example, change times of the plurality of pieces of weather information are all within 24 hours from the current moment. In this case, on the clock card, the plurality of pieces of weather information may be simultaneously displayed, or only one or more pieces of weather information closest to a current time may be displayed. This is not limited in this embodiment.

Figure 8C:
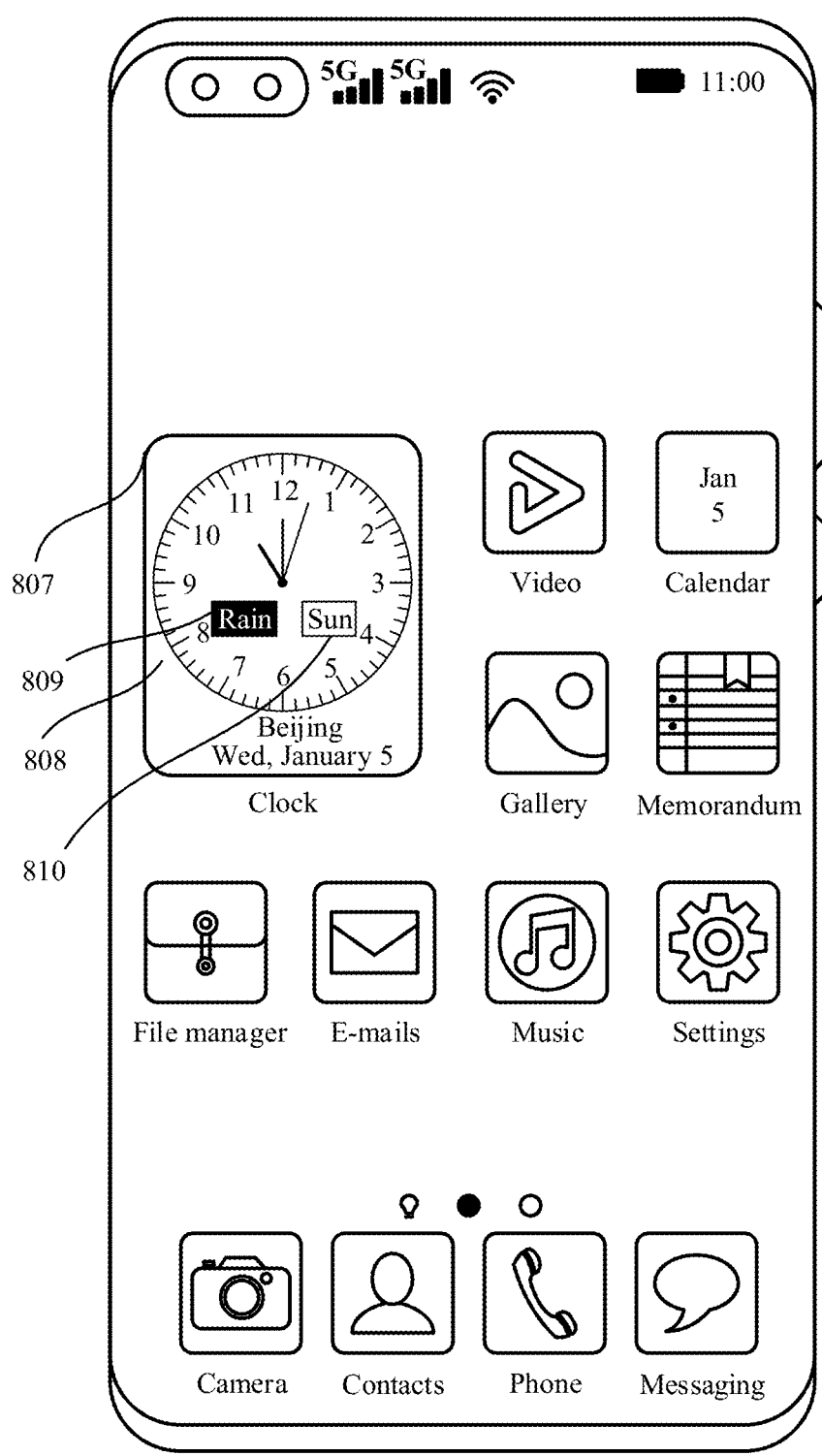

FIG. 8*c* shows an exemplary application scenario. When a weather application updates weather information, if there is a change in the weather information, assuming that there are a plurality of change situations in the weather information, for example, the weather application prompts that there is rain at eight o'clock in the evening and it is clear at four o'clock in the morning next day, corresponding weather information may be displayed on the clock card, and in this case, for the clock card displayed on the desktop of the mobile phone, reference may be made to a clock card 807 shown in FIG. 8*c*. As shown in FIG. 8*c*, in a display interface 808 of the clock card 807, clock information is displayed, and a weather icon 809 and a weather icon 810 are also displayed. For example, the weather icon 809 is displayed at a position related to the time "8:00" on the clock dial in the second style, and the weather icon 810 is displayed at a position related to the time "4:00" on the clock dial in the first style. Before the weather application updates the weather information, on the clock card displayed on the desktop, any piece of weather information may not be displayed (for example, when the weather application indicates that it is sunny all day, corresponding weather information is not displayed on the clock card), or another piece of weather information may be displayed. A specific display situation may depend on an actual weather change.

An example of displaying a weather icon related to only one piece of weather information closet to the current time on the clock card is similar to an example of displaying only an alarm clock icon related to one piece of alarm clock information closet to the current time on the clock card. Details are not described herein again. An example of canceling displaying a weather icon on the clock card is also similar to an example of displaying an alarm clock icon on the clock card. Details are also not described herein again.

In this way, a weather icon is displayed on a clock card, which enriches display information of the clock card, so that a user can view weather information (including a weather change time and a weather change situation) on a desktop of a mobile phone, thereby improving use experience of the user. The weather change time of the weather information viewed by the user on the desktop of the mobile phone is within a period of time from a current moment.

On the clock card displayed on the desktop of the mobile phone, clock information may be displayed, and a plurality of pieces of prompt information in an alarm clock icon, a weather icon, a schedule icon, and the like may also be simultaneously displayed. For example, on the clock card displayed on the desktop of the mobile phone, in addition to the displayed clock information, the alarm clock icon and the weather icon are also simultaneously displayed, or the alarm clock icon and the schedule icon are simultaneously displayed, or the weather icon and the schedule icon are simultaneously displayed, or the alarm clock icon, the weather icon, and the schedule icon are simultaneously displayed. The icons related to the prompt information displayed on the clock card displayed on the desktop of the mobile phone are related to an actual scenario.

Figure 9:
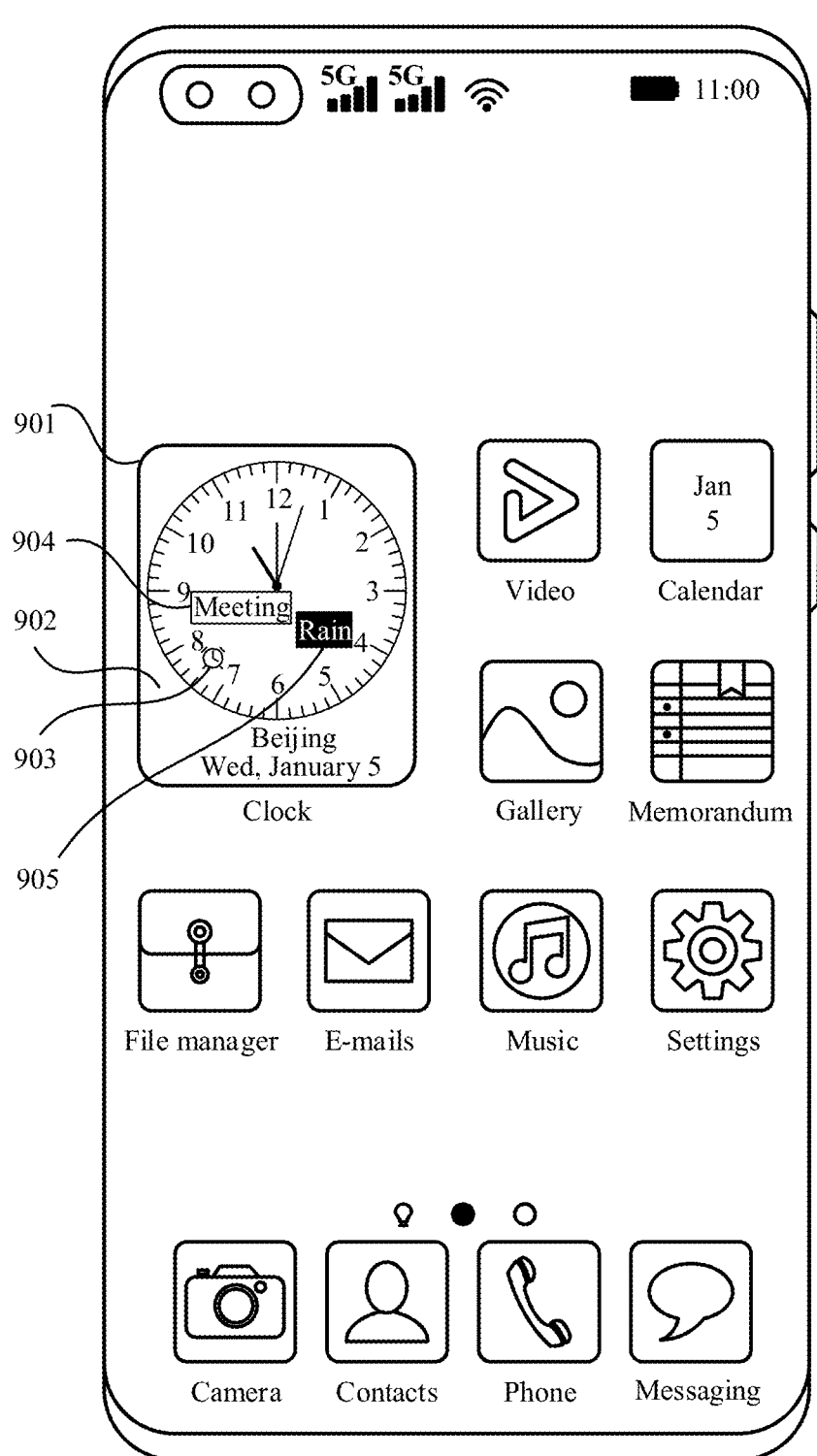
FIG. 9 is a schematic exemplary diagram of an application scenario.

FIG. 9 shows an exemplary application scenario. For example, a current time of the mobile phone is 11:00. Assuming that a weather application prompts that there is rain at four o'clock in the afternoon and a user sets an alarm clock of 7:30 every day and a schedule of a meeting at 9:00 next day, icons respectively related to the weather information, the alarm clock information, and the schedule information may be displayed on the clock card, and in this case, for the clock card displayed on the desktop of the mobile phone, reference may be made to a clock card 901 shown in FIG. 9. As shown in FIG. 9, in a display interface 902 of the clock card 901, clock information is displayed, and an alarm clock icon 903, a schedule icon 904, and a weather icon 905 are also displayed. The alarm clock icon 903 is displayed at a position related to the time "7:30" on the clock dial in a matched first style, the schedule icon 904 is displayed at a position related to the time "9:00" on the clock dial in the matched first style, and the weather icon 905 is displayed at a position related to the time "4:00" on the clock dial in a matched second style.

In an application scenario, icons respectively related to prompt information of a plurality of types need to be displayed on the clock card, for example, an alarm clock icon and a weather icon are displayed. A time difference between a prompt time of alarm clock information and a prompt time of weather information is zero (in other words, the prompt time of the alarm clock information and the prompt time of the weather information are the same), or the time difference between the prompt time of the alarm clock information and the prompt time of the weather information is 12 hours, or the time difference between the prompt time of the alarm clock information and the prompt time of the weather information is less than a preset value (for example, 10 minutes). Because a display area of the clock card is limited, in this case, if the alarm clock icon and the weather icon are simultaneously displayed on the clock dial, there may be an icon display conflict problem, for example, the alarm clock icon and the weather icon entirely or partially overlap, affecting visual experience of the user. Therefore, in this case, if icon information has a display conflict problem, only an icon related to one piece of prompt information of a higher type priority may be displayed on the clock card. For example, a type priority of the alarm clock information is higher than a type priority of the weather information. In this case, when the alarm clock icon and the weather icon have a display conflict problem, only the alarm clock icon is displayed on the clock card, and the weather icon is no longer displayed. A type priority of prompt information may be default or may be set by the user. This is not limited in this embodiment.

In this way, icons respectively related to a plurality of pieces of prompt information in alarm clock information, weather information, schedule information, and the like can be simultaneously displayed on a clock card, which makes display information of the clock card richer, so that a user can view the plurality of pieces of prompt information on a desktop of a mobile phone, thereby improving use experience of the user. Time points corresponding to the plurality of pieces of prompt information viewed by the user on the desktop of the mobile phone are all within a period of time from a current moment.

Scenario 2

In a possible application scenario, if a clock application has a timer task or a stopwatch task (in other words, a timer function or a stopwatch function in the clock application is run), a timer task interface or a stopwatch task interface is displayed on a clock card displayed on a desktop of a mobile phone, until the timer task or the stopwatch task ends.

Figure 10B:
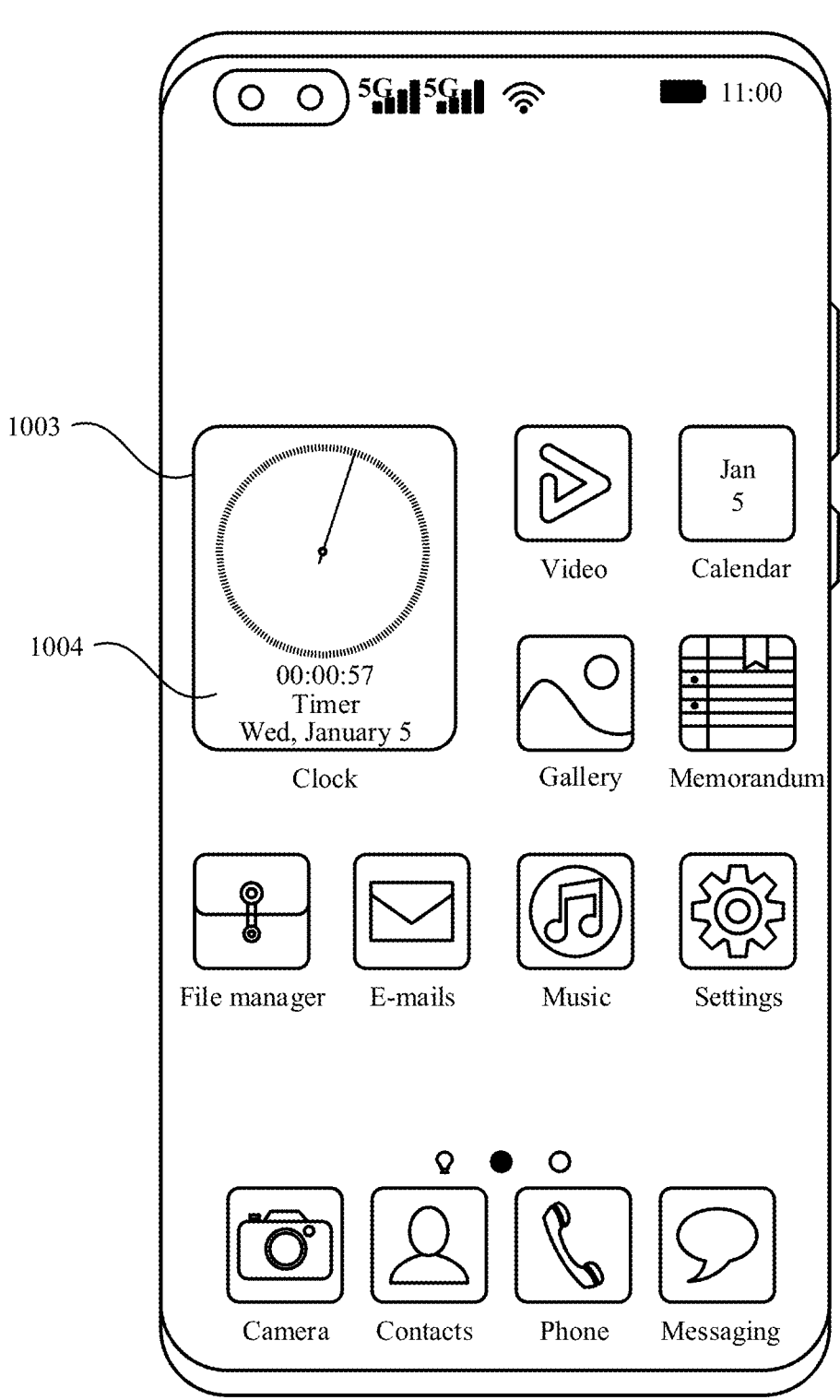

FIGS. 10*a*(1)-10*a*(2) and FIG. 10*b* show an exemplary application scenario. As shown in FIG. 10*a*(1), a user performs a related operation in a timer task interface 1001 of the clock application, and enables a one-minute timer. After the one-minute timer is enabled, for the timer task interface of the clock application, reference may be made to an interface 1002 shown in FIG. 10*a*(2). In this case, if the user performs an operation (for example, a slide operation) to enable the mobile phone to display the desktop, for the clock card displayed on the desktop, reference may be made to a clock card 1003 shown in FIG. 10*b*. In this case, the clock card displayed on the desktop is in a timer display state. As shown in FIG. 10*b*, the timer task interface is displayed in a display interface 1004 of the clock card 1003. In this way, the user can view a current timing situation of the timer on the desktop of the mobile phone. Before the timer is enabled, the clock card displayed on the desktop is in a clock display state. To be specific, before the timer is enabled, clock information, or the clock information and at least one piece of prompt information is/are displayed on the clock card displayed on the desktop according to an actual situation. When the timer ends timing, the clock card displayed on the desktop returns to the clock display state, and the clock information, or the clock information and an icon related to the at least one piece of prompt information is/are displayed according to an actual situation.

Figure 11B:
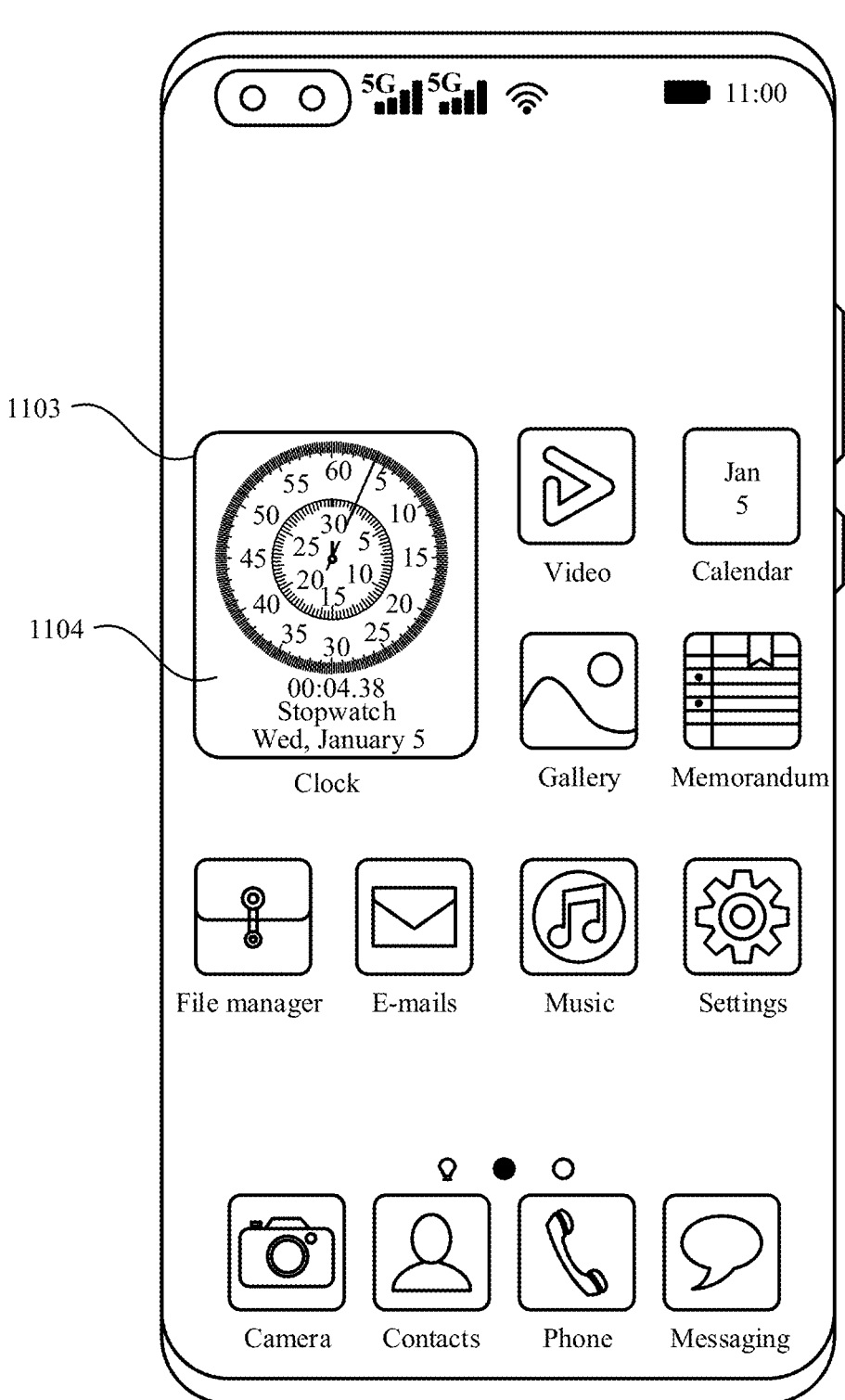

FIGS. 11*a*(1)-11*a*(2) and FIG. 11*b* show an exemplary application scenario. As shown in FIG. 11*a*(1), a user performs a related operation in a stopwatch task interface 1101 of the clock application, and enables a stopwatch to perform a timing operation. After the stopwatch is enabled, for the stopwatch task interface of the clock application, reference may be made to an interface 1102 shown in FIG. 11*a*(2). In this case, if the user performs an operation (for example, a slide operation) to enable the mobile phone to display the desktop, for the clock card displayed on the desktop, reference may be made to a clock card 1103 shown in FIG. 11*b*. In this case, the clock card displayed on the desktop is in a stopwatch display state. As shown in FIG. 11*b*, the stopwatch task interface is displayed in a display interface 1104 of the clock card 1103. In this way, the user can view a current timing situation of the stopwatch on the desktop of the mobile phone. Before the stopwatch is enabled, the clock card displayed on the desktop is in a clock display state. To be specific, before the stopwatch is enabled, clock information, or the clock information and at least one piece of prompt information is/are displayed on the clock card displayed on the desktop according to an actual situation. When the user performs a related operation to enable a stopwatch task to end, for example, resetting stopwatch timing to zero, the clock card displayed on the desktop returns to the clock display state, and the clock information, or the clock information and an icon related to the at least one piece of prompt information is/are displayed according to an actual situation.

In this way, during running of a stopwatch function or a timer function, once a user operates a mobile phone to enable the mobile phone to display a desktop, the user can view a real-time timing situation of a stopwatch or a timer on a clock card of the desktop, and does not need to open a corresponding stopwatch task interface or timer task interface again for viewing, thereby improving use experience of the user.

In other words, during running of the stopwatch function or the timer function, the corresponding stopwatch task interface or timer task interface is preferentially displayed on the clock card of the desktop. In a possible scenario, the user successively enables the timer function and the stopwatch function in the clock application. During simultaneous running of the stopwatch function and the timer function, if the user operates the mobile phone to enable the mobile phone to display the desktop, in this case, the timer task interface or the stopwatch task interface may be displayed on the clock card of the desktop according to a preset strategy. This is not limited in this embodiment.

For example, a task interface of a higher priority may be displayed on the clock card of the desktop. If a priority of the timer task is higher than a priority of the stopwatch task, the timer task interface is displayed on the clock card of the desktop. For another example, a task interface that is enabled earlier may be displayed on the clock card of the desktop. If the user first enables the stopwatch function and then enables the timer function, the stopwatch task interface is displayed on the clock card of the desktop.

Scenario 3

In a possible application scenario, on a clock card displayed on a desktop of a mobile phone, clock information may be displayed, and a card color may also indicate an on-off state of a system dark color mode in a setting application, that is, indicate whether the system dark color mode is on or off.

Figure 12:
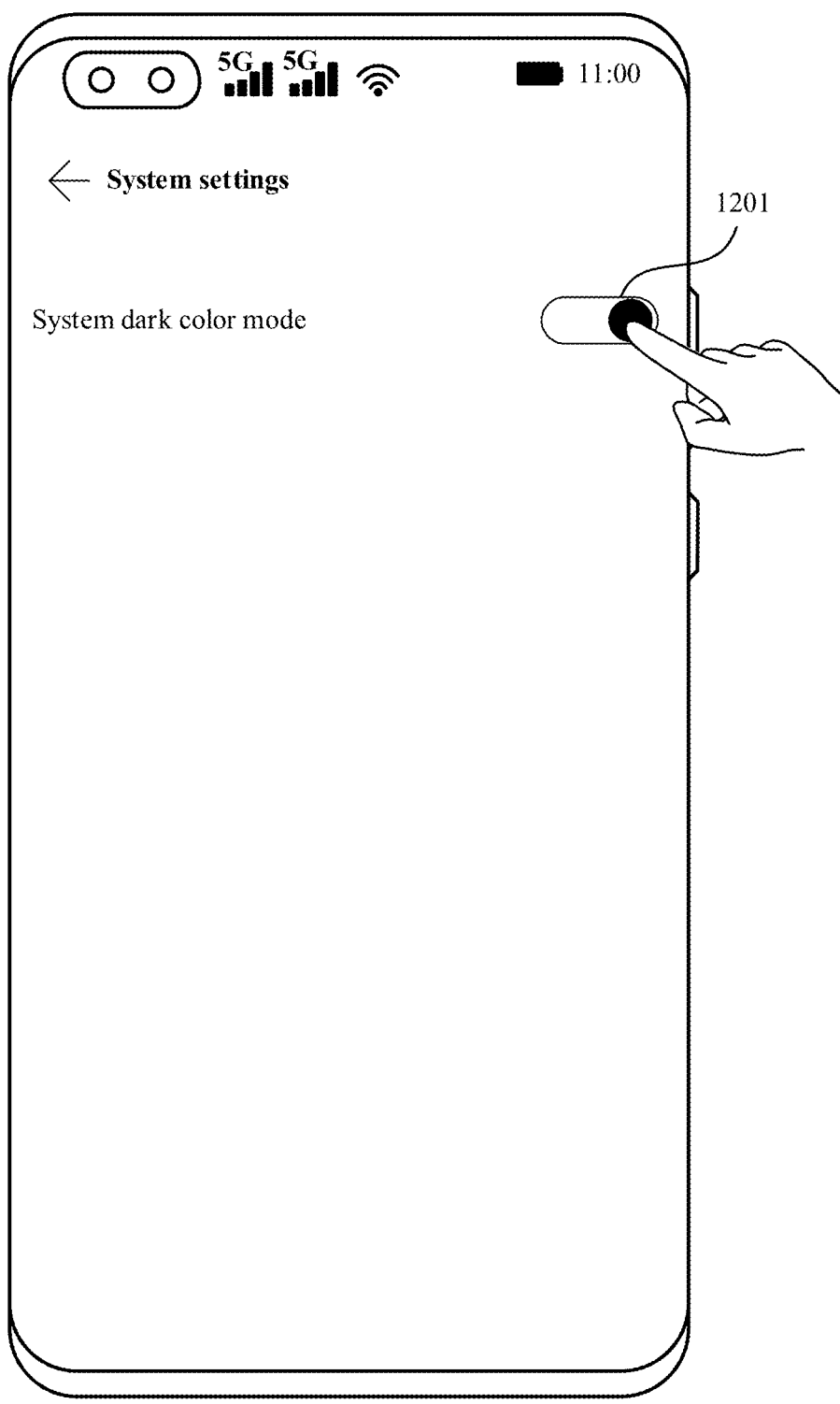
FIGS. 12(1)-12(2) are schematic exemplary diagrams of an application scenario.
Figure 12:
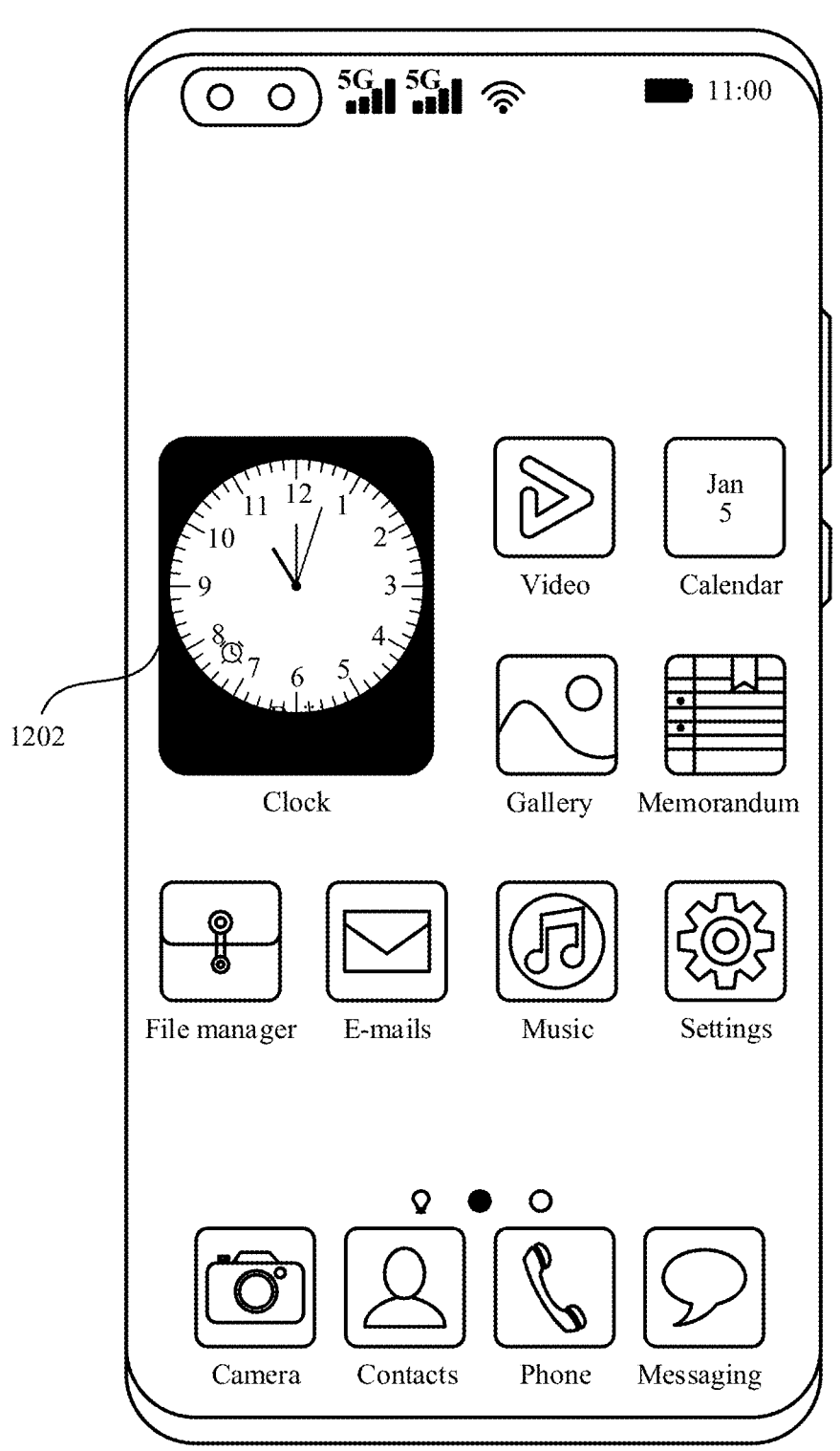

FIGS. 12(1)-12(2) show an exemplary application scenario. As shown in FIG. 12(1), a user turns on the system dark color mode in the setting application. When the user performs an operation (for example, a slide operation) to enable the mobile phone to display the desktop, for the clock card displayed on the desktop, reference may be made to a clock card 1202 shown in FIG. 12(2). As shown in FIG. 12(2), a card color of the clock card 1202 is a dark color, for example, black. In this case, the card color of the clock card 1202 may indicate that the on-off state of the system dark color mode is on, that is, may indicate that a color mode displayed by a system is the dark color. Before the user turns on the system dark color mode in the setting application, for the clock card displayed on the desktop, reference may be made to a clock card 604 shown in FIG. 6*b*(2). As shown in FIG. 6*b*(2), a card color of the clock card 604 is a light color (or referred to as a non-dark color), for example, white or a transparent color. In this case, the card color of the clock card 604 may indicate that the on-off state of the system dark color mode is off, that is, may indicate that the color mode displayed by the system is the non-dark color.

The system dark color mode in the foregoing setting application is an exemplary example of a system mode. Similarly, on the clock card displayed on the desktop of the mobile phone, clock information may be displayed, and a card color may also indicate an on-off state of a mode in the setting application. For example, if the card color of the clock card is a first color, it indicates that the on-off state of the mode in the setting application is on; and if the card color of the clock card is a second color, it indicates that the on-off state of the mode in the setting application is off. The first color is different from the second color. In this case, when the card color of the clock card is the first color, if the user sets the on-off state of the mode in the setting application to be off, the card color of the clock card is the second color when the user operates to enable the mobile phone to display the desktop again. Correspondingly, when the card color of the clock card is the second color, if the user sets the on-off state of the mode in the setting application to be on, the card color of the clock card is the first color when the user operates to enable the mobile phone to display the desktop again.

It should be noted that, the scenario (namely, Scenario 3) may be combined with Scenario 1 and/or Scenario 2. In other words, on the clock card displayed on the desktop of the mobile phone, in addition to the displayed clock information, icons related to one or more pieces of prompt information in alarm clock information, weather information, schedule information, and the like may be simultaneously displayed, a timer task interface or a stopwatch task interface may also be displayed, and the card color may also indicate the on-off state of the system dark color mode in the setting application. What is not illustrated in detail in this embodiment may be deduced according to the foregoing examples. Details are not described herein again.

In this way, a card color of a clock card may indicate an on-off state of a system dark color mode, which further enriches information displayed on the clock card, so that a user can know the on-off state of the system dark color mode when a mobile phone displays a desktop, and the user does not need to enable a setting application and then perform a plurality of times of operations for viewing, thereby simplifying user operations and then improving use experience of the user.

Scenario 4

In a possible application scenario, on a clock card displayed on a desktop of a mobile phone, clock information may be displayed, and a card color may also indicate a sunrise-sunset state corresponding to a current moment (or referred to as a current time), that is, may indicate whether the current time is a sunrise time or a sunset time.

Figure 13:
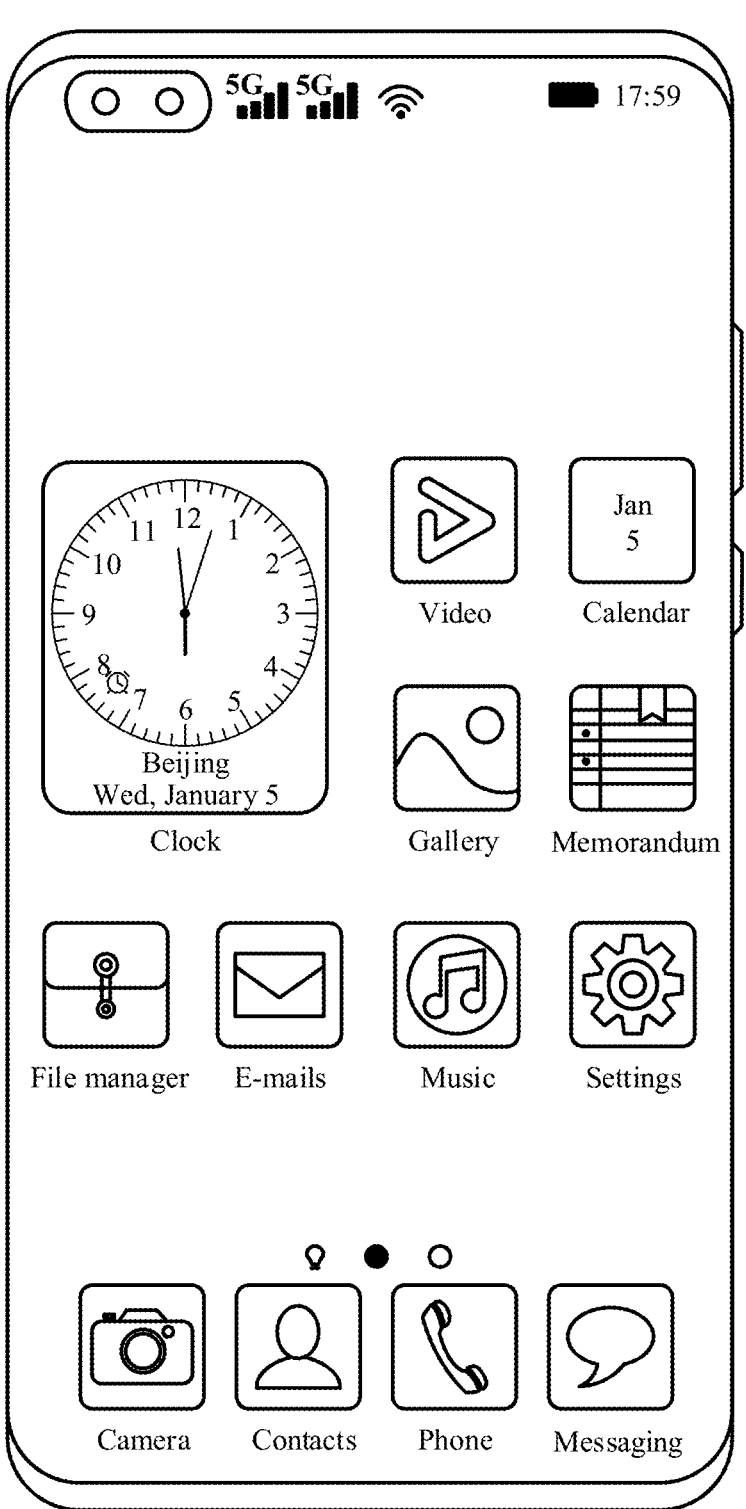
FIGS. 13(1)-13(2) are schematic exemplary diagrams of an application scenario.
Figure 13:
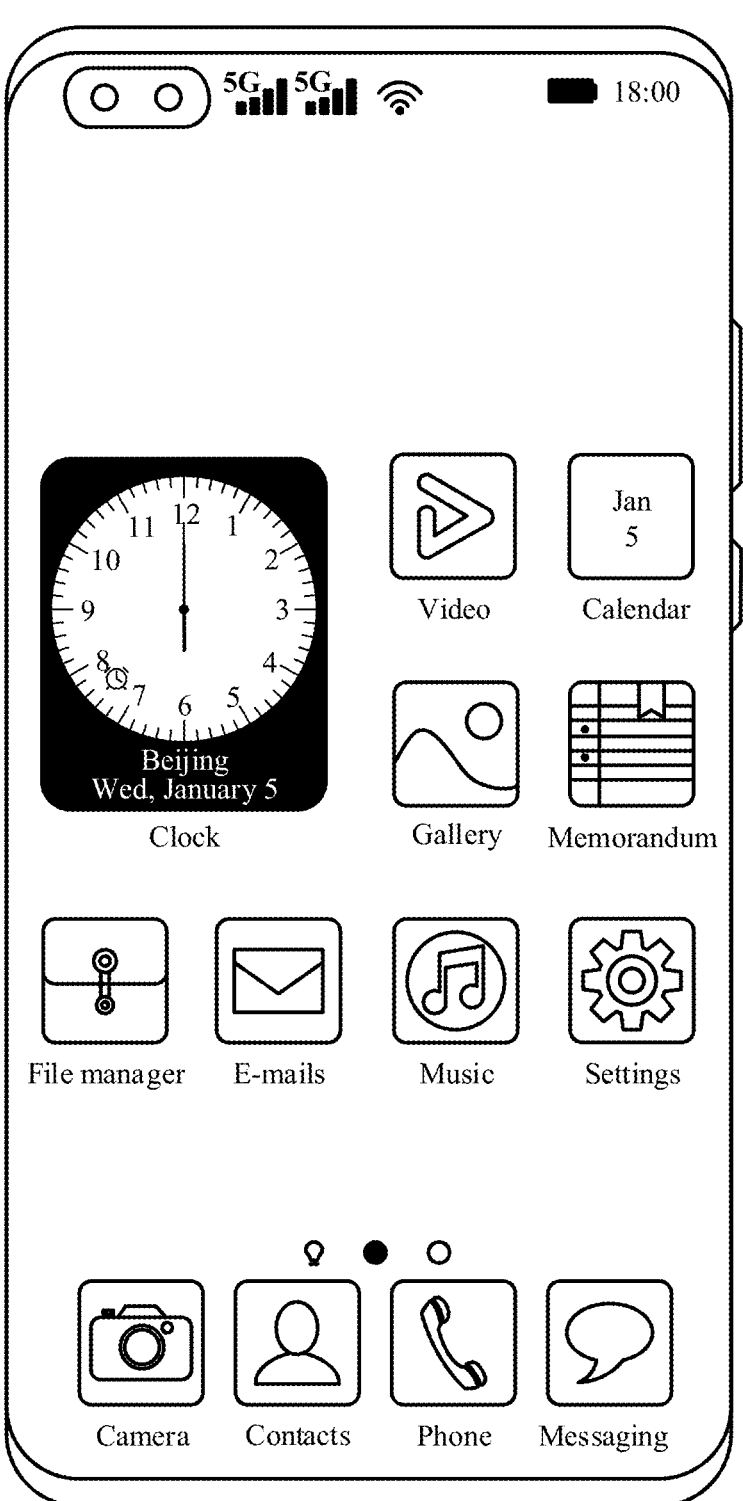

FIGS. 13(1)-13(2) show an exemplary application scenario. As shown in FIG. 13(1), the card color of the clock card displayed on the desktop is a light color (or referred to as a non-dark color), for example, white or a transparent color. In this case, the card color of the clock card may indicate that the current time is the sunrise time, that is, the sun has risen currently and does not set. Assuming that a sunset time of a current day is six o'clock in the afternoon, when the time reaches six o'clock in the afternoon, the card color of the clock card displayed on the desktop is changed from the light color to a dark color, for example, black. As shown in FIG. 13(2), the current time is six o'clock in the afternoon, and the card color of the clock card displayed on the desktop is the dark color. In this case, the card color of the clock card may indicate that the current time is the sunset time, that is, the sun has set currently.

Figure 14:
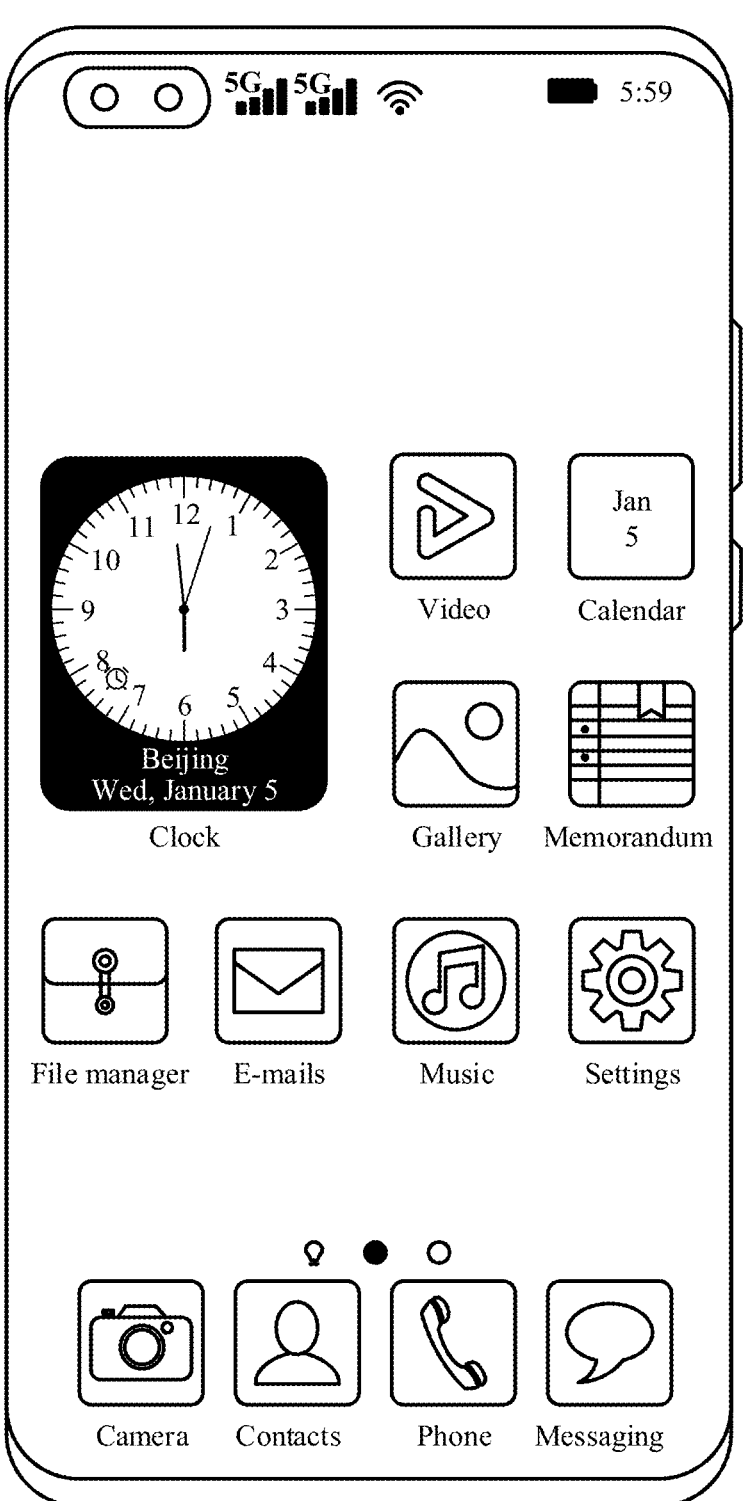
FIGS. 14(1)-14(2) are schematic exemplary diagrams of an application scenario.
Figure 14:
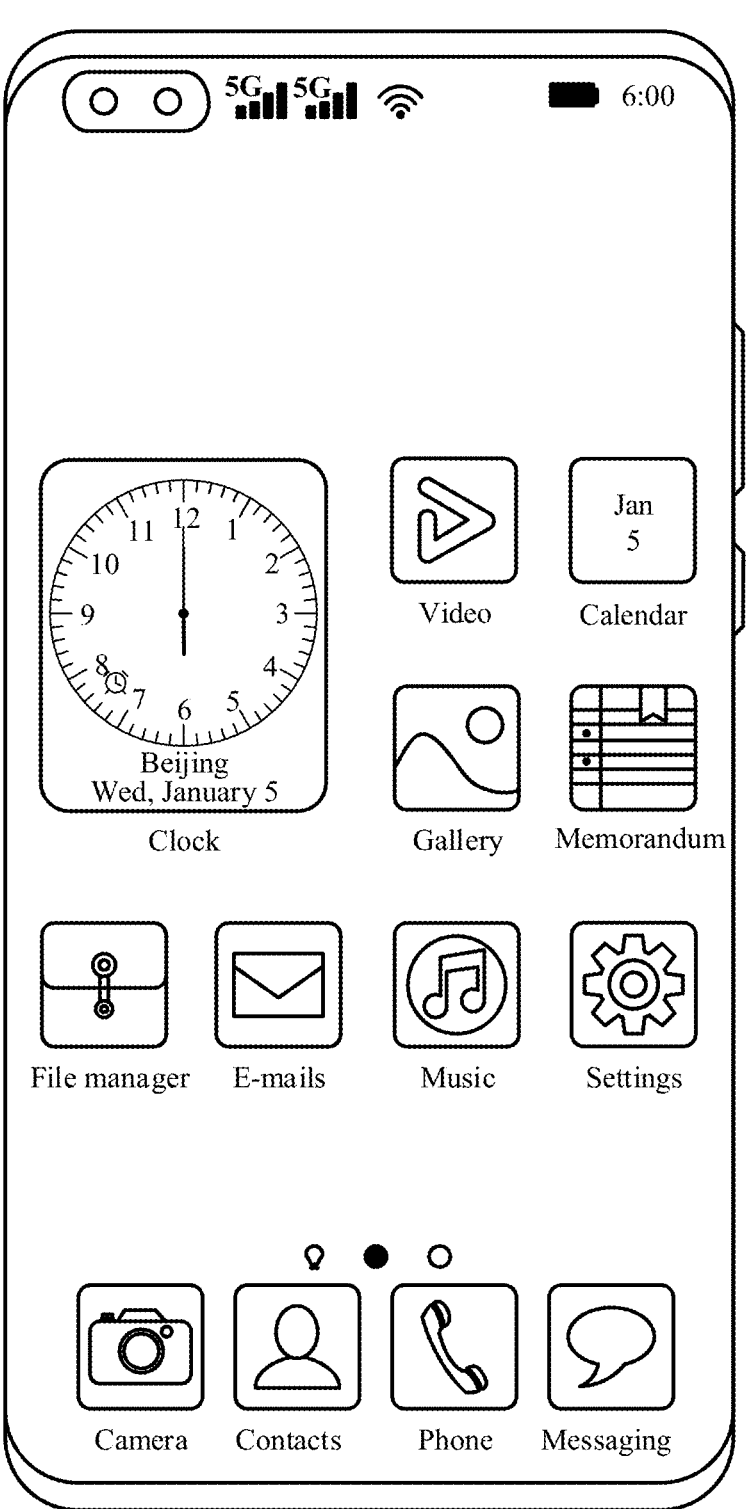

FIGS. 14(1)-14(2) show an exemplary application scenario. As shown in FIG. 14(1), the card color of the clock card displayed on the desktop is a dark color, for example, black. In this case, the card color of the clock card may indicate that the current time is the sunset time, that is, the sun has set currently and does not rise. Assuming that a sunrise time of next day is six o'clock in the morning, when the time reaches six o'clock in the morning, the card color of the clock card displayed on the desktop is changed from the dark color to a light color, for example, white or a transparent color. As shown in FIG. 14(2), the current time is six o'clock in the morning, and the card color of the clock card displayed on the desktop is the light color. In this case, the card color of the clock card may indicate that the current time is the sunrise time, that is, the sun has risen currently.

It should be noted that, the scenario (namely, Scenario 4) may be combined with Scenario 1 and/or Scenario 2. In other words, on the clock card displayed on the desktop of the mobile phone, in addition to the displayed clock information, icons related to one or more pieces of prompt information in alarm clock information, weather information, schedule information, and the like may be simultaneously displayed, a timer task interface or a stopwatch task interface may also be displayed, and the card color may also indicate the sunrise-sunset state corresponding to the current moment. What is not illustrated in detail in this embodiment may be deduced according to the foregoing examples. Details are not described herein again.

In this way, a card color of a clock card may indicate a sunrise-sunset state of a current moment. In other words, the card color of the clock card may be changed with sunrise and sunset, which further enriches information displayed on the clock card, so that a user can know a current sunrise-sunset situation according to the color of the clock card, does not need to query a sunrise-sunset time of a current day and then compare the sunrise-sunset time with a current time to determine the current sunrise-sunset situation, and does not need to perform viewing in an interface after performing a plurality of times of operations, thereby simplifying user operations and then improving use experience of the user.

The display method provided in this application is described simply below by using an example in which a world clock card is displayed on a desktop of a mobile phone. An electronic device of another type is not described in this embodiment of this application herein again.

In a possible application scenario, on the world clock card displayed on the desktop of the mobile phone, clock information of a plurality of countries may be displayed, and icons related to one or more pieces of prompt information in alarm clock information, weather information, schedule information, and the like may also be simultaneously displayed on each clock dial. A weather icon displayed on the clock card may indicate a weather change situation. It should be pointed out that icons displayed on clock dials are consistent. For each clock dial, an icon related to prompt information may be displayed at a position that is related to a prompt time and that is out of the clock dial, or may be displayed at a position related to the prompt time on the clock dial. It should be noted that, the prompt time is determined based on a national time corresponding to the clock dial. Descriptions are made below by using an example in which the icon related to the prompt information is displayed at the position related to the prompt time on the clock dial.

Figure 15A:
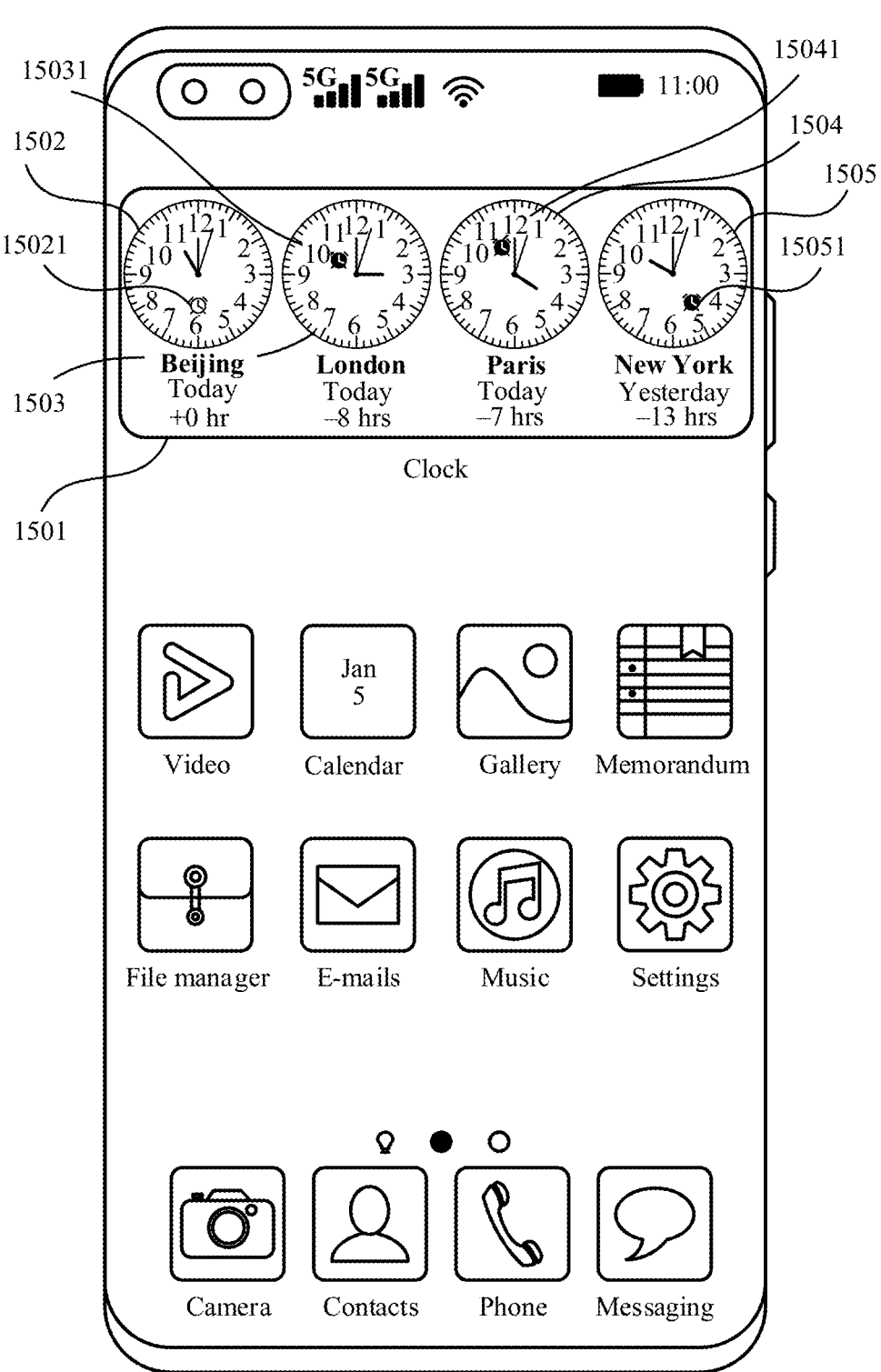
FIG. 15a and FIG. 15b are schematic exemplary diagrams of an application scenario.

FIG. 15a shows an exemplary application scenario. As shown in FIG. 15a, a world clock card 1501 is displayed on the desktop of the mobile phone. A clock dial 1502, a clock dial 1503, a clock dial 1504, and a clock dial 1505 are simultaneously displayed on the world clock card 1501, and correspond to a current Beijing time, a current London time, a current Paris time, and a current New York time respectively. If a user creates and turns on an alarm clock and an alarm clock time is six o'clock in the morning Beijing time, when the user performs an operation (for example, a slide operation) to enable the mobile phone to display the desktop, for the clock card displayed on the desktop, reference may be made to the clock card 1501 shown in FIG. 15a. As shown in FIG. 15a, an alarm clock icon 15021 is displayed on the clock dial 1502 in a first style, and the alarm clock time is six o'clock in the morning Beijing time; an alarm clock icon 15031 is displayed on the clock dial 1503 in a second style, and the alarm clock time is ten o'clock in the evening London time; an alarm clock icon 15041 is displayed on the clock dial 1504 in the second style, and the alarm clock time is eleventh o'clock in the evening Paris time; and an alarm clock icon 15051 is displayed on the clock dial 1505 in the second style. and the alarm clock time is five o'clock in the afternoon New York time.

Similarly, for displaying weather icons, schedule icons, and the like on the world clock card, the same is true. For details not described in the scenario, reference may be made to the foregoing scenario. Details are not described herein again.

In a possible application scenario, if a clock application has a timer task or a stopwatch task (in other words, a timer function or a stopwatch function in the clock application is run), a timer task interface or a stopwatch task interface is displayed in an interface area corresponding to each clock dial on the world clock card displayed on the desktop of the mobile phone, until the timer task or the stopwatch task ends. For details not described in the scenario, reference may be made to the foregoing scenario. Details are not described herein again.

In a possible application scenario, on the world clock card displayed on the desktop of the mobile phone, clock information may be displayed, and a card color may also indicate an on-off state of a system dark color mode in a setting application. On the world clock card displayed on the desktop of the mobile phone, in addition to the displayed clock information, icons related to one or more pieces of prompt information in alarm clock information, weather information, schedule information, and the like may be simultaneously displayed, a timer task interface or a stopwatch task interface may also be displayed, and the card color may also indicate the on-off state of the system dark color mode in the setting application.

Figure 15B:
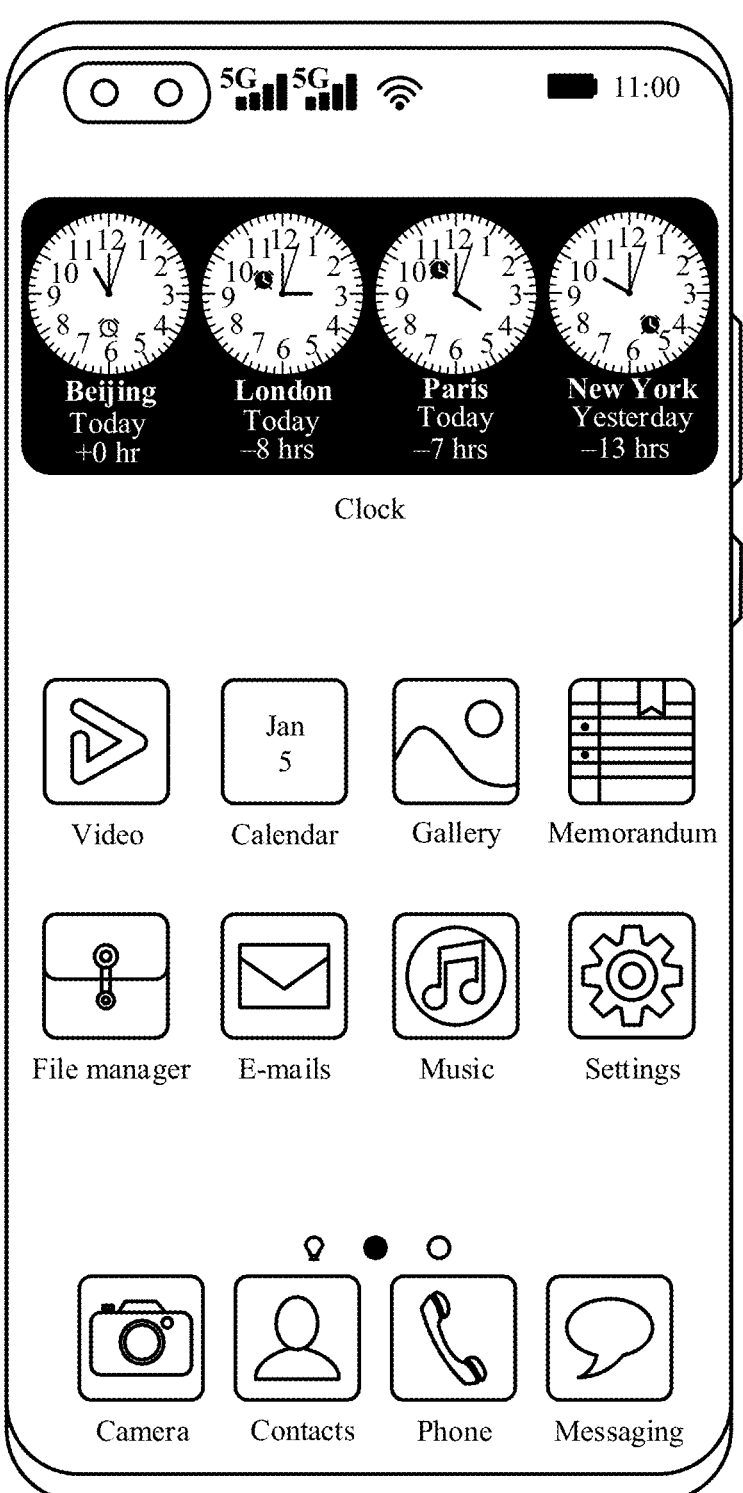

FIG. 15b shows an exemplary application scenario. As shown in FIG. 15b, the card color of the world clock card is a dark color, and may indicate that the on-off state of the system dark color mode in the setting application is on. For details not described in the scenario, reference may be made to the foregoing scenario. Details are not described herein again.

In still another possible application scenario, on the world clock card displayed on the desktop of the mobile phone, clock information may be displayed, and a card color may also indicate a sunrise-sunset state corresponding to a current moment (or referred to as a current time), that is, may indicate whether the current time is a sunrise time or a sunset time. In this case, the card color of the world clock card may be changed with sunrise and sunset. On the world clock card displayed on the desktop of the mobile phone, in addition to the displayed clock information, icons related to one or more pieces of prompt information in alarm clock information, weather information, schedule information, and the like may be simultaneously displayed, a timer task interface or a stopwatch task interface may also be displayed, and the card color may also indicate the sunrise-sunset state corresponding to the current moment.

It should be pointed out that when the card color of the world clock card indicates the sunrise-sunset state corresponding to the current moment, a sunrise-sunset time is based on a standard time set in the mobile phone, to avoid a problem of incorrect display of the sunrise-sunset state. For details not described in the scenario, reference may be made to the foregoing scenario. Details are not described herein again.

In an optional application scenario, when a multi-functional dial display mode of a clock card can be turned on, in an interface of the clock card, clock information may be displayed, icons related to prompt information, for example, alarm clock information, weather information, and schedule information may also be integrated and displayed, a timer timing situation, a stopwatch timing situation, and the like may also be displayed, and a card color of the clock card may also indicate an on-off state of a system dark color mode in a setting application or indicate a sunrise-sunset state corresponding to a current moment. In this way, display information of the clock card is enriched. If a multi-functional dial function of the clock card is not enabled, only the clock information is displayed in the interface of the clock card.

Figure 16:
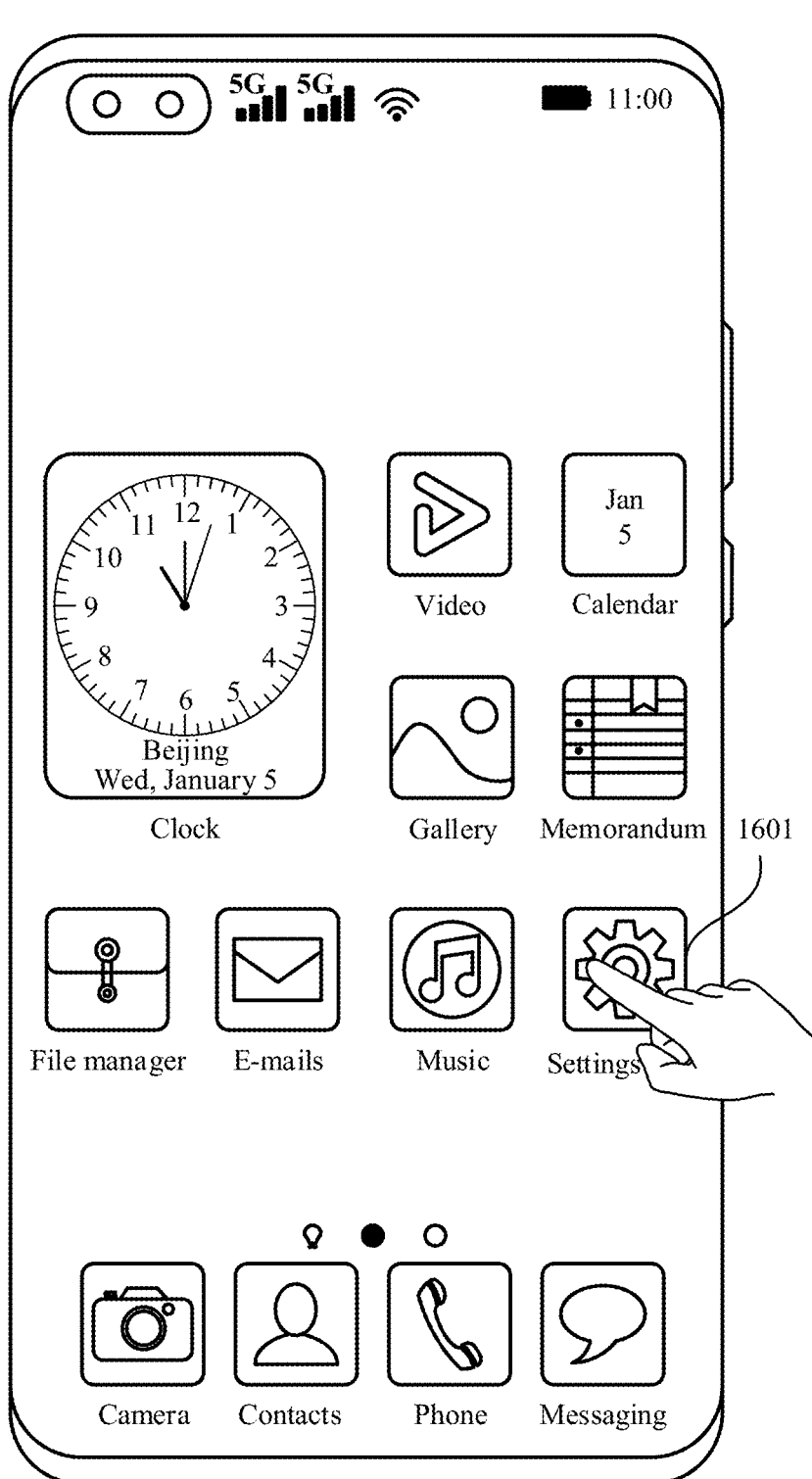
FIGS. 16(1)-16(2) are schematic exemplary diagrams of an application scenario.
Figure 16:
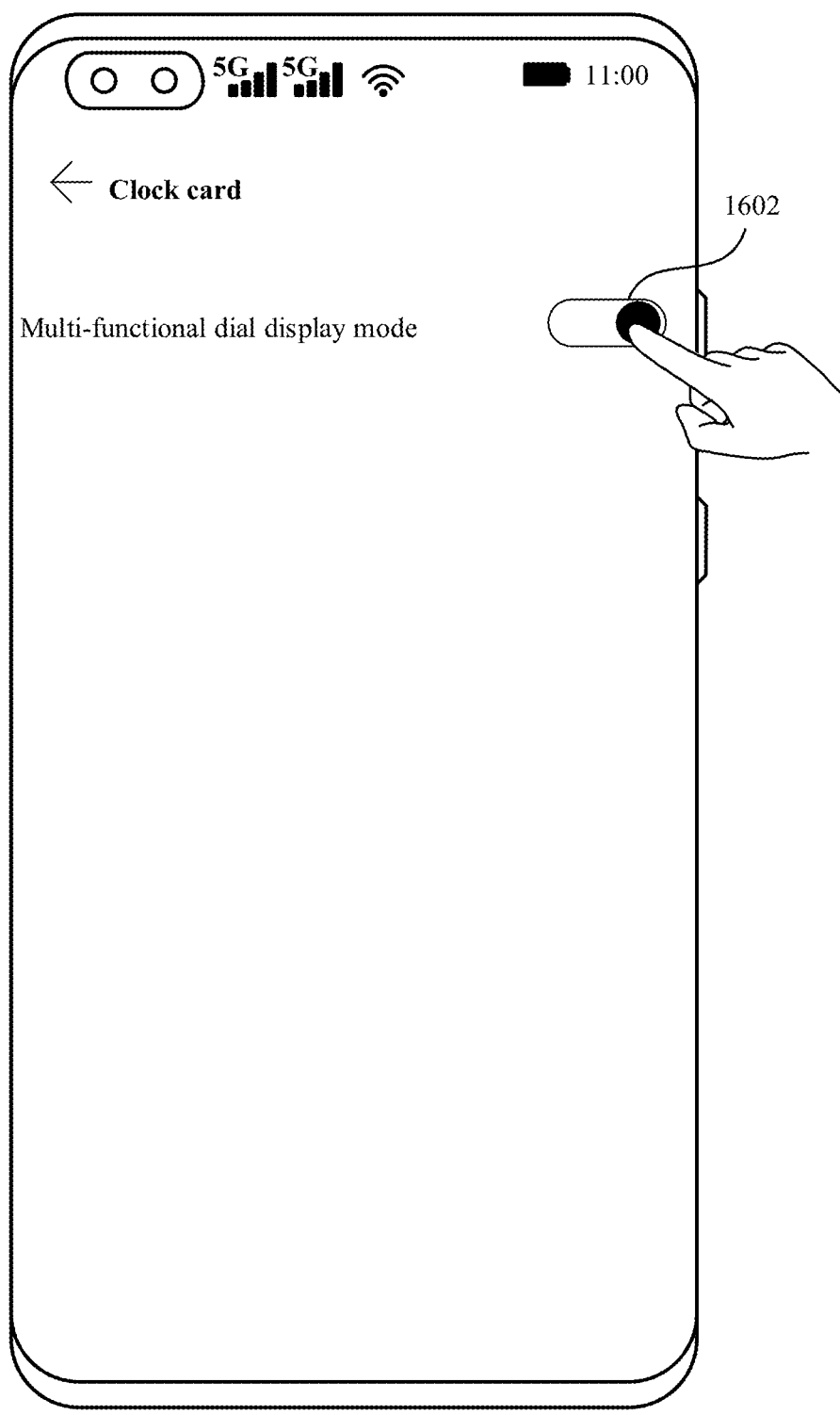

FIGS. 16(1)-16(2) show an exemplary application scenario. As shown in FIG. 16(1), a user clicks a setting option 1601 to open the setting application. In response to some operations (for example, click operations) of the user, the mobile phone displays a setting interface of the clock card, as shown in FIG. 16(2). In this case, the user may turn on or turn off the multi-functional dial display mode of the clock card through a slide option 1602, to determine whether to display the icons related to the prompt information on the clock card according to an actual need.

In an application scenario, the user does not turn on the multi-functional dial display mode of the clock card, and in this case, for the clock card displayed on the desktop of the mobile phone, reference may be made to a clock card 201 shown in FIG. 2a(1). It is assumed that the user has set an alarm clock of 7:30 every day and a schedule of meeting at 9:00 next day and a weather application prompts that there is rain at four o'clock in the afternoon. In this case, if the user turns on the multi-functional dial display mode of the clock card, when the user operates the mobile phone to enable the mobile phone to display the desktop, corresponding weather icon, alarm clock icon, and schedule icon are all displayed on the clock card, and in this case, for the clock card displayed on the desktop of the mobile phone, reference may be made to a clock card 901 shown in FIG. 9.

In an optional implementation, in the interface of the clock card, the mobile phone may display clock information, may also integrate and display icons related to prompt information, for example, alarm clock information, weather information, and schedule information, may also display a timer timing situation, a stopwatch timing situation, and the like, and may also indicate an on-off state of a system dark color mode in a setting application by using a card color of the clock card.

Figure 17A:
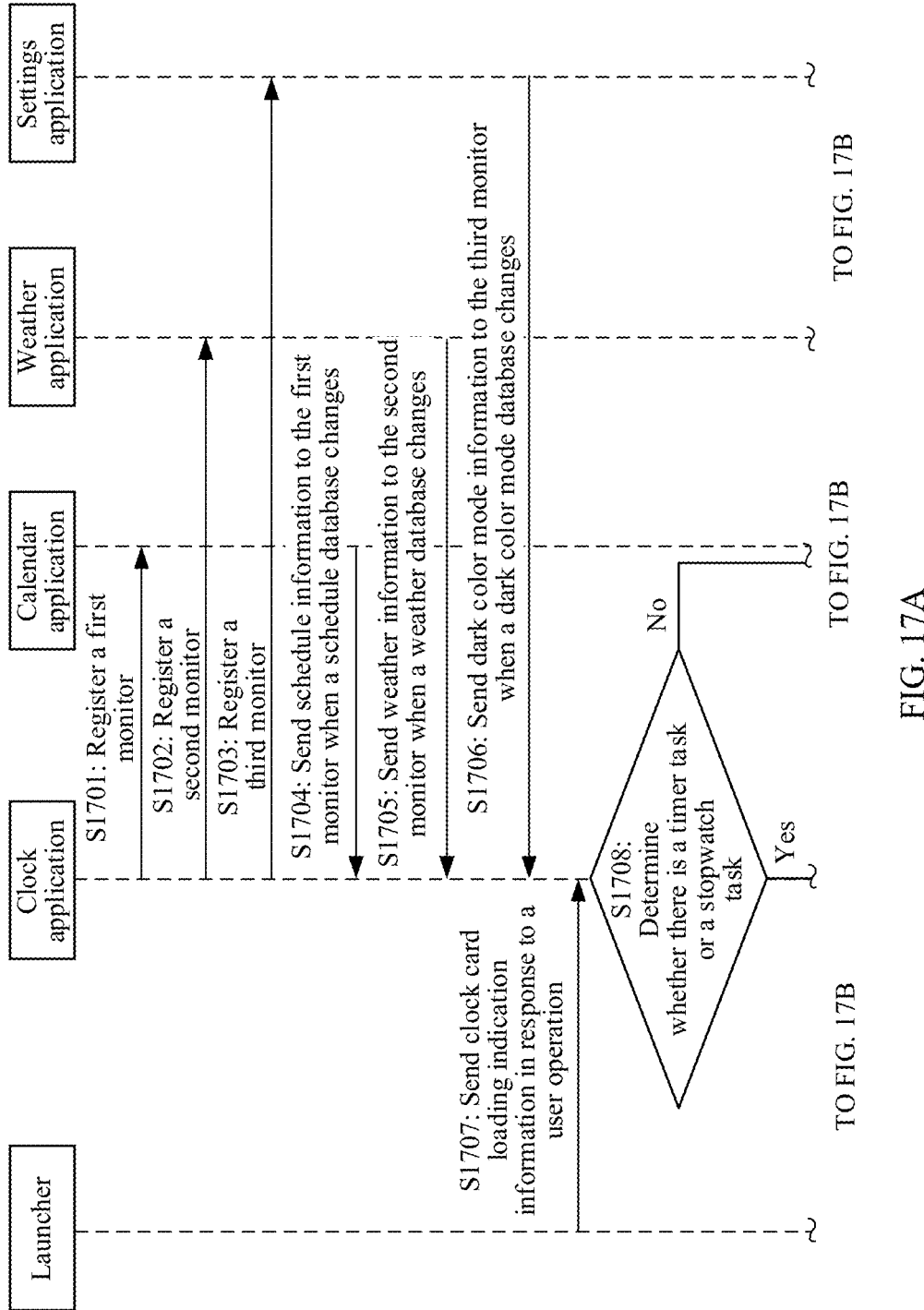
FIG. 17A and FIG. 17B are a schematic diagram of data interaction according to an embodiment of this application.
Figure 17B:
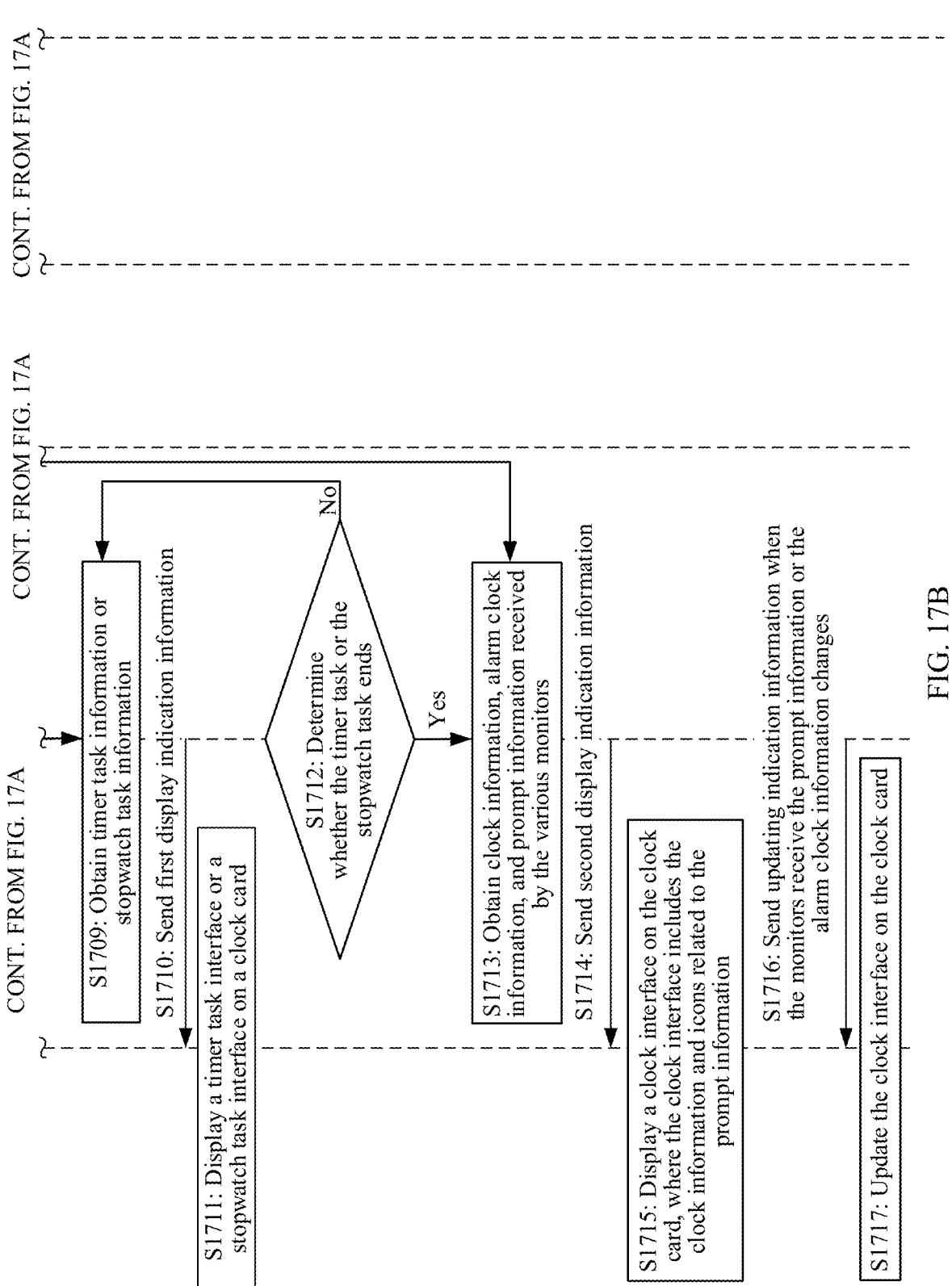

FIG. 17A and FIG. 17B are a schematic diagram of interaction of various modules of a mobile phone. Refer to FIG. 17A and FIG. 17B. A processing procedure of a display method provided in an embodiment of this application specifically includes the following steps.

S1701: A clock application registers a first monitor in a calendar application.

The first monitor is configured to monitor whether schedule information set in the calendar application changes. For example, the first monitor may monitor whether the schedule information is added or deleted, or whether the schedule information, including a schedule time and schedule content of the schedule information, is modified.

S1702: The clock application registers a second monitor in a weather application.

The first monitor is configured to monitor whether weather information recorded in the weather application changes, including a weather change situation and a weather change time.

S1703: The clock application registers a third monitor in a setting application.

The first monitor is configured to monitor whether an on-off state of a system dark color mode set in the setting application changes.

An execution sequence of S1701 to S1703 is not limited in this embodiment of this application. For example, after a system of the mobile phone is enabled, the clock application registers the corresponding monitors respectively.

S1704: The calendar application sends the schedule information to the first monitor of the clock application when a schedule database changes.

The schedule database is a database for storing the schedule information. That the schedule database changes may be understood as that the schedule information is added or deleted, or the schedule information, including the schedule time and the schedule content of the schedule information, is modified.

S1705: The weather application sends the weather information to the second monitor of the clock application when a weather database changes.

The schedule database is a database for storing the weather information. That the weather database changes may be understood as that the weather information, including the weather change situation, the weather change time, and the like, is updated.

When the weather database changes, the weather application may send change information of bad weather (such as rain, snow, or fog) to the second monitor according to a preset strategy. This is not limited in this embodiment.

S1706: The setting application sends dark color mode information to the third monitor of the clock application when a dark color mode database changes.

The dark color mode database may be for storing the on-off state of the system dark color mode in the setting application. If a user changes the on-off state of the system dark color mode set in the setting application, the dark color mode database changes. In this case, the setting application may use the on-off state of the system dark color mode in the setting application as the dark color mode information to send to the third monitor of the clock application.

An execution sequence of S1704 to S1706 is not limited in this embodiment of this application.

S1707: The launcher sends clock card loading indication information to the clock application in response to a user operation.

The user operation may be an operation indicating the mobile phone to display a desktop. For example, the user operation may be sliding left or right at a set edge of a screen, or may be sliding left or right a set control. This is not limited in this embodiment.

The clock card loading indication information may indicate to load display information of a clock card. The clock card loading indication information may include but is not limited to a display type (for example, a standard clock card or a world clock card) of the clock card.

S1708: The clock application determines whether there is a timer task or a stopwatch task; and performs S1709 if there is the timer task or the stopwatch task; or performs S1713 if there is no timer task or no stopwatch task.

The clock application determines whether there is a timer task or a stopwatch task that is performing a timing operation; and indicates the launcher to display a timer task interface or a stopwatch task interface on the clock card if there is the timer task or the stopwatch task that is performing the timing operation; or indicates the launcher to display clock information and a corresponding prompt icon on the clock card if there is no timer task or no stopwatch task that is performing the timing operation.

S1709: The clock application obtains timer task information or stopwatch task information.

The clock application obtains current timer task information or stopwatch task information if determining that there is the timer task or the stopwatch task. By using the timer task as an example, the timer task information may include but is not limited to total timing duration, current elapsed duration, and the like. By using the stopwatch task as an example, the stopwatch task information may include but is not limited to current elapsed duration and the like.

If a stopwatch function and a timer function are simultaneously run, the clock application may indicate the launcher to display the timer task interface or the stopwatch task interface on the clock card according to a preset strategy. This is not limited in this embodiment. For example, the clock application may indicate the launcher to display the timer task interface or the stopwatch task interface on the clock card according to a display priority. For another example, the clock application may indicate the launcher to display the timer task interface or the stopwatch task interface on the clock card according to a task enabling sequence.

S1710: The clock application sends first display indication information to the launcher.

The first display indication information may indicate the launcher to display the timer task interface or the stopwatch task interface on the clock card. For example, the first display indication information includes but is not limited to an interface display type and interface display content. The interface display type may be the timer task interface or the stopwatch task interface.

S1711: The launcher displays the timer task interface or the stopwatch task interface on the clock card.

The launcher displays the timer task interface or the stopwatch task interface on the clock card according to the first display indication information. The launcher may invoke a card management service, to implement display of the timer task interface or the stopwatch task interface on the clock card. For a drawing manner of the clock card, reference may be made to the prior art. Details are not described herein again.

S1712: The clock application determines whether the timer task or the stopwatch task ends; and performs S1713 if the timer task or the stopwatch task ends; or performs S1709 if the timer task or the stopwatch task does not end.

When the timer task or the stopwatch task ends, the clock application indicates the launcher to display the clock information and corresponding prompt information on the clock card.

If the timer task or the stopwatch task does not end, the clock application continues to obtain the timer task information or the stopwatch task information, and indicates the launcher to continue to display the timer task interface or the stopwatch task interface on the clock card, to ensure accuracy of the timer task interface or the stopwatch task interface displayed on the clock card.

S1713: The clock application obtains the clock information, alarm clock information, and prompt information received by the various monitors.

Optionally, the clock application may regularly detect whether an alarm clock database changes, or monitor, by using a pre-registered fourth monitor corresponding to the alarm clock information, whether the alarm clock database changes. When the alarm clock database changes, the clock application obtains the corresponding alarm clock information. The alarm clock database is a database for storing the alarm clock information. That the alarm clock database changes may be understood as that the alarm clock information is added or deleted, or the alarm clock information is modified. An execution sequence of registering the fourth monitor is not limited in this embodiment.

If the user does not set the clock information and the various monitors do not receive the prompt information, the clock application can obtain the clock information. Further, only the clock information is displayed on the clock card of the desktop.

S1714: The clock application sends second display indication information to the launcher.

The second display indication information may indicate the launcher to display a clock interface on the clock card. In addition to including the clock information, the clock interface may also include an alarm clock icon, and may also include icons related to the prompt information received by the monitors, for example, a weather icon and a schedule icon. A card color of the clock card may also indicate on-off state information of the system dark color mode in the setting application.

For example, the second display indication information includes but is not limited to an interface display type and interface display information.

The interface display type may be the clock interface.

The interface display information includes but is not limited to the clock information, and related information of to-be-displayed prompt information, for example, a prompt information type, prompt content, and a time point of the prompt information.

S1715: The launcher displays the clock interface on the clock card, where the clock interface includes the clock information and the icons related to the prompt information.

The prompt information may include the alarm clock information and the prompt information received by the monitors.

If the clock application obtains the alarm clock information or obtains the prompt information received by the monitors, the clock application indicates the launcher to display the clock information and the icons related to the prompt information on the clock card. When the clock interface displayed on the clock card includes the icons related to the prompt information, for the clock card, reference may be made to an example of the clock card described in the foregoing any application scenario. Details are not described herein again.

Figure 18:
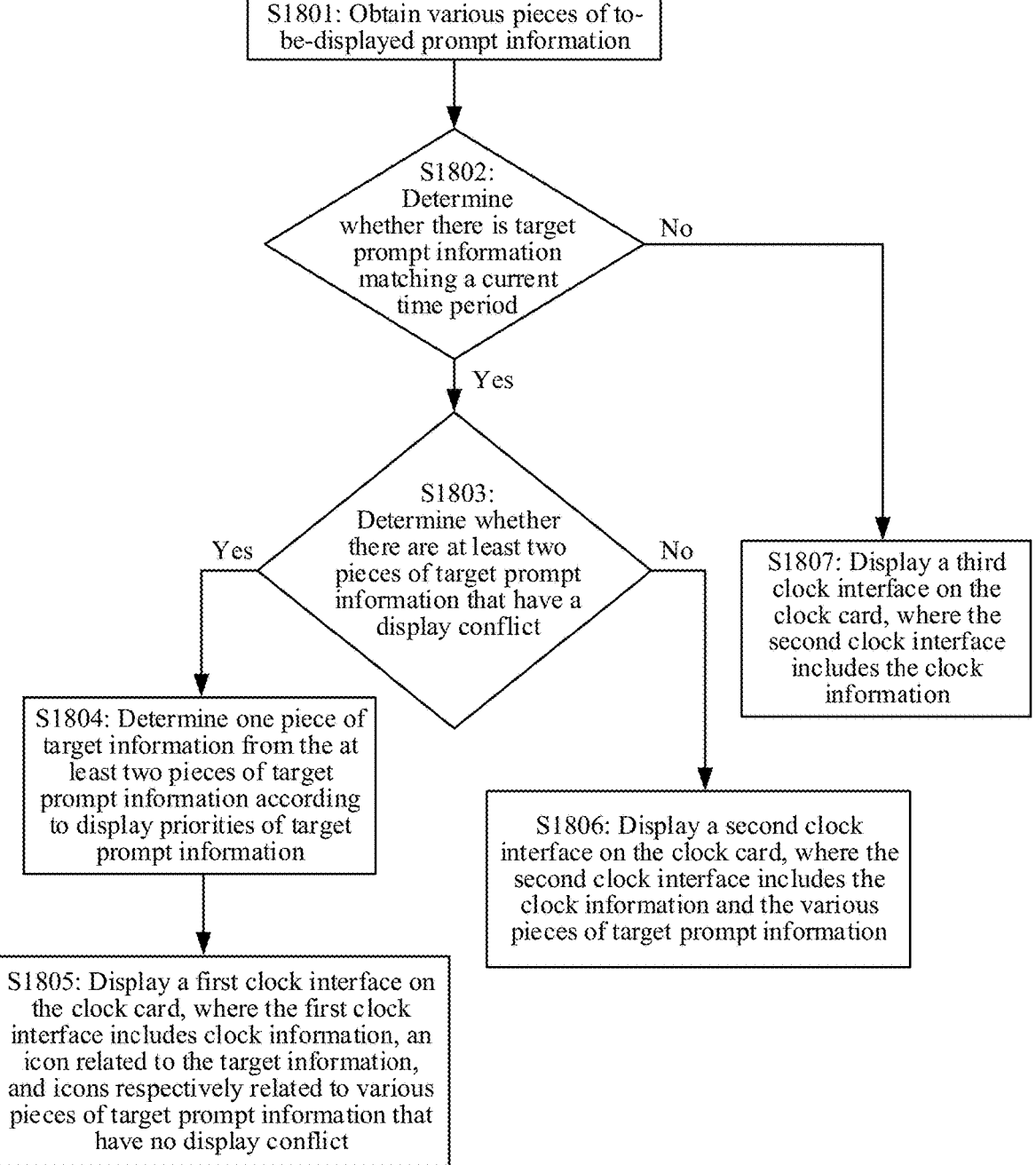
FIG. 18 is a schematic flowchart of displaying a clock card interface by a launcher according to an embodiment of this application.

FIG. 18 is a schematic flowchart of displaying a clock card interface by a launcher. As shown in FIG. 18, a procedure of displaying the clock card interface by the launcher specifically includes the following steps.

S1801: The launcher obtains various pieces of to-be-displayed prompt information.

The launcher obtains the various pieces of to-be-displayed prompt information, to determine related information of each of the various pieces of prompt information, for example, a prompt information type, prompt content, and a time point of the prompt information.

S1802: The launcher determines whether there is target prompt information matching a current time period; and performs S1803 if there is the target prompt information matching the current time period; or performs S1807 if there is no target prompt information matching the current time period.

The current time period may be understood as a period of time from a current moment. For example, the current time period may be 12 hours or 24 hours from the current moment. The target prompt information matching the current time period may be understood as that a prompt time of the target prompt information is within the current time period.

The launcher determines whether there is the target prompt information matching the current time period; and may display an icon related to the target prompt information on a clock dial of a clock card currently if there is the target prompt information matching the current time period. Icons related to other pieces of prompt information that does not match the current time period cannot be displayed on the clock dial of the clock card currently, to prevent a user from confusing prompt times of the prompt information.

S1803: The launcher determines whether there are at least two pieces of target prompt information that have a display conflict; and performs S1804 if there are the at least two pieces of target prompt information that have the display conflict; or performs S1806 if there is no target prompt information that has the display conflict.

If there are a plurality of pieces of target prompt information, the launcher needs to further determine whether the plurality of pieces of target prompt information have a display conflict problem. If a prompt time difference between any two pieces of target prompt information is zero, that is, prompt times are the same, or the prompt time difference is 12 hours, or the prompt time difference is less than a preset value (for example, 10 minutes), it is determined that the two pieces of target prompt information have a display conflict problem.

Because a display area of the clock dial of the clock card is limited, if icons related to a plurality of pieces of prompt information are displayed at a same position or near positions, visual experience of crowded display of the icons occurs, and even a phenomenon that the icons are displayed in an entirely or partially overlapping manner occurs, affecting visual experience of the user and making use experience of the user poor.

S1804: The launcher determines one piece of target information from the at least two pieces of target prompt information according to display priorities of target prompt information.

If there are a plurality of pieces of target prompt information that have a display conflict, one piece of target information is selected from at least two pieces of target prompt information according to the display priorities of the target prompt information, to display only an icon related to the target information on the clock dial of the clock card.

The display priorities of the target prompt information may be the same as use priorities of corresponding application programs. For example, the use priorities of the application programs may be default or may be set by the user. This is not limited in this embodiment.

For example, if a use priority of a calendar application is higher than a display priority of a weather application, when one piece of schedule information and one piece of weather information have a display conflict, only a schedule icon related to the schedule information is displayed in the clock interface of the clock card, and a weather icon related to the weather information is not displayed.

S1805: The launcher displays a first clock interface on the clock card, where the first clock interface includes clock information, the icon related to the target information, and icons respectively related to various pieces of target prompt information that have no display conflict.

For example, by using an example in which the clock card is a standard clock card, for the first clock interface, reference may be made to an interface 902 displayed on a clock card 901 shown in FIG. 9. For the icon related to the target information and the icons respectively related to the various pieces of target prompt information that have no display conflict that are included in the first clock interface, reference may be made to an alarm clock icon 903, a schedule icon 904, and a weather icon 905 in the interface 902.

S1806: The launcher displays a second clock interface on the clock card, where the second clock interface includes the clock information and the icons respectively related to the various pieces of target prompt information.

For example, by using an example in which the clock card is the standard clock card, for the second clock interface, reference may also be made to the interface 902 displayed on the clock card 901 shown in FIG. 9. For the icons respectively related to the various pieces of target prompt information included in the second clock interface, reference may be made to the alarm clock icon 903, the schedule icon 904, and the weather icon 905 in the interface 902.

S1807: The launcher displays a third clock interface on the clock card, where the second clock interface includes the clock information.

In this case, by using an example in which the clock card is the standard clock card, for the third clock interface, reference may be made to a display interface of a clock card 201 shown in FIG. 2a(1).

Figure 19:
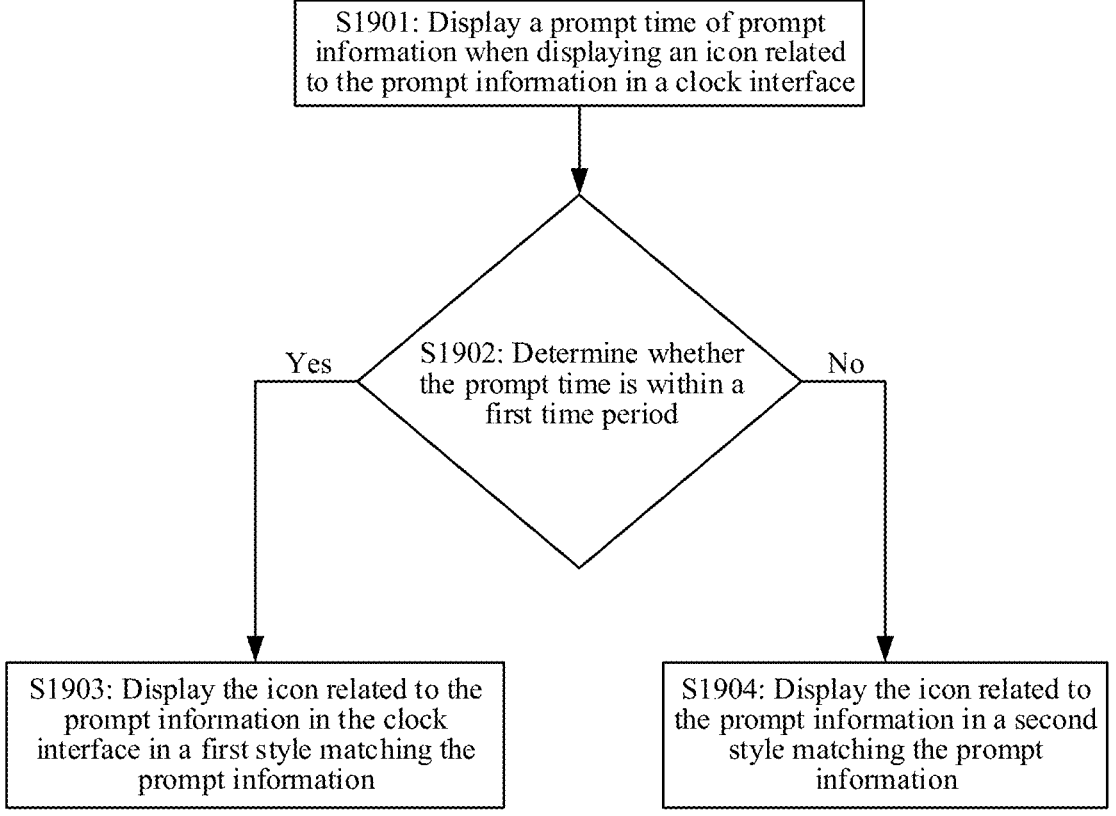
FIG. 19 is a schematic flowchart of displaying a clock card interface by a launcher according to an embodiment of this application.

FIG. 19 is still another schematic flowchart of displaying a clock card interface by a launcher. As shown in FIG. 19, a procedure of displaying the clock card interface by the launcher specifically includes the following steps.

S1901: The launcher obtains a prompt time of prompt information when displaying an icon related to the prompt information in a clock interface.

When the prompt information is alarm clock information, the prompt time thereof is an alarm clock time; when the prompt information is weather information, the prompt time thereof is a weather change time; and when the prompt information is schedule information, the prompt time thereof is a schedule time.

S1902: The launcher determines whether the prompt time is within a first time period; and performs S1903 if the prompt time is within the first time period; or performs S1904 if the prompt time is not within the first time period.

Because a clock dial uses 12-hour timing, positions of time points with a difference of 12 hours are the same on the dial. For example, on the dial, a position related to a time "9:00" and a position related to a time "21:00" are the same. Therefore, to enable a user to conveniently recognize the prompt time of the prompt information, for prompt information of each type, the prompt information may be identified by using two different styles.

S1903: The launcher displays the icon related to the prompt information in the clock interface in a first style matching the prompt information.

S1904: The launcher displays the icon related to the prompt information in the clock interface in a second style matching the prompt information.

Duration of the first time period (using a 24-hour timing method) is 12 hours. For example, the first time period is 0:00 to 12:00. For another example, the first time period is 8:00 to 20:00. The first time period is not limited in this embodiment. Optionally, the user may set start and end time points of the first time period according to the user's own needs.

If the prompt time of the prompt information is within the first time period, the icon related to the prompt information is displayed in the clock interface by using the first style matching the prompt information; otherwise, the icon related to the prompt information is displayed in the clock interface by using the second style matching the prompt information, to enable the user to distinguish whether the prompt time of the prompt information is a morning time or an afternoon time.

The first style is different from the second style. For example, a color of the first style is different from a color of the second style. The first style and the second style that match various pieces of prompt information are not limited in this embodiment.

By using an example in which the prompt information is the alarm clock information, a style of an alarm clock icon 603 displayed on a clock card 601 in FIG. 6a(2) may be understood as the first style, and correspondingly, a style of an alarm clock icon 606 displayed on a clock card 604 in FIG. 6b(2) may be understood as the second style.

For a style of prompt information of another type, reference may also be made to an example of the clock card described in the foregoing another application scenario. Details are not described herein again.

Figure 20:
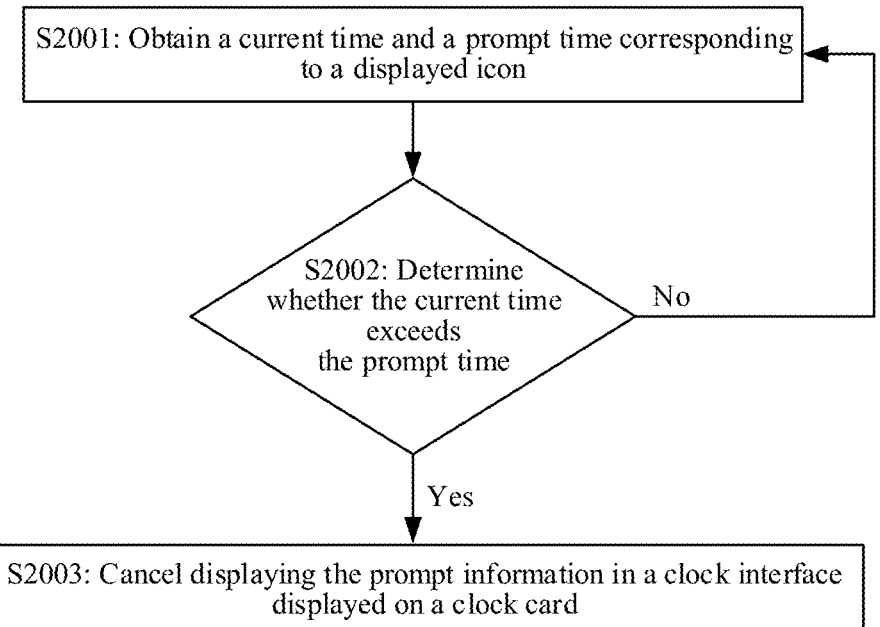
FIG. 20 is a schematic flowchart of displaying a clock card interface by a launcher according to an embodiment of this application.

FIG. 20 is still another schematic flowchart of displaying a clock card interface by a launcher. As shown in FIG. 20, a procedure of displaying the clock card interface by the launcher specifically includes the following steps.

S2001: The launcher obtains a current time and a prompt time corresponding to a displayed icon.

The launcher may obtain the current time and the prompt time corresponding to displayed prompt information in real time or regularly.

The launcher compares the current time and the prompt time of the prompt information after displaying the icon related to the prompt information on a clock card, to determine whether to canceling displaying the icon.

S2002: The launcher determines whether the current time exceeds the prompt time; and performs S2003 if the current time exceeds the prompt time; or performs S2001 if the current time does not exceed the prompt time.

S2003: The launcher cancels displaying the icon in a clock interface displayed on the clock card.

If the current time exceeds (or reaches) a prompt time of one piece of prompt information, the launcher cancels displaying an icon in the clock interface displayed on the clock card, to ensure accuracy of the icon displayed on the clock card.

In an application scenario shown in FIG. 6*d*, the prompt information is alarm clock information. As shown in FIG. 6*d*(1), a prompt time of an alarm clock icon 609 is eleven o'clock in the morning. Once the current time exceeds eleven o'clock in the morning, display of the alarm clock icon on the clock card is canceled. As shown in FIG. 6*d*(2), the current time has exceeded eleven o'clock in the morning. Therefore, the display of the alarm clock icon 609 on the clock card is canceled.

Figure 21:
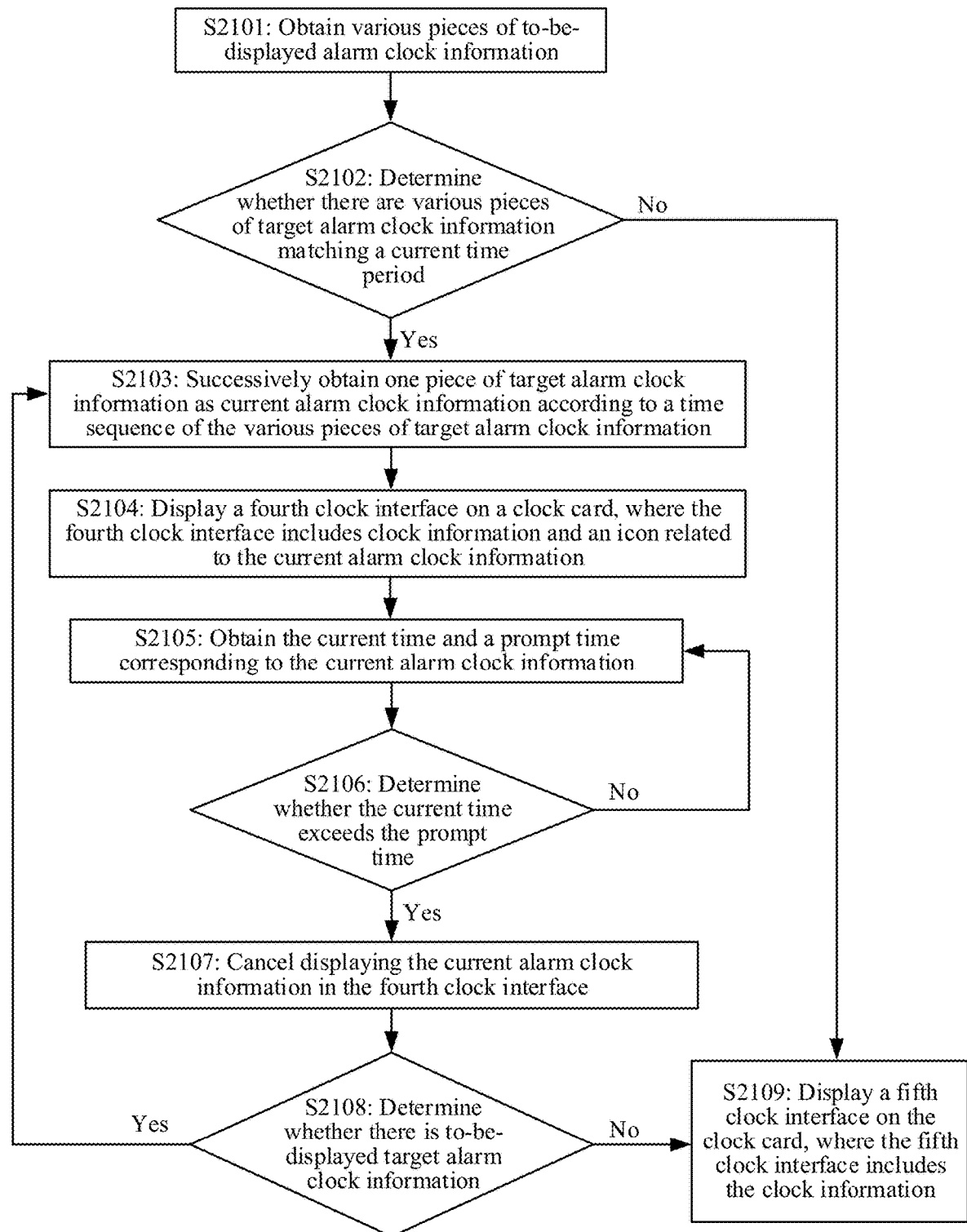
FIG. 21 is a schematic flowchart of displaying a clock card interface by a launcher according to an embodiment of this application.

FIG. 21 is still another schematic flowchart of displaying a clock card interface by a launcher. As shown in FIG. 21, by using an example in which prompt information is alarm clock information, a procedure of displaying the clock card interface by the launcher specifically includes the following steps.

S2101: The launcher obtains various pieces of to-be-displayed alarm clock information.

The various pieces of to-be-displayed alarm clock information are various pieces of alarm clock information preset by a user.

S2102: The launcher determines whether there are various pieces of target alarm clock information matching a current time period; and performs S2103 if there are the various pieces of target alarm clock information matching the current time period; or performs 2109 if there is no target alarm clock information matching the current time period.

S2103: The launcher successively obtains one piece of target alarm clock information as current alarm clock information according to a time sequence of the various pieces of target alarm clock information.

The current alarm clock information is one piece of alarm clock information closest to a current time.

S2104: The launcher displays a fourth clock interface on the clock card, where the fourth clock interface includes clock information and an alarm clock icon related to the current alarm clock information.

In this case, only the alarm clock icon related to the one piece of alarm clock information closest to the current time is displayed on the clock card. For the fourth clock interface, reference may be made to a display interface 608 of a clock card 607 shown in FIG. 6*d*(1), and the alarm clock icon related to the current alarm clock information is an alarm clock icon 609.

S2105: The launcher obtains the current time and a prompt time corresponding to the current alarm clock information.

S2106: The launcher determines whether the current time exceeds the prompt time; and performs S2107 if the current time exceeds the prompt time; or performs 2105 if the current time does not exceed the prompt time.

S2107: The launcher cancels displaying the current alarm clock information in the fourth clock interface.

Still refer to FIG. 6*d*(1) and FIG. 6*d*(2). Because a prompt time corresponding to the alarm clock icon 609 is eleven o'clock in the morning, when the current time has exceeded eleven o'clock in the morning, display of the alarm clock icon 609 on the clock card is canceled.

S2108: The launcher determines whether there is to-be-displayed target alarm clock information; and performs S2103 if there is the to-be-displayed target alarm clock information; or performs 2109 if there is no to-be-displayed target alarm clock information.

In this case, if there is also the to-be-displayed target alarm clock information, only the alarm clock icon related to the one piece of alarm clock information closest to the current time continues to be displayed on the clock card, and in this case, reference may be made to an alarm clock icon 612 in FIG. 6*d*(2).

S2109: Display a fifth clock interface on the clock card, where the fifth clock interface includes the clock information.

If there is no to-be-displayed target alarm clock information, only the clock information is displayed on the clock card.

In this way, for prompt information of a same type, only an icon related to one piece of prompt information closest to the current time is displayed on the clock card, to avoid a problem that too many prompt icons are displayed on the clock card and make a user's visual experience poor.

S1716: The clock application sends updating indication information to the launcher when the monitors receive the prompt information or the alarm clock information changes.

The clock application sends the updating indication information to the launcher when any monitor receives prompt information or the alarm clock information changes, to indicate the launcher to update the clock interface displayed on the clock card, and in particular, to update the prompt icon displayed in the clock interface.

S1717: The launcher updates the clock interface on the clock card.

In an application scenario, when the mobile phone displays the desktop, it is assumed that a monitor receives new prompt information in this case, for example, the weather application automatically updates the weather change situation, or the clock application automatically synchronizes the alarm clock information and the calendar application automatically synchronizes the schedule information. If a prompt time of the new prompt information is within a preset time period from the current time, the clock application sends the updating indication information to the launcher. In this case, the clock application updates the display interface of the clock card according to the updating indication information, to display a new prompt icon.

For updating the clock interface on the clock card by the launcher, reference may also be made to the processing procedures shown in FIG. 18 to FIG. 21. For an operation of updating the clock interface on the clock card, reference may also be made to the prior art. Details are not described herein again.

In another optional implementation, in the interface of the clock card, the mobile phone may display clock information, may also display icons related to prompt information, for example, alarm clock information, weather information, and schedule information, may also display a timer timing situation, a stopwatch timing situation, and the like, and may also indicate a sunrise-sunset state corresponding to a current time by using a card color of the clock card.

Figure 22A:
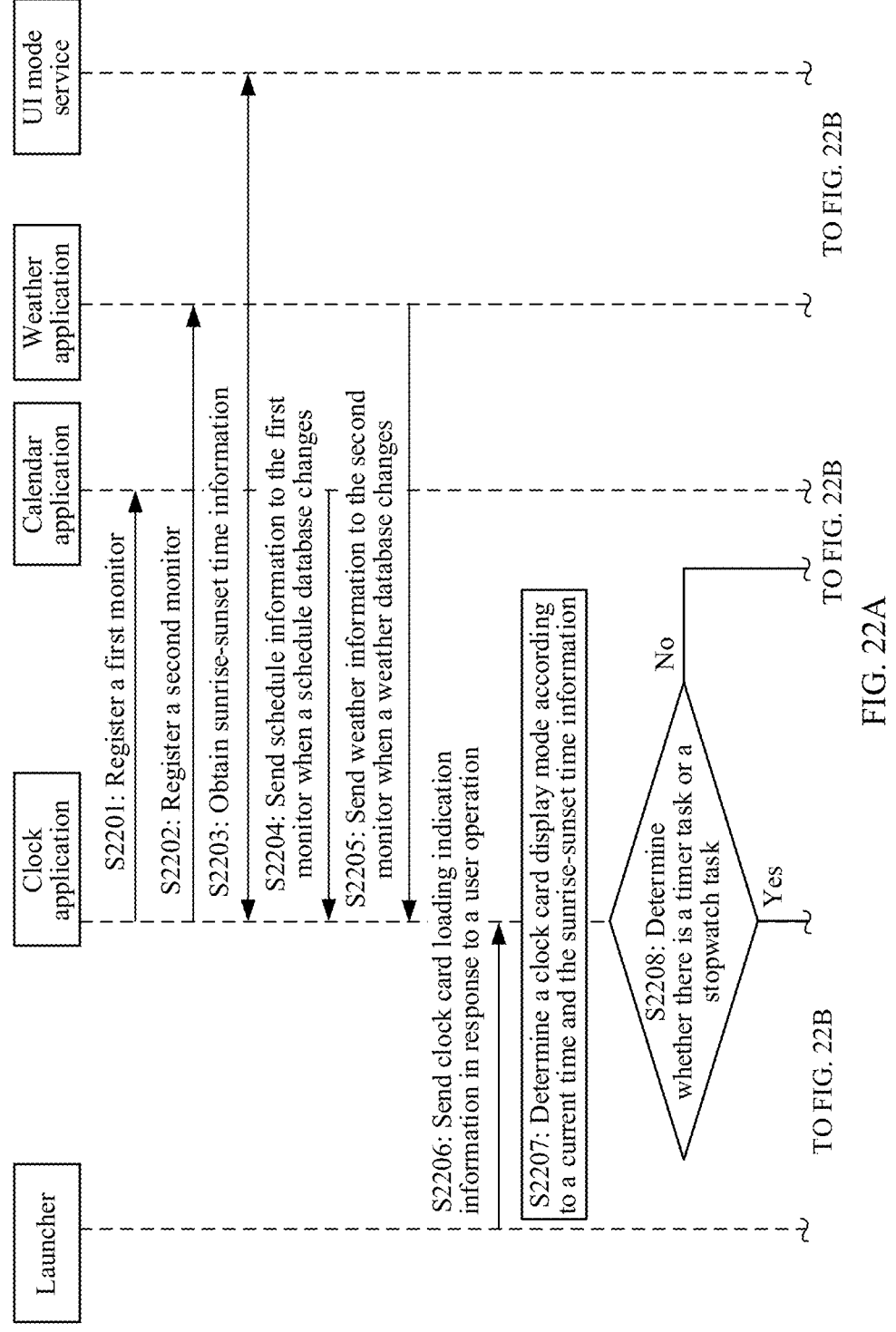
FIG. 22A and FIG. 22B are a schematic diagram of data interaction according to an embodiment of this application.
Figure 22B:
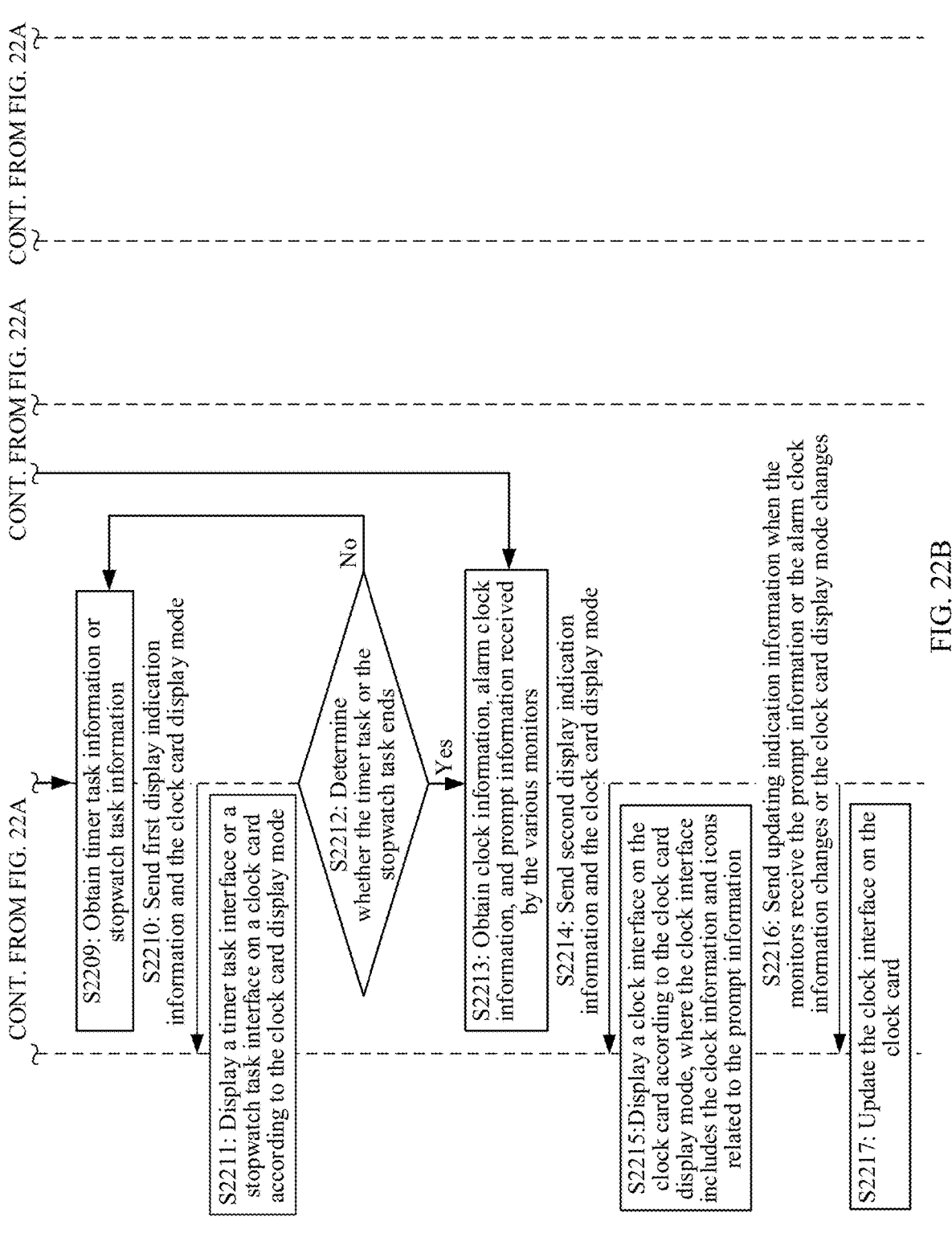

FIG. 22A and FIG. 22B are a schematic diagram of interaction of various modules of a mobile phone. Refer to FIG. 22A and FIG. 22B. A processing procedure of a display method provided in an embodiment of this application specifically includes the following steps.

S2201: A clock application registers a first monitor in a calendar application.

S2202: The clock application registers a second monitor in a weather application.

An execution sequence of S2201 and S2202 is not limited in this embodiment of this application. For example, after a system of the mobile phone is enabled, the clock application registers the corresponding monitors respectively.

S2203: The clock application obtains sunrise-sunset time information of a current day.

For example, the clock application obtains the sunrise-sunset time information of the current day regularly, for example, obtaining the sunrise-sunset time information of the current day at zero o'clock every day.

For example, the clock application sends a sunrise-sunset information obtaining request to a UI mode service, where the sunset information obtaining request may carry a time point of the current day. The UI mode service feeds back the corresponding sunrise-sunset time information to the clock application in response to the sunset information obtaining request.

S2204: The calendar application sends schedule information to the first monitor when a schedule database changes.

S2205: The weather application sends weather information to the second monitor when a weather database changes.

An execution sequence of S2204 and S2205 is not limited in this embodiment of this application.

S2206: A launcher sends clock card loading indication information to the clock application in response to a user operation.

S2207: The clock application determines a clock card display mode according to a current time and the sunrise-sunset time information.

For example, the clock application determines the clock card display mode regularly or in real time according to the current time and the sunrise-sunset time information. If the clock card display mode is different, a card color of a clock card is different.

If the current time does not reach a sunrise time of the current day, the clock card display mode may be a dark color mode, that is, the card color of the clock card is a dark color, to indicate that the current time is a sunset time, that is, the sun has set currently and does not rise. If the current time has reached the sunrise time of the current day, the clock card display mode may be a non-dark color mode (a light color mode), that is, the card color of the clock card is a non-dark color (a light color), to indicate that the current time is the sunrise time, that is, the sun has risen.

S2208: The clock application determines whether there is a timer task or a stopwatch task; and performs S2209 if there is the timer task or the stopwatch task; or performs S2213 if there is no timer task or no stopwatch task.

S2209: The clock application obtains current timer task information or stopwatch task information.

If a stopwatch function and a timer function are simultaneously run, the clock application may indicate the launcher to display a timer task interface or a stopwatch task interface on the clock card according to a preset strategy. This is not limited in this embodiment.

S2210: The clock application sends first display indication information and the clock card display mode to the launcher.

S2211: The launcher displays the timer task interface or the stopwatch task interface on the clock card according to the clock card display mode.

If the clock card display mode is the dark color mode, the card color of the clock card is the dark color. If the clock card display mode is the non-dark color mode (the light color mode), the card color of the clock card is the non-dark color (the light color).

S2212: The clock application determines whether the timer task or the stopwatch task ends; and performs S2213 if the timer task or the stopwatch task ends; or performs S2209 if the timer task or the stopwatch task does not end.

S2213: The clock application obtains clock information, alarm clock information, and prompt information received by the various monitors.

S2214: The clock application sends second display indication information and the clock card display mode to the launcher.

S2215: The launcher displays a clock interface on the clock card according to the clock card display mode, where the clock interface includes the clock information and icons related to the prompt information.

For displaying the clock interface on the clock card by the launcher, reference may be made to the processing procedures shown in FIG. 18 to FIG. 21. Details are not described herein again. When the clock interface displayed on the clock card includes the icons related to the prompt information, for the clock card, reference may be made to an example of the clock card described in the foregoing any application scenario. Details are not described herein again.

S2216: The clock application sends updating indication information to the launcher when the monitors receive the prompt information or the alarm clock information changes or the clock card display mode changes.

The updating indication information may include but is not limited to an updating instruction and updating content, and the updating content includes but is not limited to change information of the prompt information or the alarm clock information, and change information of the clock card display mode.

S2217: The launcher updates the clock interface on the clock card.

Once the clock application determines that the clock card display mode changes, a re-determined clock card display mode is sent to the launcher, so that the launcher can adjust the card color of the clock card in time according to the clock card display mode. For adjustment of the clock card display mode, reference may be made to the schematic diagrams of the foregoing application scenarios shown in FIG. 13 and FIG. 14. Details are not described herein again.

For updating the clock interface on the clock card by the launcher, reference may also be made to the processing procedures shown in FIG. 18 to FIG. 21. For an operation of updating the clock interface on the clock card, reference may also be made to the prior art.

For details not described in the procedure, reference may be made to the foregoing implementation. Details are not described herein again.

An embodiment further provides a computer storage medium. The computer storage medium stores computer instructions, and when the computer instructions are run on an electronic device, the electronic device is enabled to perform the related method steps, to implement the display method in the foregoing embodiments.

An embodiment further provides a computer program product. When the computer program product is run on a computer, the computer is enabled to perform the related steps, to implement the display method in the foregoing embodiments.

In addition, an embodiment of this application further provides an apparatus. The apparatus may be specifically a chip, a component, or a module. The apparatus may include a processor and a memory that are connected. The memory is configured to store computer-executable instructions. When the apparatus runs, the processor may execute the computer-executable instructions stored in the memory, to cause the chip to perform the display method in the foregoing method embodiments.

The electronic device (such as a mobile phone), the computer storage medium, the computer program product, or the chip provided in the embodiments may be configured to perform the corresponding method provided above. Therefore, for beneficial effects that can be achieved, refer to the beneficial effects of the corresponding method provided above. Details are not described herein again.

Based on the foregoing descriptions of the implementations, a person skilled in the art may clearly understand that, for the purpose of convenient and brief description, division of the foregoing functional modules is taken as an example for illustration. In actual application, the foregoing functions can be allocated to different functional modules and implemented according to a requirement, that is, an inner structure of an apparatus is divided into different functional modules to implement all or some of the functions described above.

In the several embodiments provided in this application, it should be understood that the disclosed apparatus and method may be implemented in other manners. For example, the described apparatus embodiment is merely an example. For example, module or unit division is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electric, mechanical, or other forms.

The foregoing embodiments are merely intended for describing the technical solutions of this application, but not for limiting this application. It should be understood by a person of ordinary skill in the art that although this application has been described in detail with reference to the foregoing embodiments, modifications can be made to the technical solutions described in the foregoing embodiments, or equivalent replacements can be made to some technical features in the technical solutions, without departing from the scope of the technical solutions of embodiments of this application.

What is claimed is:

1. An electronic device, comprising:
one or more processors; and
a memory coupled to the one or more processors, wherein the memory is configured to store instructions that, when executed by the one or more processors, cause the electronic device to:
display a first interface,
wherein a first clock card is displayed in the first interface, a clock dial and a first icon are displayed in an interface of the first clock card, and the first icon is related to first prompt information, and
wherein the first icon is displayed at a position related to a prompt time on the clock dial and the prompt time is a time point corresponding to the first prompt information, the prompt time is within a preset time period from a current time, and the current time is a time point displayed on the clock dial;
enable a timing function of a stopwatch in response to a received third operation;
display a third interface in response to a received fourth operation, wherein a third clock card is displayed in the third interface, and a current timing situation of the stopwatch is displayed in an interface of the third clock card; and based on a type of third prompt information being different from a type of fourth prompt information and a time difference between a prompt time of the third prompt information and a prompt time of the fourth prompt information being less than a preset value, display a third icon related to the third prompt information in the interface of the first clock card;
wherein a type priority of the third prompt information is higher than a type priority of the fourth prompt information;
wherein each piece of prompt information corresponds to at least one of alarm clock information, weather information, or schedule information;
wherein the first clock card comprises a world clock card;
wherein the world clock card displays a plurality of clock dials corresponding to different local times; and
wherein, for each piece of prompt information, the world clock card displays an icon corresponding to the piece of prompt information at different positions on the plurality of clock dials of the world clock card based on a same prompt time being associated with the different local times of the plurality of clock dials of the world clock card.

2. The electronic device according to claim 1, wherein before the displaying the first interface, the instructions, when executed by the one or more processors, further cause the electronic device to:
create the first prompt information in response to a received first operation; and
display the first prompt information in response to a received second operation.

3. The electronic device according to claim 1, wherein the instructions, when executed by the one or more processors, further cause the electronic device to:
display the first icon in a first style when the prompt time is within a first time period, or display the first icon in a second style when the prompt time is not within a first time period;
wherein the first style is different from the second style, the prompt time is within 24 hours from the current time, and duration of the first time period is 12 hours.

4. The electronic device according to claim 1, wherein when there are a plurality of pieces of prompt information of a same type, a second icon is displayed in the interface of the first clock card, wherein in the plurality of pieces of prompt information of the same type, a prompt time of second prompt information is shortest from the current time, and the second icon is related to the second prompt information.

5. The electronic device according to claim 1, wherein the instructions, when executed by the one or more processors, further cause the electronic device to:
display a second interface when the current time reaches the prompt time of the first prompt information, wherein a second clock card is displayed in the second interface, and the first icon is not displayed in an interface of the second clock card.

6. The electronic device according to claim 1, wherein when there are a plurality of pieces of the weather information, a plurality of weather icons are displayed in the interface of the first clock card, wherein the plurality of weather icons are related to the plurality of pieces of the weather information.

7. The electronic device according to claim 1, wherein after the displaying the third interface in response to a received fourth operation, the instructions, when executed by the one or more processors, further cause the electronic device to:

disable the timing function of the stopwatch in response to a received fifth operation; and display a fourth interface in response to a received sixth operation, wherein a fourth clock card is displayed in the fourth interface, and the clock dial is displayed in an interface of the fourth clock card.

8. The electronic device according to claim 1, wherein the instructions, when executed by the one or more processors, further cause the electronic device to:

enable a timing function of a timer in response to a received seventh operation; and display a fifth interface in response to a received eighth operation, wherein a fifth clock card is displayed in the fifth interface, and a current timing situation of the timer is displayed in an interface of the fifth clock card.

9. The electronic device according to claim 8, wherein after the displaying the fifth interface in response to the received eighth operation, the computer programs, when executed by the one or more processors, further cause the electronic device to:

display a sixth interface when the timer ends timing, wherein a sixth clock card is displayed in the sixth interface, and the clock dial is displayed in an interface of the sixth clock card.

10. The electronic device according to claim 1, wherein a card color of the first clock card is a first color, and the instructions, when executed by the one or more processors, further cause the electronic device to:

turn on a first mode in response to a received ninth operation; and display a seventh interface in response to a received tenth operation, wherein a seventh clock card is displayed in the seventh interface, a card color of the seventh clock card is a second color, and the first color is different from the second color.

11. The electronic device according to claim 1, wherein a card color of the first clock card is a third color, and the instructions, when executed by the one or more processors, further cause the electronic device to:

display an eighth interface in a case of sensing that a sunrise-sunset state changes, wherein an eighth clock card is displayed in the eighth interface, a card color of the eighth clock card is a fourth color, and the third color is different from the fourth color.

12. The electronic device according to claim 1, wherein before the displaying the first interface, the instructions, when executed by the one or more processors, further cause the electronic device to:

turn on a second mode in response to a received eleventh operation, wherein the second mode indicates to display the first icon in an interface of the first clock card.

13. The electronic device according to claim 1, wherein the displaying the first interface comprises:

obtaining the first prompt information, and displaying the clock dial and the first icon related to the first prompt information in the interface of the first clock card, wherein the prompt time of the first prompt information is within the preset time period from the current time.

14. The electronic device according to claim 13, wherein after the displaying the first interface, the instructions, when executed by the one or more processors, further cause the electronic device to:

obtain fifth prompt information based on a database corresponding to the prompt information changing;

determine sixth prompt information in the fifth prompt information, wherein a prompt time of the sixth prompt information is within the preset time period from the current time; and display a ninth interface, wherein a ninth clock card is displayed in the ninth interface, and an icon related to the sixth prompt information is displayed in an interface of the ninth clock card.

15. The electronic device according to claim 13, wherein after the displaying the first interface, the instructions, when executed by the one or more processors, further cause the electronic device to:

obtain a prompt time of seventh prompt information; and display a tenth interface based on the prompt time of the seventh prompt information being within the preset time period from the current time, wherein a tenth clock card is displayed in the tenth interface, and an icon related to the seventh prompt information is displayed in an interface of the tenth clock card.

16. The electronic device according to claim 13, wherein the displaying the first interface comprises:

displaying the first interface based on there being no stopwatch task and/or timer task currently.

17. The electronic device according to claim 1, wherein the preset value is 10 minutes.

18. A display method, comprising:

displaying a first interface, wherein a first clock card is displayed in the first interface, a clock dial and a first icon are displayed in an interface of the first clock card, and the first icon is related to first prompt information, and wherein the first icon is displayed at a position related to a prompt time on the clock dial and the prompt time is a time point corresponding to the first prompt information, the prompt time is within a preset time period from a current time, and the current time is a time point displayed on the clock dial;

enabling a timing function of a stopwatch in response to a received third operation;

displaying a third interface in response to a received fourth operation, wherein a third clock card is displayed in the third interface, and a current timing situation of the stopwatch is displayed in an interface of the third clock card; and based on a type of third prompt information being different from a type of fourth prompt information and a time difference between a prompt time of the third prompt information and a prompt time of the fourth prompt information being less than a preset value, displaying a third icon related to the third prompt information in the interface of the first clock card;

wherein a type priority of the third prompt information is higher than a type priority of the fourth prompt information;

wherein each piece of prompt information corresponds to at least one of alarm clock information, weather information, or schedule information;

wherein the first clock card comprises a world clock card;

wherein the world clock card displays a plurality of clock dials corresponding to different local times; and wherein, for each piece of prompt information, the world clock card displays an icon corresponding to the piece of prompt information at different positions on the plurality of clock dials of the world clock card based on a same prompt time being associated with the different local times of the plurality of clock dials of the world clock card.

19. A non-transitory computer-readable storage medium storing instructions that, when run on an electronic device, cause the electronic device to perform a display method comprising:

displaying a first interface, wherein a first clock card is displayed in the first interface, a clock dial and a first icon are displayed in an interface of the first clock card, and the first icon is related to first prompt information, and wherein the first icon is displayed at a position related to a prompt time on the clock dial and the prompt time is a time point corresponding to the first prompt information, the prompt time is within a preset time period from a current time, and the current time is a time point displayed on the clock dial;

enabling a timing function of a stopwatch in response to a received third operation;

displaying a third interface in response to a received fourth operation, wherein a third clock card is displayed in the third interface, and a current timing situation of the stopwatch is displayed in an interface of the third clock card; and based on a type of third prompt information being different from a type of fourth prompt information and a time difference between a prompt time of the third prompt information and a prompt time of the fourth prompt information being less than a preset value, displaying a third icon related to the third prompt information in the interface of the first clock card;

wherein a type priority of the third prompt information is higher than a type priority of the fourth prompt information;

wherein each piece of prompt information corresponds to at least one of alarm clock information, weather information, or schedule information;

wherein the first clock card comprises a world clock card;

wherein the world clock card displays a plurality of clock dials corresponding to different local times; and wherein, for each piece of prompt information, the world clock card displays an icon corresponding to the piece of prompt information at different positions on the plurality of clock dials of the world clock card based on a same prompt time being associated with the different local times of the plurality of clock dials of the world clock card.

* * * * *